(12) United States Patent
Gao et al.

(10) Patent No.: US 9,497,742 B2
(45) Date of Patent: Nov. 15, 2016

(54) METHOD AND DEVICE FOR TRANSMITTING UPLINK CONTROL INFORMATION (UCI)

(71) Applicant: China Academy of Telecommunications Technology, Beijing (CN)

(72) Inventors: Xuejuan Gao, Beijing (CN); Yanan Lin, Beijing (CN); Qianqian Si, Beijing (CN)

(73) Assignee: CHINA ACADEMY OF TELECOMMUNICATIONS TECHNOLOGY, Beijing (CN)

( * ) Notice: Subject to any disclaimer, the term of this patent is extended or adjusted under 35 U.S.C. 154(b) by 0 days.

(21) Appl. No.: 14/419,086

(22) PCT Filed: Jul. 19, 2013

(86) PCT No.: PCT/CN2013/000870
§ 371 (c)(1),
(2) Date: Feb. 2, 2015

(87) PCT Pub. No.: WO2014/019335
PCT Pub. Date: Feb. 6, 2014

(65) Prior Publication Data
US 2015/0245345 A1  Aug. 27, 2015

(30) Foreign Application Priority Data
Aug. 3, 2012  (CN) .......................... 2012 1 0276325

(51) Int. Cl.
*H04W 72/04* (2009.01)
*H04L 5/00* (2006.01)
*H04L 1/16* (2006.01)
*H04L 1/18* (2006.01)

(52) U.S. Cl.
CPC ........ *H04W 72/0413* (2013.01); *H04L 1/1671* (2013.01); *H04L 1/1861* (2013.01);
(Continued)

(58) Field of Classification Search
CPC .............. H04W 72/0413; H04L 1/1671; H04L 5/0057; H04L 1/1861; H04L 5/001; H04L 5/0055; H04L 5/0023
See application file for complete search history.

(56) References Cited

U.S. PATENT DOCUMENTS

2012/0093067 A1* 4/2012 Lv ..................... H04B 7/15542
370/315
2012/0140708 A1* 6/2012 Choudhury ......... H04W 72/082
370/328
(Continued)

FOREIGN PATENT DOCUMENTS

CN  102013938  4/2011
CN  102469612  5/2012
(Continued)

OTHER PUBLICATIONS

Extended European Search Report for EP 13826279.5 mailed Jul. 16, 2015.
(Continued)

*Primary Examiner* — Brian D Nguyen
(74) *Attorney, Agent, or Firm* — Foley & Lardner LLP; James F. Ewing; Paul M. H. Pua

(57) ABSTRACT

A first type of UCI that needs to be transmitted in a current subframe is generated by a terminal device; a second type of UCI that needs to be transmitted in the current subframe is generated on the basis of a threshold number of bits simultaneously transmitted with the UCI in the current subframe and of the number of bits transmitting the first type of UCI; the first type of UCI and the second type of UCI generated
(Continued)

are transmitted on corresponding channel resources in the current subframe.

20 Claims, 13 Drawing Sheets

(52) U.S. Cl.
CPC ............ *H04L 5/001* (2013.01); *H04L 5/0055* (2013.01); *H04L 5/0057* (2013.01); *H04L 5/0023* (2013.01)

(56) References Cited

U.S. PATENT DOCUMENTS

| | | | | |
|---|---|---|---|---|
| 2012/0243497 | A1* | 9/2012 | Chung | H04L 5/0055 370/329 |
| 2012/0275425 | A1* | 11/2012 | Li | H04W 52/20 370/329 |
| 2012/0294268 | A1* | 11/2012 | Lee | H04L 1/08 370/329 |
| 2012/0307760 | A1* | 12/2012 | Han | H04L 5/001 370/329 |
| 2013/0028205 | A1* | 1/2013 | Damnjanovic | H04L 5/001 370/329 |

FOREIGN PATENT DOCUMENTS

| | | |
|---|---|---|
| JP | 2012109955 | 6/2012 |
| JP | 2013507067 | 2/2013 |
| JP | 2015516744 | 6/2015 |
| WO | WO-2011/126239 | 10/2011 |
| WO | WO-2013148168 | 10/2013 |

OTHER PUBLICATIONS

Huawei et al: "Simultaneous transmission of periodic CSI and HARQ-ACK", 3GPP Draft; R1-121937, 3rd Generation Partnership Project (3GPP), Mobile Competence Centre ; 650, Route Des Lucioles ; F-06921 Sophia-Antipolis Cedex ; France, vol. RAN WG1, no. Prague, Czech Republic; 20120521-20120525, May 12, 2012, XP050600238, [retrieved on May 12, 2012].

Catt: "Discussions on multi-CC periodic CSI reporting in LTE-A Rel-11", 3GPP Draft; R1-121077, 3rd Generation Partnership Project (3GPP), Mobile Competence Centre ; 650, Route Des Lucioles ; F-06921 Sophia-Antipolis Cedex ; France, vol. RAN WG1, no. Jeju, Korea; 20120326-20120330, Mar. 20, 2012, XP050599380, [retrieved on Mar. 20, 2012].

Qualcomm Incorporated: "On reducing periodic CS! dropping for CA operation", 3GPP Draft; R1-122762 on Reducing Periodic CS1 Dropping for CA Operation, $3^{rd}$ Generation Partnership Project (3GPP), Mobile Competence Centre ; 650, Route Des Lucioles ; F-06921 Sophia-Antipolis Cedex ; France, vol. RAN WG1, no. Prague, Czech Republic; 20120521-20120525, May 12, 2012, XP050600941, [retrieved on May 12, 2012].

Huawei et al: "Simultaneous transmission of periodic CSI and HARQ-ACK", 3GPP Draft; R1-113631, 3rd Generation Partnership Project (3GPP), Mobile Competence Centre ; 650, Route Des Lucioles ; F-86921 Sophia-Antipolis Cedex ; France, vol. RAN WG1, no. San Francisco, USA; 28111114-20111118, Nov. 8, 2011 (2011-11-88), XP858561776, [retrieved on Nov. 8, 2011].

3GPP TSG RAN WG1 Meeting #69, "On HARQ-ACK and Periodic CSI Multiplexing in PUCCH Format 3," Prague, Czech Republic, May 21-25, 2012. R1-122339.

3GPP TSG RAN WG1 Meeting #69, "Multi-Cell HARQ-ACK and periodic CSI multiplexing issues on uplink control signaling enhancement," Prague, Czech Republic, May 21-25, 2012. R1-122093.

Office Action for Japanese Patent Application No. 2015-524598 mailed Jan. 4, 2015 (including English summary).

International Search Report for PCT/CN2013/000870 mailed Oct. 24, 2013.

* cited by examiner

310: The base station determines a set of downlink carriers with CSI feedback in the current subframe, for each of which the number of feedback bits of CSI does not exceed (A-B) bits

↓

312: The base station selects a downlink carrier in the set of downlink carriers according to CSI reporting type priorities and/or carrier indexes and determines that the number of transmission bits of CSI transmitted by the UE in the current subframe is the number of transmission bits corresponding to a CSI reporting type of the downlink carrier

Fig.3B

320: The base station selects a downlink carrier in a set of downlink carriers, with CSI feedback in the current subframe, according to CSI reporting type priorities and/or carrier indexes

↓

322: The base station judges whether the number of transmission bits corresponding to a CSI reporting type of the downlink carrier exceeds (A-B) bits — Yes →

No ↓

324: Determine that the number of transmission bits of CSI transmitted by the UE in the current subframe is the number of transmission bits corresponding to the CSI reporting type of the downlink carrier 326: Determine that the number of transmission bits of CSI of the UE in the current subframe is 0 or remove the selected downlink carrier from the set of downlink carriers and return to the operation 320 above to further select CSI corresponding to the next priority

Fig.3C

METHOD AND DEVICE FOR TRANSMITTING UPLINK CONTROL INFORMATION (UCI)

This application is a US National Stage of International Application No. PCT/CN2013/000870, filed on Jul. 19, 2013, designating the United States and claiming the priority of Chinese Patent Application No. 201210276325.3, filed with the Chinese Patent Office on Aug. 3, 2012, the content of which is hereby incorporated by reference in its entirety.

FIELD

The present invention relates to the field of communications and particularly to a method and device for transmitting Uplink Control Information (UCI).

BACKGROUND

The technology of Carrier Aggregation (CA) has been introduced to a Long Term Evolution-Advanced (LTE-A) system so that a plurality of consecutive or inconsecutive carriers served by the same evolved Node B (eNB) are aggregated together to serve a User Equipment (UE) concurrently.

Uplink Control Information (UCI) includes Acknowledgement/Non-Acknowledgement (ACK/NACK) information, periodic Channel State Information (CSI) and Scheduling Request (SR) information.

The periodic CSI includes Rank Indicator (RI) information, Channel Quality Indicator (CQI) information, Precoding Matrix Indicator (PMI) information and Precoder Type Indication (PTI) information.

In the LTE-A CA system, the Physical Uplink Control Channel (PUCCH) format 3 is defined for transmission of multi-bit ACK/NACK information of a plurality of aggregated carriers. The maximum transmission capacity of the PUCCH format 3 is 22 bits and can support jointly encoded transmission of at most 20 bits of ACK/NACK and a 1-bit SR.

In the Rel-10 system, concurrent transmission of the ACK/NACK information of a plurality of carriers and periodic CSI on a PUCCH is not supported, and if there are both the ACK/NACK of a plurality of carriers and periodic CSI in a current subframe, then only the ACK/NACK is transmitted on the PUCCH whereas the CSI is dropped.

For a UE transmitting ACK/NACK using the PUCCH format 3, only when a support for concurrent transmission of ACK/NACK and CSI in a subframe is configured and one downlink subframe is received only on a Primary Component Carrier (PCC), concurrent transmission of ACK/NACK and periodic CSI of one carrier in the PUCCH format 2/2a/2b in the downlink subframe is supported. If there are a plurality of carriers for which CSI needs to be fed back concurrently in a current subframe, then the CSI of one carrier with high CSI reporting type priority is selected to be reported according to predefined CSI reporting type priorities, where the highest priority reporting types are the types 3, 5, 6 and 2a, the second highest priority reporting types are the types 2, 2b, 2c and 4, and the lowest priority reporting types are the types 1 and 1a, and CSI report contents and bits corresponding to each CSI reporting type in different reporting modes are as depicted in Table 1, and only one reporting type of each activated carrier of the UE is reported in one uplink subframe according to currently configured reporting types and a particular state. If there are a plurality of carriers with the same reporting type priority, then CSI of one of the carriers with the lowest index is further selected to be reported according to indexes of the carriers.

TABLE 1

CSI report contents and bits corresponding to CSI reporting types in different reporting modes

| Reporting Type | Report contents | Mode state | Mode 1-1 (bits/BP) | Mode 2-1 (bits/BP) | Mode 1-0 (bits/BP) | Mode 2-0 (bits/BP) |
|---|---|---|---|---|---|---|
| 1 | Sub-band CQI | RI = 1 | NA | 4 + L | NA | 4 + L |
|   |   | RI > 1 | NA | 7 + L | NA | 4 + L |
| 1a | Sub-band CQI/ second PMI | 8 antenna ports RI = 1 | NA | 8 + L | NA | NA |
|   |   | 8 antenna ports 1 < RI < 5 | NA | 9 + L | NA | NA |
|   |   | 8 antenna ports RI > 4 | NA | 7 + L | NA | NA |
| 2 | Wideband CQI/PMI | 2 antenna ports RI = 1 | 6 | 6 | NA | NA |
|   |   | 4 antenna ports RI = 1 | 8 | 8 | NA | NA |
|   |   | 2 antenna ports RI > 1 | 8 | 8 | NA | NA |
|   |   | 4 antenna ports RI > 1 | 11 | 11 | NA | NA |
| 2a | Wideband first PMI | 8 antenna ports RI < 3 | NA | 4 | NA | NA |
|   |   | 8 antenna ports 2 < RI < 8 | NA | 2 | NA | NA |
|   |   | 8 antenna ports RI = 8 | NA | 0 | NA | NA |
| 2b | Wideband CQI/ second PMI | 8 antenna ports RI = 1 | 8 | 8 | NA | NA |
|   |   | 8 antenna ports 1 < RI < 4 | 11 | 11 | NA | NA |
|   |   | 8 antenna ports RI = 4 | 10 | 10 | NA | NA |
|   |   | 8 antenna ports RI > 4 | 7 | 7 | NA | NA |
| 2c | Wideband CQI/first PMI/second PMI | 8 antenna ports RI = 1 | 8 | NA | NA | NA |
|   |   | 8 antenna ports 1 < RI ≤ 4 | 11 | NA | NA | NA |
|   |   | 8 antenna ports 4 < RI ≤ 7 | 9 | NA | NA | NA |
|   |   | 8 antenna ports RI = 8 | 7 | NA | NA | NA |
| 3 | RI | 2/4 antenna ports, 2-layer spatial multiplexing | 1 | 1 | 1 | 1 |
|   |   | 8 antenna ports, 2-layer spatial multiplexing | 1 | NA | NA | NA |
|   |   | 4 antenna ports, 4-layer spatial multiplexing | 2 | 2 | 2 | 2 |

TABLE 1-continued

CSI report contents and bits corresponding to CSI reporting types in different reporting modes

| Reporting Type | Report contents | Mode state | Reporting Modes | | | |
|---|---|---|---|---|---|---|
| | | | Mode 1-1 (bits/BP) | Mode 2-1 (bits/BP) | Mode 1-0 (bits/BP) | Mode 2-0 (bits/BP) |
| | | 8 antenna ports, 4-layer spatial multiplexing | 2 | NA | NA | NA |
| | | 8-layer spatial multiplexing | 3 | NA | NA | NA |
| 4 | Wideband CQI | RI = 1 or RI > 1 | NA | NA | 4 | 4 |
| 5 | RI/first PMI | 8 antenna ports, 2-layer spatial multiplexing | 4 | NA | NA | NA |
| | | 8 antenna ports, 4 and 8-layer spatial multiplexing | 5 | | | |
| 6 | RI/PTI | 8 antenna ports, 2-layer spatial multiplexing | NA | 2 | NA | NA |
| | | 8 antenna ports, 4-layer spatial multiplexing | NA | 3 | NA | NA |
| | | 8 antenna ports, 8-layer spatial multiplexing | NA | 4 | NA | NA |

For Table 1, it shall be noted that:

The bits/BP represents the number of report bits per Bandwidth Part; the CQI/PMI is categorized as a Wideband CQI/PMI and a sub-band CQI/PMI; the antenna ports represent antenna ports; the layer represents a transmission layer; the spatial multiplexing represents spatial multiplexing; the NA indicates that the reporting type is not supported in a corresponding report mode; and L represents the label of a selected sub-band in at most 2 bits.

In the LTE-A Rel-11 CA system, enhanced transmission of Uplink Control Information (UCI) has been investigated, and in order to avoid an influence on downlink scheduling by an eNB due to excessively CSI dropping, concurrent transmission of ACK/NACK of multiple carriers and periodic CSI of one carrier using the PUCCH format 3 is supported, and when there is an SR, concurrent transmission thereof with a 1-bit SR can be further supported.

SUMMARY

Embodiments of the invention provide a method and device for transmitting Uplink Control Information (UCI) so as to address such a problem in the prior art that particular transmission bits of ACK/ACK and CSI can not be determined accurately and consequently concurrent transmission of ACK/ACK and CSI can not be ensured without exceeding the maximum number of carrying bits.

In order to attain the object above, in an aspect, an embodiment of the invention provides a method for transmitting Uplink Control Information (UCI), the method including at least the operations of:

generating, by a User Equipment (UE), first UCI to be transmitted in a current subframe;

generating, by the UE, second UCI to be transmitted in the current subframe according to a threshold number of bits of UCI transmitted concurrently in the current subframe and a number of transmission bits of the first UCI, wherein a number of transmission bits of the second UCI does not exceed a difference between the threshold number of bits of UCI transmitted concurrently in the current subframe and the number of transmission bits of the first UCI; and transmitting, by the UE, the generated first UCI and second UCI on a corresponding channel resource in the current subframe.

In another aspect, an embodiment of the invention further provides a User Equipment (UE) including:

a first generating module configured to generate first Uplink Control Information (UCI) to be transmitted in a current subframe;

a second generating module configured to generate second UCI to be transmitted in the current frame according to a threshold number of bits of UCI transmitted concurrently in the current subframe and a number of transmission bits of the first UCI generated by the first generating module, wherein a number of transmission bits of the second UCI does not exceed a difference between the threshold number of bits of UCI transmitted concurrently in the current subframe and the number of transmission bits of the first UCI; and a transmitting module configured to transmit the first UCI generated by the first generating module and the second UCI generated by the second generating module on a corresponding channel resource in the current subframe.

In another aspect, an embodiment of the invention further provides a method for transmitting Uplink Control Information (UCI), the method including at least the operations of:

determining, by a base station, a number of transmission bits of first UCI transmitted by a User Equipment (UE) in a current subframe;

determining, by the base station, a number of transmission bits of second UCI, transmitted by the UE in the current subframe, according to a threshold number of bits of UCI transmitted concurrently in the current subframe and the number of transmission bits of the first UCI, wherein the number of transmission bits of the second UCI does not exceed a difference between the threshold number of bits of UCI transmitted concurrently in the current subframe and the number of transmission bits of the first UCI; and receiving, by the base station, the first UCI and the second UCI transmitted by the UE on a corresponding channel resource according to the number of transmission bits of the first UCI and the number of transmission bits of the second UCI in the current subframe.

In another aspect, an embodiment of the invention further provides a base station including:

a first determining module configured to determine a number of transmission bits of first Uplink Control Information (UCI) to be transmitted by a User Equipment (UE) in a current subframe;

a second determining module configured to determine a number of transmission bits of second UCI to be transmitted by the UE in the current subframe according to a threshold number of bits of UCI transmitted concurrently in the current subframe and the number of transmission bits of the first UCI determined by the first determining module, wherein the number of transmission bits of the second UCI does not exceed a difference between the threshold number of bits of UCI transmitted concurrently in the current subframe and the number of transmission bits of the first UCI; and;

a receiving module configured to receive the first UCI and the second UCI transmitted by the UE on a corresponding channel resource in the current subframe according to the number of transmission bits of the first UCI determined by the first determining module and the number of transmission bits of the second UCI determined by the second determining module.

The technical solution according to the embodiments of the invention has the following advantages over the prior art:

With the technical solution according to the embodiments of the invention, a method for transmitting ACK/NACK and periodic CSI concurrently on a channel resource corresponding a current subframe is provided, so that the number of transmission bits of second UCI transmitted concurrently with first UCI is determined dynamically according to the threshold number of bits of UCI transmitted concurrently in the current subframe and the number of transmission bit of the first UCI in the current subframe to thereby ensure that the total number of the concurrently transmitted bits of UCI will not exceed the threshold number of bits of UCI transmitted concurrently in the current subframe and bundling of ACK/NACK and dropping of CSI can be avoided as much as possible to thereby maximally guarantee accuracy and integrity of uplink information transmission.

BRIEF DESCRIPTION OF THE DRAWINGS

FIG. 3B is a schematic flow chart of a first scheme at the base station side for determining the number of transmission bits of second UCI according to the second embodiment of the invention.

FIG. 3C is a schematic flow chart of a second scheme at the base station side for determining the number of transmission bits of second UCI according to the second embodiment of the invention.

DETAILED DESCRIPTION OF THE EMBODIMENTS

In order to make the objects, technical solutions and advantages of the invention more apparent, the invention will be further described below in details with reference to the drawings.

The maximum number of carrying bits of the existing PUCCH format 3 is 22, and as depicted in Table 1, it can be apparent that the maximum number of bits of CSI of one carrier is 11, and when ACK/NACK and periodic CSI are transmitted concurrently, there has been absent in the prior art a specific solution to how to determine transmission bits of ACK/NACK and CSI without exceeding the maximum number of carrying bits of the format 3, which is currently desirable to address.

In the LTE-A Rel-11 CA system, for a UE supporting the PUCCH format 3, concurrent transmission of ACK/NACK information of a plurality of aggregated carriers and periodic CSI of one carrier using the PUCCH format 3 is supported, but there has been absent a specific method for allocating bits to carry ACK/NACK and CSI for concurrent transmission. In order to overcome such a drawback, embodiments of the invention provide a method for transmitting UCI, and for a UE supporting both the PUCCH format 3 transmission scheme and concurrent transmission of the ACK/NACK of a plurality of carriers and periodic CSI on a PUCCH, the number of transmission bits of second UCI which is transmitted concurrently with first UCI, i.e., the number of transmission bits of ACK/NACK and the number of transmission bits of CSI transmitted concurrently in a current subframe, is determined dynamically according to the threshold number A of bits of UCI transmitted concurrently in the current subframe and the number of transmission bit of the first UCI in the current subframe, so that the total number of transmission bits will not exceed A.

Figure 1:
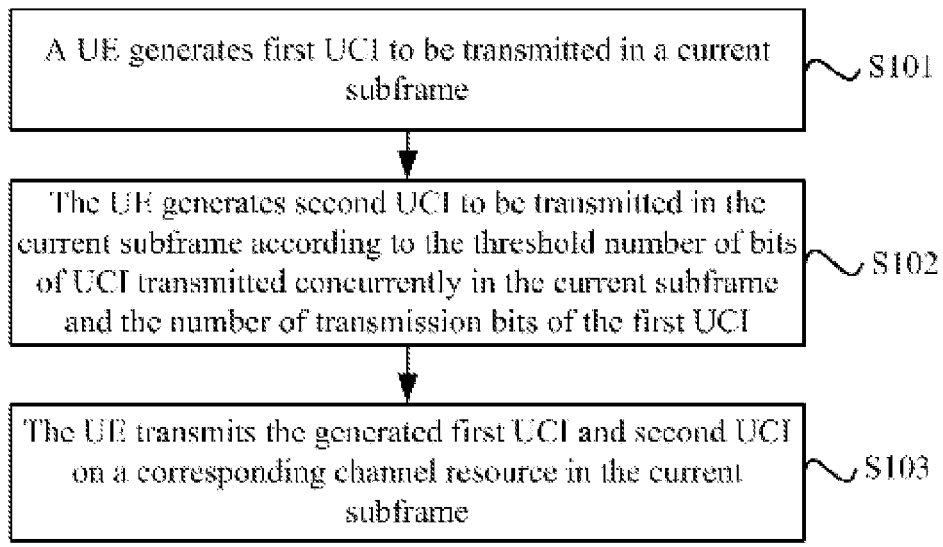
FIG. 1 is a schematic flow chart of a method for transmitting UCI according to an embodiment of the invention.

As illustrated in FIG. 1 which is a schematic flow chart of a method for transmitting Uplink Control Information (UCI) according to an embodiment of the invention, the method includes the following operations:

In the operation 101, a UE generates first UCI to be transmitted in a current subframe.

It shall be noted that in a process of the technical solution according to the embodiment of the invention, when the first UCI is ACK/NACK, the second UCI is CSI, and when the first UCI is CSI, the second UCI is ACK/NACK.

The method for determining the two UCI according to the embodiment of the invention will be described below respectively for such two different application scenarios.

In a first application scenario, the first UCI is ACK/NACK, and the second UCI is CSI.

In this application scenario, the operation 101 is performed as follows:

The UE determines the number of transmission bits of ACK/NACK to be generated, according to the number N of configured carriers, a transmission mode of each configured carrier and the number $M_i$ of downlink subframes, on each carrier, for which ACK/NACK needs to be fed back in the current subframe in the equation of:

$$B = \sum_{i=0}^{N-1} C_i \cdot M_i;$$

and

The UE generates a corresponding number of transmission bits of ACK/NACK to be transmitted in the current subframe.

Here B represents the number of transmission bits of ACK/NACK to be generated, which is determined by the UE;

$C_i$ takes a value under the following rule:

For a carrier with single-codeword transmission, $C_i=1$, and for a carrier with multi-codeword transmission, $C_i=2$; or For a carrier with single-codeword transmission or for a carrier with multi-codeword transmission and spatial bundling, $C_i=1$, and for a carrier with multi-codeword transmission and without spatial bundling, $C_i=2$; and $M_i$ represents the number of downlink subframes, on the current carrier, for which ACK/NACK needs to be fed back in the current subframe, and it takes a value under the following rule: for a Frequency Division Duplex (FDD) system, $M_i=1$; and for a Time Division Duplex (TDD) system, $M_i$ corresponding to different aggregated carriers take the same or different values.

In a second application scenario, the first UCI is CSI, and the second UCI is ACK/NACK.

In this application scenario, the operation 101 is performed as follows:

The UE selects a downlink carrier, in a set of downlink carriers with CSI feedback in the current subframe, according to CSI reporting type priorities and/or carrier indexes; and The UE determines that the number of transmission bits of CSI to be transmitted in the current subframe is the number $C_{real}$ of real feedback bits corresponding to a CSI reporting type of the downlink carrier, and the UE determines that the CSI to be transmitted in the current subframe is $C_{real}$ bits of CSI of the downlink carrier; or The UE determines that the number of transmission bits of CSI to be transmitted by the UE in the current subframe is the maximum number $C_{type\_max}$ of feedback bits corresponding to the CSI reporting type of the downlink carrier, and when the number $C_{real}$ of real feedback bits corresponding to the CSI reporting type of the downlink carrier is less than $C_{type\_max}$, the UE appends $C_{type\_max}-C_{real}$ bits of placeholder to real CSI feedback information of the downlink carrier and determines that CSI to be transmitted by the UE in the current subframe is the CSI with the appended placeholder, and when the number $C_{real}$ of real feedback bits corresponding to the CSI reporting type of the downlink carrier is equal to $C_{type\_max}$, the UE determines that CSI to be transmitted in the current subframe is the $C_{real}$ bits of CSI of the downlink carrier.

The placeholder is a fixed value, which can be 0 or 1 and preferably to be 0, predefined between the UE and an base station, and this will also hold true for placeholder to be mentioned below, so a repeated description thereof will be omitted here.

In the operation 102, the UE generates second UCI, to be transmitted in the current subframe, according to the threshold number of bits of UCI transmitted concurrently in the current subframe and the number of transmission bits of the first UCI.

The number of transmission bits of the second UCI does not exceed the difference between the threshold number A of bits of UCI transmitted concurrently in the current subframe and the number of transmission bits of the first UCI.

In a real application, the threshold number A of bits is a predefined value or a value signaled via higher-layer signaling or Physical Downlink Control Channel (PDCCH) signaling, where A represents a positive integer, and A≤the maximum number of carrying bits of an uplink transmission scheme for transmitting feedback information of ACK/NACK and feedback information of CSI concurrently in the current subframe, or A≤the difference between the maximum number of carrying bits of the uplink transmission scheme and the number of SR bits.

Similarly, in correspondence to the two application scenarios in the operation 101, a process of this operation may also vary accordingly as described below:

In the first application scenario, the first UCI is ACK/NACK, and the second UCI is CSI.

In this application scenario, the operation 102 can be performed in the following several schemes:

First Scheme:

The UE determines a set of downlink carriers with CSI feedback in the current subframe, for each of which the number of real feedback bits of CSI does not exceed (A-B) bits, where A represents the threshold number of bits of UCI transmitted concurrently in the current subframe, and B represents the number of transmission bits of ACK/NACK generated by the UE; and The UE selects a downlink carrier in the set of downlink carriers according to CSI reporting type priorities and/or carrier indexes, generates $C_{real}$ bits of real CSI feedback information of the downlink carrier and determines that CSI to be transmitted by the UE in the current subframe is the $C_{real}$ bits of CSI of the selected downlink carrier; and When the set of downlink carriers determined by the UE is a null set, the UE determines no CSI to be transmitted in the current subframe.

Second Scheme:

In the operation A, the UE selects a downlink carrier in a set of downlink carriers with CSI feedback in the current subframe, according to CSI reporting type priorities and/or carrier indexes; and In the operation B, the UE judges whether the number of feedback bits of CSI of the selected downlink carrier exceeds (A-B) bits, where A represents the threshold number of bits of UCI transmitted concurrently in the current subframe, and B represents the number of transmission bits of ACK/NACK generated by the UE; and If a result of the judgment is negative, then the UE generates $C_{real}$ bits of real CSI feedback information of the downlink carrier and determines that CSI to be transmitted by the UE in the current subframe is the $C_{real}$ bits of CSI of the downlink carrier; and If the result of the judgment is positive, then the UE determines no CSI to be transmitted in the current subframe, or If the result of the judgment is positive, then the UE removes the downlink carrier currently selected in the operation A from the set of downlink carriers and performs the operation A again to further select a downlink carrier in the currently updated set of downlink carriers for corresponding processing of CSI thereof; and If the currently updated set of downlink carriers is a null set, then the UE determines no CSI to be transmitted in the current subframe.

Third Scheme:

The UE determines a set of downlink carriers with CSI feedback in the current subframe, for each of which the maximum number of feedback bits corresponding to the CSI reporting type thereof does not exceed (A-B) bits, where A represents the threshold number of bits of UCI transmitted concurrently in the current subframe, and B represents the number of transmission bits of ACK/NACK generated by the UE; and The UE selects a downlink carrier in the set of downlink carriers according to CSI reporting type priorities and/or carrier indexes and determines that the number of transmission bits of CSI to be transmitted by the UE in the current subframe is the maximum number $C_{type\_max}$ of feedback bits corresponding to the CSI reporting type of the downlink carrier; and When the number $C_{real}$ of real feedback bits corresponding to the CSI reporting type of the downlink carrier is less than $C_{type\_max}$, the UE appends ($C_{type\_max}$-$C_{real}$) bits of placeholder to $C_{real}$ bits of real CSI feedback information of the downlink carrier and determines that CSI to be transmitted by the UE in the current subframe is the $C_{type\_max}$ bits of CSI with the appended placeholder, and When the number $C_{real}$ of real feedback bits corresponding to the CSI reporting type of the downlink carrier is equal to $C_{type\_max}$, the UE determines that CSI to be transmitted by the UE in the current subframe is the $C_{real}$ bits of real CSI feedback information of the downlink carrier; and When the set of downlink carriers determined by the UE is a null set, the UE determines no CSI to be transmitted in the current subframe.

Fourth Scheme:

In the operation A, the UE selects a downlink carrier in a set of downlink carriers with CSI feedback in the current subframe, according to CSI reporting type priorities and/or carrier indexes; and In the operation B, the UE judges whether the maximum number $C_{type\_max}$ of feedback bits corresponding to the CSI reporting type of the downlink carrier exceeds (A-B) bits, where A represents the threshold number of bits of UCI transmitted concurrently in the current subframe, and B represents the number of transmission bits of ACK/NACK generated by the UE; and If a result of the judgment is negative, then the UE determines that the number of transmission bits of CSI to be transmitted in the current subframe is the maximum number $C_{type\_max}$ of feedback bits corresponding to the CSI reporting type of the downlink carrier, and when the number $C_{real}$ of real feedback bits corresponding to the CSI reporting type of the downlink carrier is less than $C_{type\_max}$, the UE appends ($C_{type\_max}$-$C_{real}$) bits of placeholder to $C_{real}$ bits of real CSI feedback information of the downlink carrier and determines that CSI to be transmitted by the UE in the current subframe is the $C_{type\_max}$ bits of CSI with the appended placeholder, and when the number $C_{real}$ of real feedback bits corresponding to the CSI reporting type of the downlink carrier is equal to $C_{type\_max}$, the UE determines that CSI to be transmitted by the UE in the current subframe is the $C_{real}$ bits of real CSI of the downlink carrier; and If the result of the judgment is positive, then the UE determines no CSI to be transmitted in the current subframe, or If the result of the judgment is positive, then the UE removes the downlink carrier currently selected in the operation A from the set of downlink carriers and performs the operation A again to further select a downlink carrier in the currently updated set of downlink carriers for corresponding processing of CSI thereof; and If the currently updated set of downlink carriers is a null set, then the UE determines no CSI to be transmitted in the current subframe.

Fifth Scheme:

In the operation A, the UE selects a downlink carrier in a set of downlink carriers with CSI feedback in the current subframe, according to CSI reporting type priorities and/or carrier indexes; and In the operation B, the UE judges whether the minimum number of feedback bits $C_{type\_min}$ corresponding to the CSI reporting type of the downlink carrier exceeds (A-B) bits, where A represents the threshold number of bits of UCI transmitted concurrently in the current subframe, and B represents the number of transmission bits of ACK/NACK generated by the UE; and If a result of the judgment is negative, then the UE determines that the number of transmission bits of CSI to be transmitted in the current subframe is (A-B) bits, and when the number $C_{real}$ of real feedback bits corresponding to the CSI reporting type of the selected downlink carrier is less than (A-B) bits, the UE appends (A-B-$C_{real}$) bits of placeholder to $C_{real}$ bits of real CSI feedback information of the downlink carrier and determines that CSI to be transmitted by the UE in the current subframe is the (A-B) bits of CSI with the appended placeholder; and when the number $C_{real}$ of real feedback bits corresponding to the CSI reporting type of the downlink carrier is more than (A-B) bits, the UE determines that CSI to be transmitted by the UE in the current subframe is first (A-B) bits of information among the real CSI feedback information of the downlink carrier, or the UE generates (A-B) bits of placeholder as CSI to be transmitted by the UE in the current subframe; and when the number $C_{real}$ of real feedback bits corresponding to the CSI reporting type of the downlink carrier is equal to (A-B) bits, the UE determines that CSI to be transmitted by the UE in the current subframe is the $C_{real}$ bits of real CSI of the downlink carrier; and If the result of the judgment is positive, then the UE determines no CSI to be transmitted in the current subframe, or If the result of the judgment is positive, then the UE removes the downlink carrier currently selected in the operation A from the set of downlink carriers and performs the operation A again to further select a downlink carrier in the currently updated set of downlink carriers for corresponding processing of CSI thereof; and If the currently updated set of downlink carriers is a null set, then the UE determines no CSI to be transmitted in the current subframe.

Sixth Scheme:

The UE determines a set of downlink carriers with CSI feedback in the current subframe, for each of which the minimum number $C_{type\_min}$ of feedback bits corresponding to the CSI reporting types does not exceed (A-B) bits, where A represents the threshold number of bits of UCI transmitted concurrently in the current subframe, and B represents the number of transmission bits of ACK/NACK generated by the UE; and The UE selects a downlink carrier in the set of downlink carriers according to CSI reporting type priorities and/or carrier indexes and judges whether the number $C_{real}$ of real feedback bits corresponding to the CSI reporting type of the downlink carrier exceeds (A-B) bits; and When the judgment shows the number $C_{real}$ being less than (A-B) bits, the UE appends (A-B-$C_{real}$) bits of placeholder to $C_{real}$ bits of real CSI feedback information of the downlink carrier and determines that CSI to be transmitted by the UE in the current subframe is the (A-B) bits of CSI, with the appended placeholder, When the judgment shows the number $C_{real}$ being equal to (A-B) bits, the UE determines that CSI to be transmitted by the UE in the current subframe is the $C_{real}$ bits of real CSI of the downlink carrier, and When the judgment shows the number $C_{real}$ being more than (A-B) bits, the UE determines that CSI to be transmitted by the UE in the current subframe is first (A-B) bits of information among the real CSI feedback information of the downlink carrier or generates (A-B) bits of placeholder as CSI to be transmitted by the UE in the current subframe; and When the set of downlink carriers determined by the UE is a null set, the UE determines no CSI to be transmitted in the current subframe.

Seventh Scheme:

The UE determines that the number of transmission bits of CSI to be transmitted in the current subframe is (A-B) bits, where A represents the threshold number of bits of UCI transmitted concurrently in the current subframe, and B represents the number of transmission bits of ACK/NACK generated by the UE; and The UE selects a downlink carrier in a set of downlink carriers with CSI feedback in the current subframe, according to CSI reporting type priorities and/or carrier indexes and judges whether the number $C_{real}$ of real feedback bits corresponding to the CSI reporting type of the downlink carrier exceeds (A-B) bits; and When the judgment shows the number $C_{real}$ being less than (A-B) bits, the UE appends (A-B-$C_{real}$) bits of placeholder to $C_{real}$ bits of real CSI feedback information of the downlink carrier and determines that CSI to be transmitted by the UE in the current subframe is the (A-B) bits of CSI with the appended placeholder, When the judgment shows the number $C_{real}$ being equal to (A-B) bits, the UE determines that CSI to be transmitted by the UE in the current subframe is the $C_{real}$ bits of real CSI of the downlink carrier, and When the judgment shows the number $C_{real}$ being more than (A-B) bits, the UE determines that CSI to be transmitted by the UE in the current subframe is first (A-B) bits of information among the real CSI feedback information of the downlink carrier or generates (A-B) bits of placeholder as CSI to be transmitted by the UE in the current subframe; or the UE removes the downlink carrier selected in the operation A from the set of downlink carriers and performs the operation A again to further select a downlink carrier in the currently updated set of downlink carriers for corresponding processing of CSI thereof, and if the currently updated set of downlink carriers is a null set, then the UE determines no CSI to be transmitted in the current subframe.

Eighth Scheme:

The UE determines that the number of transmission bits of CSI to be transmitted in the current subframe is (A-B) bits, where A represents the threshold number of bits of UCI transmitted concurrently in the current subframe, and B represents the number of transmission bits of ACK/NACK generated by the UE; and The UE determines a set of downlink carriers with CSI feedback in the current subframe, for each of which the number of real feedback bits of CSI does not exceed (A-B) bits, selects a downlink carrier in the set of downlink carrier according to CSI reporting type priorities and/or carrier indexes and judges whether the number $C_{real}$ of real feedback bits corresponding to a CSI reporting type of the downlink carrier exceeds (A-B) bits; and When the judgment shows the number $C_{real}$ being less than (A-B) bits, the UE appends (A-B-$C_{real}$) bits of placeholder to $C_{real}$ bits of real CSI feedback information of the downlink carrier and determines that CSI to be transmitted by the UE in the current subframe is the (A-B) bits of CSI with the appended placeholder, When the judgment shows the number $C_{real}$ being equal to (A-B) bits, the UE determines that CSI to be transmitted by the UE in the current subframe is the $C_{real}$ bits of real CSI of the downlink carrier, and When the judgment shows the number $C_{real}$ being more than (A-B) bits, the UE determines that CSI to be transmitted by the UE in the current subframe is first (A-B) bits of information among the real CSI feedback information of the downlink carrier or generates (A-B) bits of placeholder as CSI to be transmitted by the UE in the current subframe; and When the set of downlink carriers determined by the UE is a null set, the UE generates (A-B) bits of placeholder as CSI to be transmitted by the UE in the current subframe.

In a process scenario, which one of the schemes above can be applied as required in reality without departing from the scope of the invention.

In a second application scenario, the first UCI is CSI, and the second UCI is ACK/NACK.

In this application scenario, this operation is performed as follows:

The UE determines the number of feedback bits of ACK/NACK to be fed back, according to the number of configured carriers, a transmission mode of each configured carrier and the number of downlink subframes, on each carrier, for which ACK/NACK needs to be fed back in the current subframe;

The UE judges whether the number of feedback bits of ACK/NACK to be fed back exceeds (A-C) bits, where A represents the threshold number of bits of UCI transmitted concurrently in the current subframe, and C represents the number of transmission bits of CSI generated by the UE; and If a result of the judgment is negative, then the UE generates a corresponding number of bits of ACK/NACK according to the number of feedback bits of ACK/NACK to be fed back and determines that ACK/NACK to be transmitted by the UE in the current subframe is the generated ACK/NACK, and If the result of the judgment is positive, then the UE spatially bundles ACK/NACK to be fed back so that the number of feedback bits of the spatially bundled ACK/NACK does not exceed (A-C) bits, and determines that ACK/NACK to be transmitted by the UE in the current subframe is the spatially bundled ACK/NACK.

In the operation 103, the UE transmits the generated first UCI and second UCI on a corresponding channel resource in the current subframe.

In the respective process operations above, it shall be noted that:

The maximum number $C_{type\_max}$ of feedback bits corresponding to the CSI reporting type is as follows:

For a CSI reporting type of reporting based upon an RI value, the maximum number $C_{type\_max}$ of feedback bits corresponding to the CSI reporting type is the largest one of the numbers of feedback bits, in the CSI reporting type, corresponding to different RI values in a current configuration, wherein the current configuration includes a CSI feedback mode and/or an antenna port configuration and other information; and For other CSI reporting types, the maximum number $C_{type\_max}$ of feedback bits corresponding to the CSI reporting type is the number of real feedback bits.

It shall be further noted that when the current subframe is a subframe in which a Scheduling Request (SR) is transmitted, then:

The UE transmits the generated first UCI and second UCI and a 1-bit SR on the corresponding channel resource in the current subframe.

In another aspect, also at the base station side, a process of determining the numbers of transmission bit similar to the operation 101 to the operation 103 above and a process of determining a reception scheme for the UCI as a function of a corresponding result of the determination process will be performed, and the processes will be similar to those at the UE side except that the mode and number of bits in which the UE reports the Uplink Control Information (UCI) in the current subframe may be determined directly and the Uplink Control Information (UCI) may be received according to the corresponding result of the determination, rather than the corresponding UCI is generated according to the result of determining the number of transmission bits. Reference can be made to the description above for processes thereof, so a repeated description thereof will be omitted here.

The technical solution according to the embodiments of the invention has the following advantages over the prior art:

With the technical solution according to the embodiments of the invention, a method for transmitting ACK/NACK and periodic CSI concurrently on a channel resource corresponding to a current subframe is provided, so that the number of transmission bits of second UCI transmitted concurrently with first UCI is determined dynamically according to the threshold number of bits of UCI transmitted concurrently in the current subframe and the number of transmission bit of the first UCI in the current subframe to thereby ensure that the total number of the concurrently transmitted bits of UCI will not exceed the threshold number of bits of UCI transmitted concurrently in the current subframe and bundling of ACK/NACK and dropping of CSI can be avoided as much as possible to thereby maximally guarantee accuracy and integrity of uplink information transmission.

The technical solution according to the embodiments of the invention will be described below in connection with application scenarios.

For the sake of a convenient description, the technical solution according to the embodiments of the invention will be described respectively from the perspectives of the UE side and the base station side particularly taking into account the difference between the application scenarios above.

First Embodiment

Figure 2A:
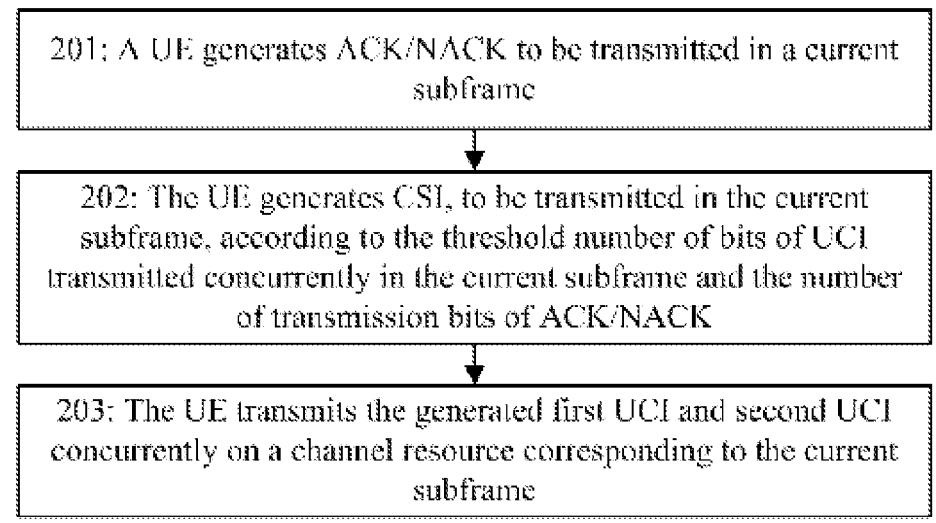
FIG. 2A is a schematic flow chart of a process method at the UE side according to a first embodiment of the invention.

In the event that the first UCI is ACK/NACK and the second UCI is CSI, FIG. 2A illustrates a process solution at the UE side according to an embodiment of the invention, including the following operations:

In the operation 201, a UE generates ACK/NACK to be transmitted in a current subframe.

For generation of the first UCI, a process at the UE side is as follows:

The UE generates a corresponding number of bits of feedback information of ACK/NACK according to the number N of configured carriers, a transmission mode of each configured carrier and the number $M_i$ of downlink subframes, on each carrier i, for which ACK/NACK needs to be fed back in the current subframe, where the number of bits of the generated feedback information of ACK/NACK can be derived in the equation of:

$$B = \sum_{i=0}^{N-1} C_i \cdot M_i;$$

Where B represents the number of transmission bits of ACK/NACK to be generated, which is determined by the UE;

$C_i$ takes a value under the following rule:

For a carrier with single-codeword transmission, $C_i=1$, and for a carrier with multi-codeword transmission, $C_i=2$; or For a carrier with single-codeword transmission or for a carrier with multi-codeword transmission and spatial bundling, $C_i=1$, and for a carrier with multi-codeword transmission and without spatial bundling, $C_i=2$; and $M_i$ represents the number of downlink subframes, on the current carrier, for which ACK/NACK needs to be fed back in the current subframe, and it takes a value under the following rule: for a Frequency Division Duplex (FDD) system, $M_i=1$; and for a Time Division Duplex (TDD) system, $M_i$ corresponding to different aggregated carriers take the same or different values.

In the operation 202, the UE generates CSI, to be transmitted in the current subframe, according to the threshold number of bits of UCI transmitted concurrently in the current subframe and the number of transmission bits of ACK/NACK.

Figure 2B:
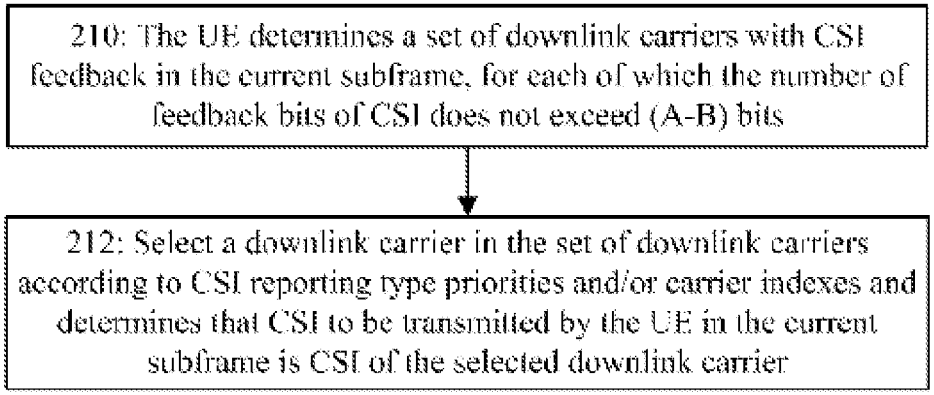
FIG. 2B is a schematic flow chart of a first scheme at the UE side for determining CSI to be transmitted in current subframe according to the first embodiment of the invention.

For generation of the second UCI, a process at the UE side can be performed in one of the following eight schemes respectively as illustrated in FIG. 2B to FIG. 2I:

First Scheme:

As illustrated in FIG. 2B, CSI to be transmitted in the current subframe is generated in this scheme in the following operations:

In the operation 210, the UE determines a set of downlink carriers with CSI feedback in the current subframe, for each of which the number of feedback bits of CSI does not exceed (A-B) bits.

In the operation 212, the UE selects a downlink carrier in the set of downlink carriers according to CSI reporting type priorities and/or carrier indexes and determines that CSI to be transmitted by the UE in the current subframe is CSI of the selected downlink carrier.

In a real application, the set of downlink carriers above may include at least one carrier or may be a null set (which does not include any carrier), and when there is no downlink carrier for which the number of feedback bits of CSI does not exceed (A-B) bits, the UE can directly determine that the number of transmission bits of CSI in the current subframe is 0, i.e., no CSI to be transmitted.

Figure 2C:
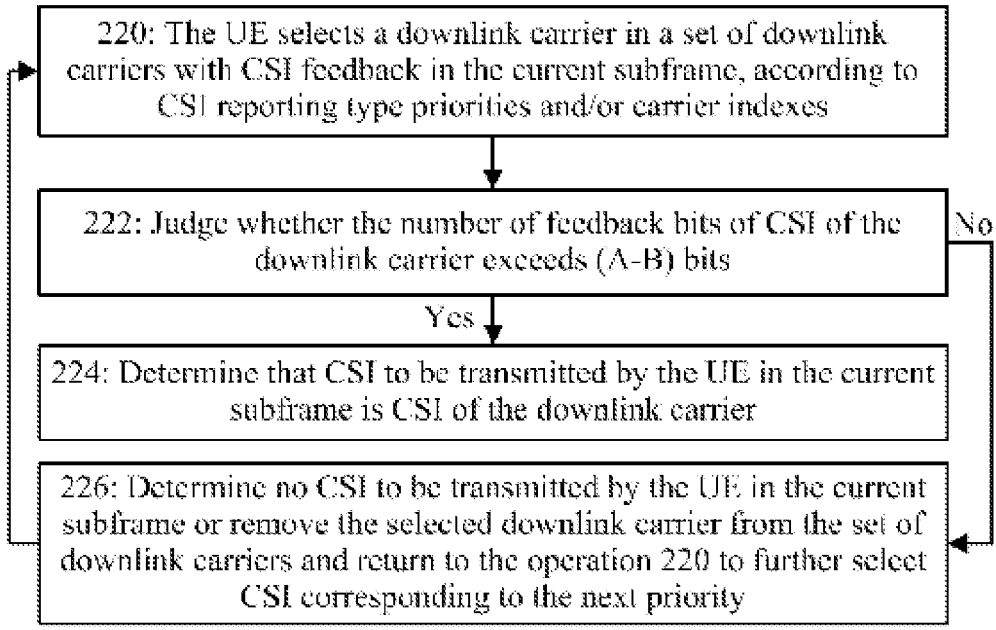
FIG. 2C is a schematic flow chart of a second scheme at the UE side for determining CSI to be transmitted in current subframe according to the first embodiment of the invention.

Second Scheme:

As illustrated in FIG. 2C, CSI to be transmitted in the current subframe is generated in this scheme in the following operations:

In the operation 220, the UE selects a downlink carrier in a set of downlink carriers with CSI feedback in the current subframe, according to CSI reporting type priorities and/or carrier indexes.

In the operation 222, the UE judges whether the number of feedback bits of CSI of the downlink carrier exceeds (A-B) bits, and if not, then the UE proceeds to the operation 224; otherwise, the UE proceeds to the operation 226.

In the operation 224, the UE determines that CSI to be transmitted by the UE in the current subframe is CSI of the downlink carrier.

In the operation 226, the UE determines no CSI to be transmitted by the UE in the current subframe or removes the selected downlink carrier from the set of downlink carriers and returns to the operation 220 to further select CSI corresponding to the next priority.

In the operation 220, if there is no downlink carrier, for which the number of feedback bits of CSI does not exceed (A-B) bits, in the set of downlink carriers with CSI feedback in the current subframe, then the UE can determine that the number of transmission bits of CSI in the current subframe directly is 0, i.e., no CSI to be transmitted.

Figure 2D:
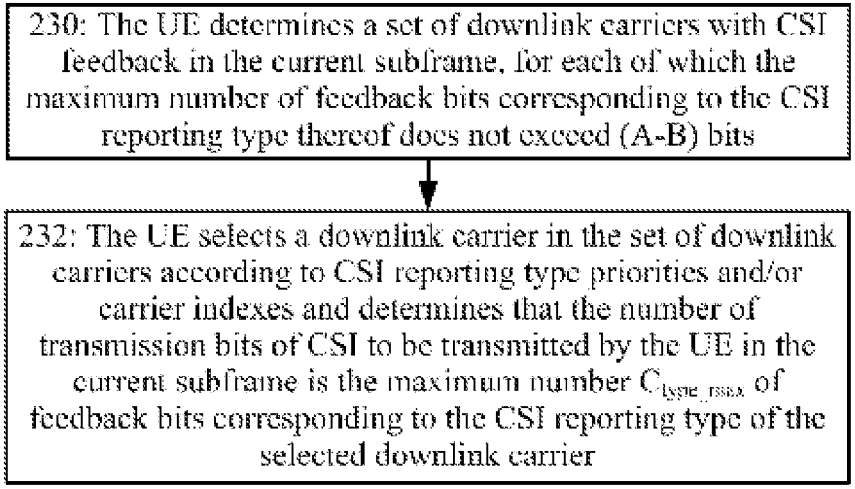
FIG. 2D is a schematic flow chart of a third scheme at the UE side for determining CSI to be transmitted in current subframe according to the first embodiment of the invention.

Third Scheme:

As illustrated in FIG. 2D, CSI to be transmitted in the current subframe is generated in this scheme in the following operations:

In the operation 230, the UE determines a set of downlink carriers with CSI feedback in the current subframe, for each of which the maximum number of feedback bits corresponding to the CSI reporting type thereof does not exceed (A-B) bits.

In the operation 232, the UE selects a downlink carrier in the set of downlink carriers according to CSI reporting type priorities and/or carrier indexes and determines that the number of transmission bits of CSI to be transmitted by the UE in the current subframe is the maximum number $C_{type\_max}$ of feedback bits corresponding to the CSI reporting type of the selected downlink carrier.

When the number C of real feedback bits (i.e., the number of feedback bits determined according to a real RI value) corresponding to the CSI reporting type of the selected downlink carrier is less than $C_{type\_max}$, the UE appends ($C_{type\_max}$-C) bits with values "0" to the number of real feedback bits of CSI of the downlink carrier and determines that CSI to be transmitted by the UE in the current subframe is the CSI with the appended bits "0".

Otherwise, the UE determines that CSI to be transmitted by the UE in the current subframe is the real CSI of the selected downlink carrier.

In a real application scenario, the set of downlink carriers above may include at least one carrier or may be a null set (which does not include any carrier), but when there is no downlink carrier for which the maximum number of feedback bits corresponding to the CSI reporting type thereof does not exceed (A-B) bits, the UE can directly determine that the number of transmission bits of CSI in the current subframe is 0, i.e., no CSI to be transmitted.

Figure 2E:
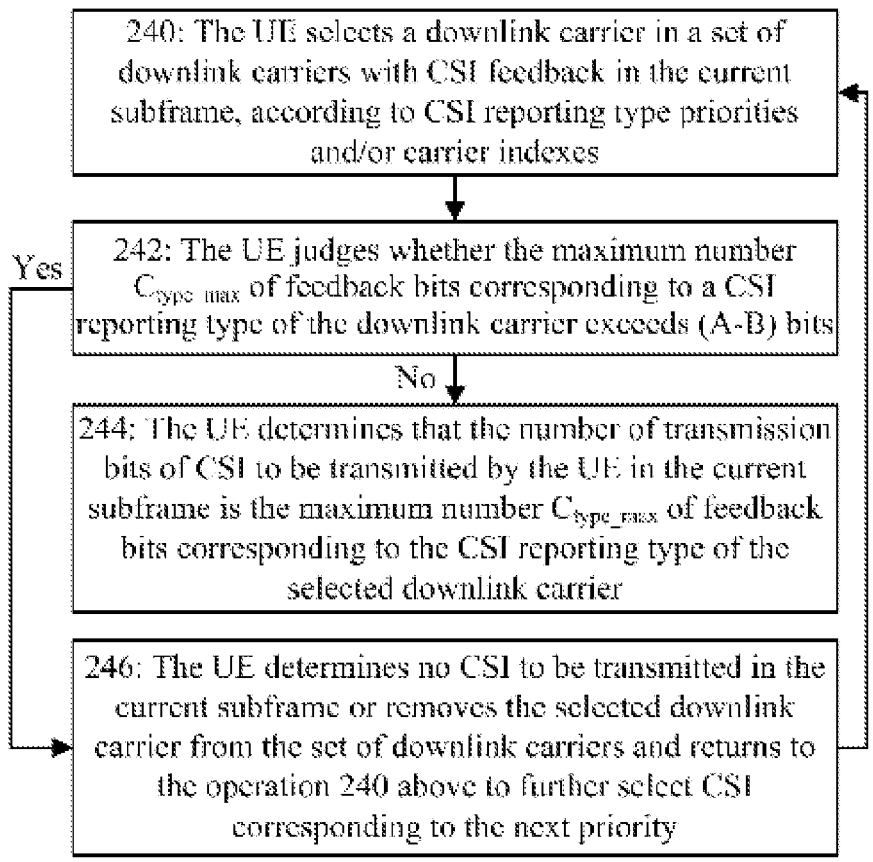
FIG. 2E is a schematic flow chart of a fourth scheme at the UE side for determining CSI to be transmitted in current subframe according to the first embodiment of the invention.

Fourth Scheme:

As illustrated in FIG. 2E, CSI to be transmitted in the current subframe is generated in this scheme in the following operations:

In the operation 240, the UE selects a downlink carrier in a set of downlink carriers, for which CSI is fed back in the current subframe, according to CSI reporting type priorities and/or carrier indexes.

In the operation 242, the UE judges whether the maximum number $C_{type\_max}$ of feedback bits corresponding to the CSI reporting type of the downlink carrier exceeds (A-B) bits, and if $C_{type\_max}$ does not exceed (A-B) bits, then the UE proceeds to the operation 244; otherwise, the UE proceeds to the operation 246.

In the operation 244, the UE determines that the number of transmission bits of CSI to be transmitted by the UE in the current subframe is the maximum number $C_{type\_max}$ of feedback bits corresponding to the CSI reporting type of the selected downlink carrier. In this case, when the number C of real feedback bits corresponding to the CSI reporting type of the selected downlink carrier is less than $C_{type\_max}$, the UE appends ($C_{type\_max}$-C) bits with values "0" to the number of real feedback bits of CSI of the downlink carrier and determines that CSI to be transmitted by the UE in the current subframe is the CSI with the appended bits "0", and when the number C of real feedback bits corresponding to the CSI reporting type of the selected downlink carrier is equal to $C_{type\_max}$, the UE determines that CSI to be transmitted by the UE in the current subframe is the real CSI of the downlink carrier.

In the operation 246, the UE determines no CSI to be transmitted in the current subframe or removes the selected downlink carrier from the set of downlink carriers and returns to the operation 240 above to further select CSI corresponding to the next priority.

In a real application, if there is no downlink carrier, for which the maximum number $C_{type\_max}$ of feedback bits does not exceed (A-B) bits, in the set of downlink carriers with CSI feedback in the current subframe, then the UE determines that the number of transmission bits of CSI in the current subframe is 0, i.e., no CSI to be transmitted.

Figure 2F:
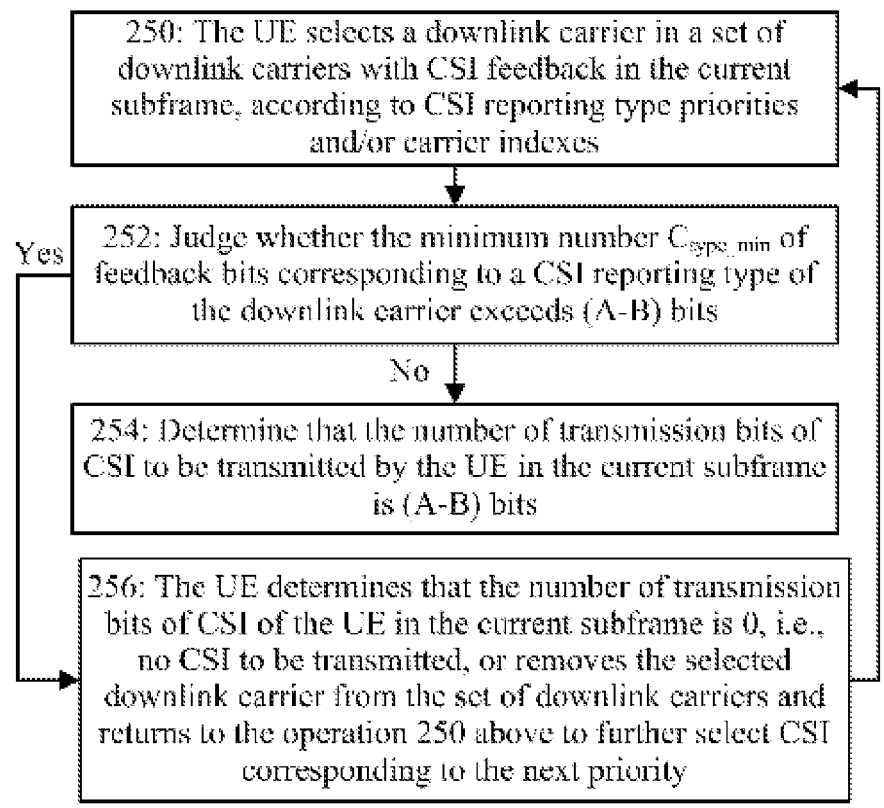
FIG. 2F is a schematic flow chart of a fifth scheme at the UE side for determining CSI to be transmitted in current subframe according to the first embodiment of the invention.

Fifth Scheme:

As illustrated in FIG. 2F, CcSI to be transmitted in the current subframe is generated in this scheme in the following operations:

In the operation 250, the UE selects a downlink carrier in a set of downlink carriers with CSI feedback in the current subframe, according to CSI reporting type priorities and/or carrier indexes.

In the operation 252, the UE judges whether the minimum number $C_{type\_min}$ of feedback bits corresponding to the CSI reporting type of the downlink carrier exceeds (A-B) bits, and if the $C_{type\_min}$ does not exceed (A-B) bits, then the UE proceeds to the operation 254; otherwise, the UE proceeds to the operation 256.

In the operation 254, the UE determines that the number of transmission bits of CSI to be transmitted by the UE in the current subframe is (A-B) bits, and when the number C of real feedback bits corresponding to the CSI reporting type of the selected downlink carrier is less than (A-B) bits, the UE appends (A-B-C) bits with values "0" to the number of real feedback bits of CSI of the downlink carrier and determines that CSI to be transmitted by the UE in the current subframe is the CSI with the appended bits "0"; when the number C of real feedback bits corresponding to the CSI reporting type of the downlink carrier is more than (A-B) bits, the UE determines that CSI to be transmitted by the UE in the current subframe is first (A-B) bits of information among the real feedback bits of CSI of the downlink carrier or generates (A-B) bits of placeholder (e.g., bit information "0") as CSI to be transmitted by the UE in the current subframe; and when the number C of real feedback bits corresponding to the CSI reporting type of the selected downlink carrier is equal to (A-B) bits, the UE determines that CSI to be transmitted by the UE in the current subframe is the real CSI of the downlink carrier.

In the operation 256, the UE determines that the number of transmission bits of CSI of the UE in the current subframe is 0, i.e., no CSI to be transmitted, or removes the selected downlink carrier from the set of downlink carriers and returns to the operation 250 above to further select CSI corresponding to the next priority.

If there is no downlink carrier, for which the minimum number $C_{type\_min}$ of feedback bits does not exceed (A-B) bits, in the set of downlink carriers with CSI feedback in the current subframe, then the UE determines that the number of transmission bits of CSI in the current subframe is 0, i.e., no CSI to be transmitted.

Figure 2G:
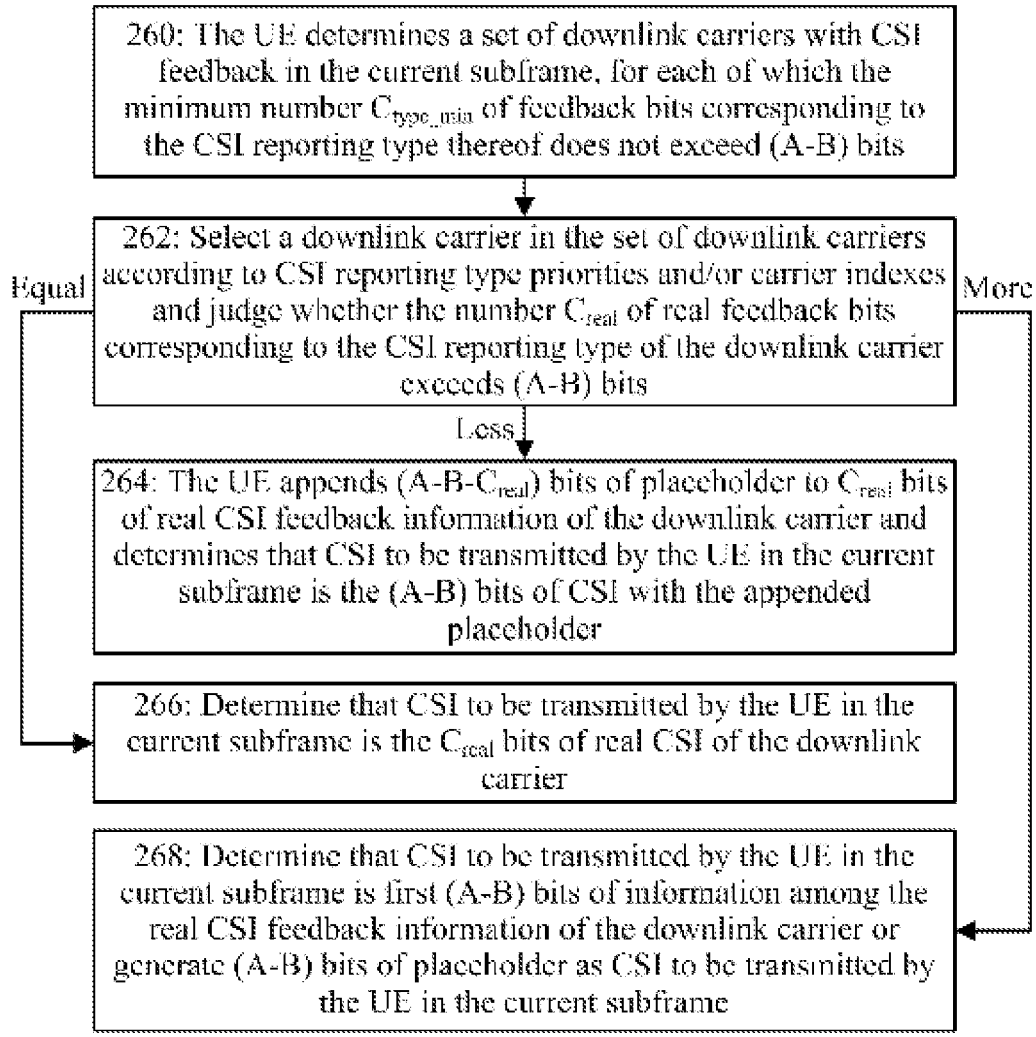
FIG. 2G is a schematic flow chart of a sixth scheme at the UE side for determining CSI to be transmitted in current subframe according to the first embodiment of the invention.

Sixth Scheme:

As illustrated in FIG. 2G, CSI to be transmitted in the current subframe is generated in this scheme in the following operations:

In the operation 260, the UE determines a set of downlink carriers with CSI feedback in the current subframe, for each of which the minimum number $C_{type\_min}$ of feedback bits corresponding to the CSI reporting type thereof does not exceed (A-B) bits.

In the operation 262, the UE selects a downlink carrier in the set of downlink carriers according to CSI reporting type priorities and/or carrier indexes and judges whether the number $C_{real}$ of real feedback bits corresponding to the CSI reporting type of the downlink carrier exceeds (A-B) bits, and if the number $C_{real}$ is less than (A-B) bits, then the UE proceeds to the operation 264; if the number $C_{real}$ is equal to (A-B) bits, then the UE proceeds to the operation 266; and if the number $C_{real}$ is more than (A-B) bits, then the UE proceeds to the operation 268;

In the operation 264, the UE appends (A-B-$C_{real}$) bits of placeholder to $C_{real}$ bits of real CSI feedback information of the downlink carrier and determines that CSI to be transmitted by the UE in the current subframe is the (A-B) bits of CSI with the appended placeholder;

In the operation 266, the UE determines that CSI to be transmitted by the UE in the current subframe is the $C_{real}$ bits of real CSI of the downlink carrier;

In the operation 268, the UE determines that CSI to be transmitted by the UE in the current subframe is first (A-B) bits of information among the real CSI feedback information of the downlink carrier or generates (A-B) bits of placeholder as CSI to be transmitted by the UE in the current subframe (that is, the UE transmits the (A-B) bits of placeholder instead of the real CSI information of the carrier to thereby ensure the total number A of transmission bits);

In the operation 260, when the set of downlink carriers determined by the UE is a null set, the UE determines no CSI to be transmitted in the current subframe, i.e., the number of transmission bits of CSI is 0.

Figure 2H:
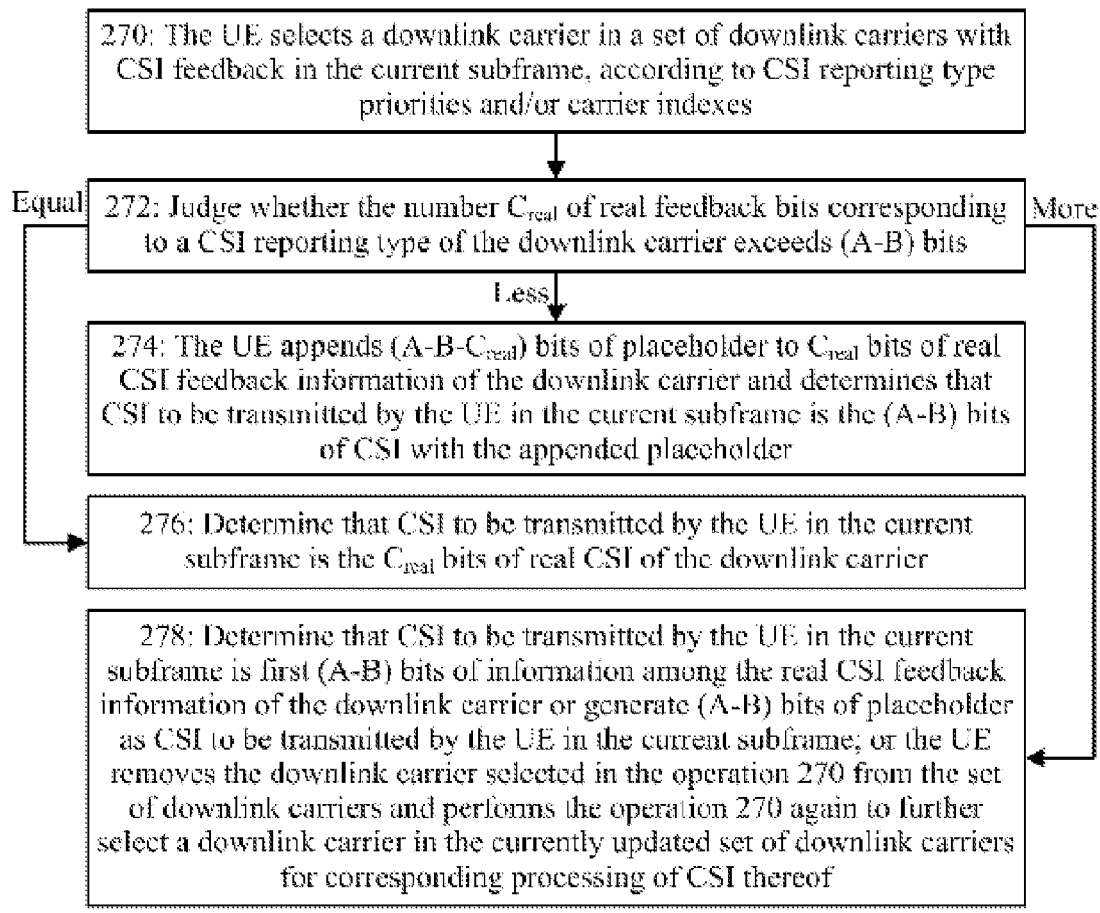
FIG. 2H is a schematic flow chart of a seventh scheme at the UE side for determining CSI to be transmitted in current subframe according to the first embodiment of the invention.

Seventh Scheme:

The UE always determines that the number of transmission bits of CSI to be transmitted in the current subframe is (A-B) bits, that is, the UE always assumes that the total number of transmission bits of ACK/NACK and CSI is A, and the UE determines that bit locations occupied by CSI is (A-B) bits of information after generating B bits of ACK/NACK information. The (A-B) bits of information will be transmitted regardless of whether there is CSI of a selected appropriate downlink carrier. The process scheme can be as follows:

As illustrated in FIG. 2H, CSI to be transmitted in the current subframe is generated in this scheme in the following operations:

In the operation 270, the UE selects a downlink carrier in a set of downlink carriers, with CSI feedback in the current subframe, according to CSI reporting type priorities and/or carrier indexes;

In the operation 272, the UE judges whether the number $C_{real}$ of real feedback bits corresponding to a CSI reporting type of the downlink carrier exceeds (A-B) bits, and if the number $C_{real}$ is less than (A-B) bits, then the UE proceeds to the operation 274; if the number $C_{real}$ is equal to (A-B) bits, then the UE proceeds to the operation 276; and if the number $C_{real}$ is more than (A-B) bits, then the UE proceeds to the operation 278;

In the operation 274, the UE appends (A-B-$C_{real}$) bits of placeholder to $C_{real}$ bits of real CSI feedback information of the downlink carrier and determines that CSI to be transmitted by the UE in the current subframe is the (A-B) bits of CSI with the appended placeholder;

In the operation 276, the UE determines that CSI to be transmitted by the UE in the current subframe is the $C_{real}$ bits of real CSI of the downlink carrier;

In the operation 278, the UE determines that CSI to be transmitted by the UE in the current subframe is first (A-B) bits of information among the real CSI feedback information of the downlink carrier or generates (A-B) bits of placeholder as CSI to be transmitted by the UE in the current subframe; or the UE removes the downlink carrier selected in the operation 270 from the set of downlink carriers and performs the operation 270 again to further select a downlink carrier in the currently updated set of downlink carriers for corresponding processing of CSI thereof, and if the currently updated set of downlink carriers is a null set, then the UE determines no CSI to be transmitted in the current subframe, i.e., the number of transmission bits of CSI is 0.

Figure 2I:
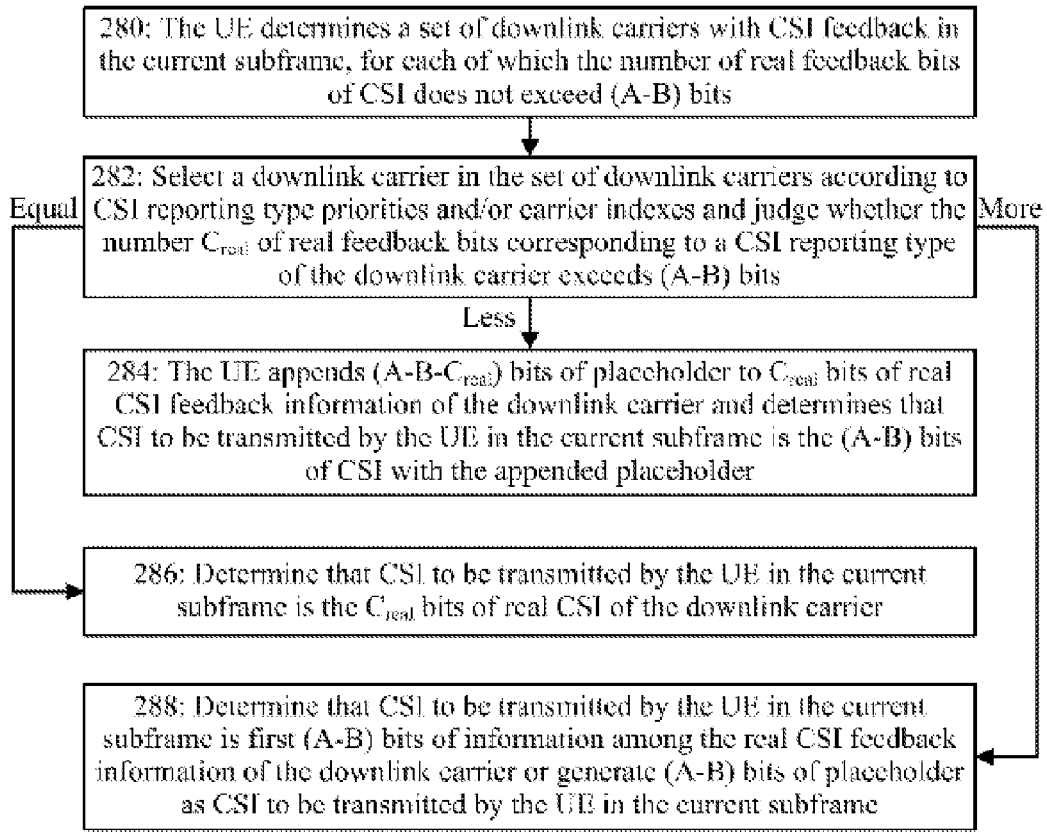
FIG. 2I is a schematic flow chart of an eighth scheme at the UE side for determining CSI to be transmitted in current subframe according to the first embodiment of the invention.

Eighth Scheme:

The UE always determines that the number of transmission bits of CSI to be transmitted in the current subframe is (A-B) bits, that is, the UE always assumes that the total number of transmission bits of ACK/NACK and CSI is A, and the UE determines that bit locations occupied by CSI is (A-B) bits of information after generating B bits of ACK/NACK information. The (A-B) bits of information will be transmitted regardless of whether there is CSI of a selected appropriate downlink carrier. The possible scheme is as follows:

As illustrated in FIG. 2I, CSI to be transmitted in the current subframe is generated in this scheme in the following operations:

Operation 280, the UE determines a set of downlink carriers with CSI feedback in the current subframe, for which the number of real feedback bits of CSI does not exceed (A-B) bits;

Operation 282, the UE selects a downlink carrier in the set of downlink carriers according to CSI reporting type priorities and/or carrier indexes and judges whether the number $C_{real}$ of real feedback bits corresponding to the CSI reporting type of the downlink carrier exceeds (A-B) bits, and if the number $C_{real}$ is less than (A-B) bits, then the UE proceeds to the operation 284; if the number $C_{real}$ is equal to (A-B) bits, then the UE proceeds to the operation 286; and if the number $C_{real}$ is more than (A-B) bits, then the UE proceeds to the operation 288;

In the operation 284, the UE appends (A-B-$C_{real}$) bits of placeholder to $C_{real}$ bits of real CSI feedback information of the downlink carrier and determines that CSI to be transmitted by the UE in the current subframe is the (A-B) bits of CSI with the appended placeholder;

Operation 286, the UE determines that CSI to be transmitted by the UE in the current subframe is the $C_{real}$ bits of real CSI of the downlink carrier; and Operation 288, the UE determines that CSI to be transmitted by the UE in the current subframe is first (A-B) bits of information among the real CSI feedback information of the downlink carrier or generates (A-B) bits of placeholder as CSI to be transmitted by the UE in the current subframe.

In one implementation, in the operation 280, when the set of downlink carriers is a null set, the UE generates (A-B) bits of placeholder as CSI to be transmitted by the UE in the current subframe.

In the operation 203, the UE transmits the generated first UCI and second UCI concurrently on a channel resource corresponding to the current subframe.

The sum of the numbers of bits of the first UCI and the second UCI does not exceed the maximum number of bits, of the concurrently transmitted a plurality of UCI, supported on the channel source.

Second Embodiment

Figure 3A:
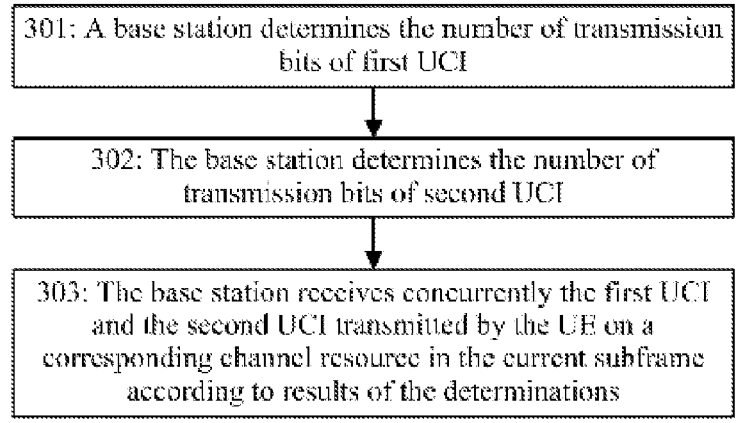
FIG. 3A is a schematic flow chart of a process method at the base station side according to a second embodiment of the invention.

In the event that the first UCI is ACK/NACK and the second UCI is CSI, FIG. 3A illustrates a process solution at the base station side according to an embodiment of the invention, including the following operations:

Operation 301, an base station determines the number of transmission bits of first UCI, as follows:

The base station determines the number of bits of feedback information of ACK/NACK transmitted by a UE according to the number N of configured carriers of the UE, a transmission mode of each configured carrier and the number $M_i$ of downlink subframes, on each carrier i, for which ACK/NACK needs to be fed back in a current subframe, particularly as described above, a repeated description of which will be omitted here.

Operation 302, the base station determines the number of transmission bits of second UCI, in one of the following eight schemes as illustrated in FIG. 3B to FIG. 3I:

First Scheme:

As illustrated in FIG. 3B, the number of transmission bits of the second UCI is determined in this scheme in the following operations:

Operation 310, the base station determines a set of downlink carriers with CSI feedback in the current subframe, for each of which the number of feedback bits of CSI does not exceed (A-B) bits.

Operation 312, the base station selects a downlink carrier in the set of downlink carriers according to CSI reporting type priorities and/or carrier indexes and determines the number of transmission bits corresponding to the CSI reporting type of the downlink carrier as the number of transmission bits of CSI transmitted by the UE in the current subframe.

In a real application, the set of downlink carriers above may include at least one carrier or may be a null set (which does not include any carrier), and when there is no downlink carrier for which the number of feedback bits of CSI does not exceed (A-B) bits, the base station can directly determine that the number of transmission bits of CSI in the current subframe is 0, i.e., no CSI transmitted by the UE.

Second Scheme:

As illustrated in FIG. 3C, the number of transmission bits of the second UCI is determined in this scheme in the following operations:

Operation 320, the base station selects a downlink carrier in a set of downlink carriers with CSI feedback in the current subframe, according to CSI reporting type priorities and/or carrier indexes.

Operation 322, the base station judges whether the number of transmission bits corresponding to the CSI reporting type of the downlink carrier exceeds (A-B) bits, and if the number of transmission bits does not exceed (A-B) bits, then the base station proceeds to the operation 324; otherwise, the base station proceeds to the operation 326.

Operation 324, the base station determines that the number of transmission bits of CSI transmitted by the UE in the current subframe is the number of transmission bits corresponding to the CSI reporting type of the downlink carrier.

Operation 326, the base station determines that the number of transmission bits of CSI of the UE in the current subframe is 0 or removes the selected downlink carrier from the set of downlink carriers and returns to the operation 320 above to further select CSI corresponding to the next priority.

In a particular process, if there is no downlink carrier, for which the number of transmission bits of CSI does not exceed (A-B) bits, in the set of downlink carriers with CSI feedback in the current subframe, then the base station can directly determine that the number of transmission bits of CSI in the current subframe is 0, i.e., no CSI transmitted by the UE.

Figure 3D:
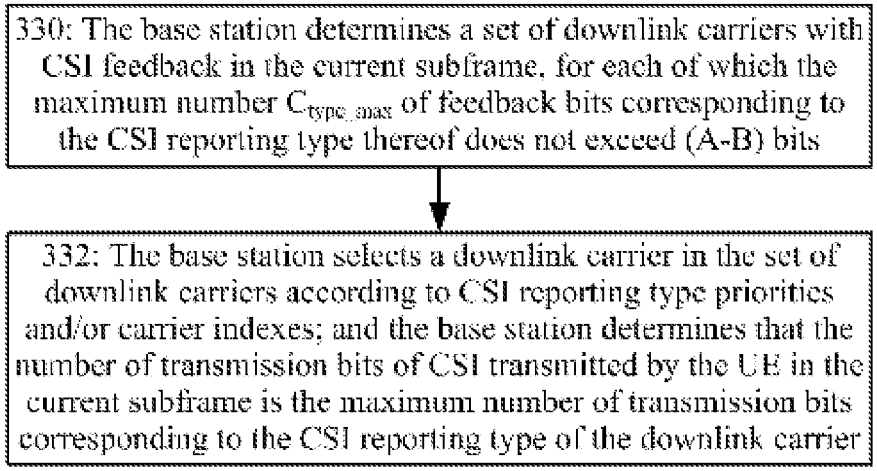
FIG. 3D is a schematic flow chart of a third scheme at the base station side for determining the number of transmission bits of second UCI according to the second embodiment of the invention.

Third Scheme:

As illustrated in FIG. 3D, the number of transmission bits of the second UCI is determined in this scheme in the following operations:

Operation 330, the base station determines a set of downlink carriers with CSI feedback in the current subframe, for each of which the maximum number $C_{type\_max}$ of feedback bits corresponding to the CSI reporting type thereof does not exceed (A-B) bits.

Operation 332, the base station selects a downlink carrier in the set of downlink carriers according to CSI reporting type priorities and/or carrier indexes.

The base station determines that the number of transmission bits of CSI transmitted by the UE in the current subframe is the maximum number of transmission bits corresponding to the CSI reporting type of the downlink carrier.

In an application scenario, the set of downlink carriers above may include at least one carrier or may be a null set (which does not include any carrier), and when there is no downlink carrier for which the number of feedback bits of CSI does not exceed (A-B) bits, the base station can determine that the number of transmission bits of CSI in the current subframe directly is 0, i.e., no CSI transmitted by the UE.

Figure 3E:
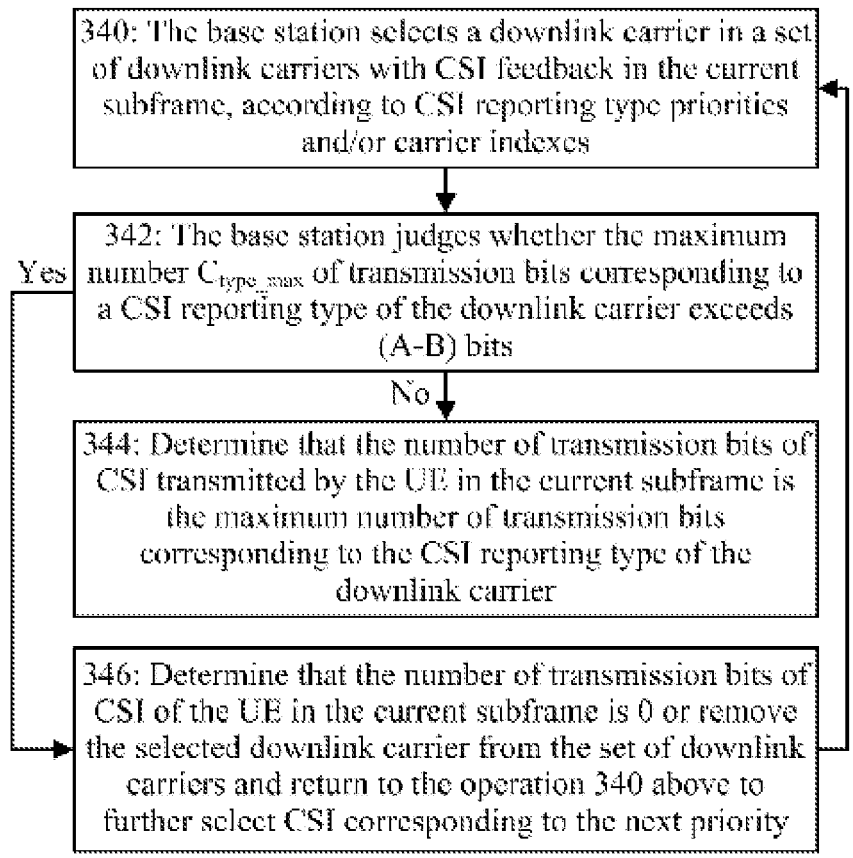
FIG. 3E is a schematic flow chart of a fourth scheme at the base station side for determining the number of transmission bits of second UCI according to the second embodiment of the invention.

Fourth Scheme:

As illustrated in FIG. 3E, the number of transmission bits of the second UCI is determined in this scheme in the following operations:

Operation 340, the base station selects a downlink carrier in a set of downlink carriers with CSI feedback in the current subframe, according to CSI reporting type priorities and/or carrier indexes.

Operation 342, the base station judges whether the maximum number $C_{type\_max}$ of transmission bits corresponding to the CSI reporting type of the downlink carrier exceeds (A-B) bits, and if the number $C_{type\_max}$ does not exceed (A-B) bits, then the base station proceeds to the operation 344; otherwise, the base station proceeds to the operation 346.

Operation 344, the base station determines that the number of transmission bits of CSI transmitted by the UE in the current subframe is the maximum number of transmission bits corresponding to the CSI reporting type of the downlink carrier.

Operation 346, the base station determines that the number of transmission bits of CSI of the UE in the current subframe is 0 or removes the selected downlink carrier from the set of downlink carriers and returns to the operation 340 above to further select CSI corresponding to the next priority.

In a real application, if there is no downlink carrier, for which the maximum number $C_{type\_max}$ of transmission bits does not exceed (A-B) bits, in the set of downlink carriers with CSI feedback in the current subframe, then the base station determines that the number of transmission bits of CSI in the current subframe is 0, i.e., no CSI transmitted by the UE.

Figure 3F:
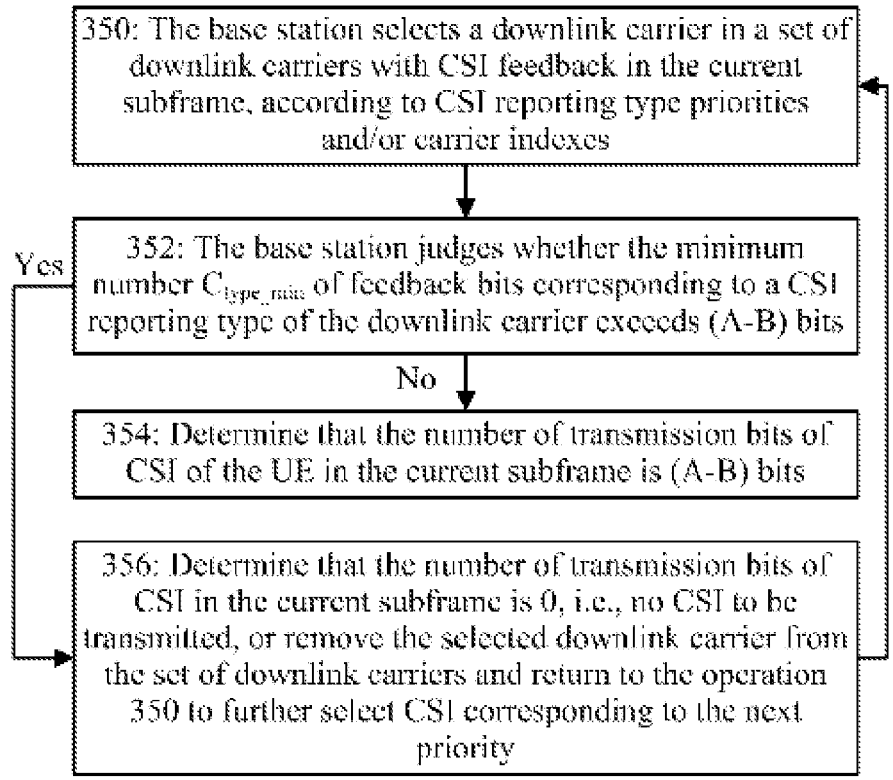
FIG. 3F is a schematic flow chart of a fifth scheme at the base station side for determining the number of transmission bits of second UCI according to the second embodiment of the invention.

Fifth Scheme:

As illustrated in FIG. 3F, the number of transmission bits of the second UCI is determined in this scheme in the following operations:

Operation 350, the base station selects a downlink carrier in a set of downlink carriers with CSI feedback in the current subframe, according to CSI reporting type priorities and/or carrier indexes.

Operation 352, the base station judges whether the minimum number $C_{type\_min}$ of feedback bits corresponding to the CSI reporting type of the downlink carrier exceeds (A-B) bits, and if number $C_{type\_min}$ does not exceed (A-B) bits, then the base station proceeds to the operation 354; otherwise, the base station proceeds to the operation 356.

Operation 354, the base station determines that the number of transmission bits of CSI of the UE in the current subframe is (A-B) bits.

Operation 346, the base station determines that the number of transmission bits of CSI in the current subframe is 0, i.e., no CSI to be transmitted, or removes the selected downlink carrier from the set of downlink carriers and returns to the operation 350 to further select CSI corresponding to the next priority.

If there is no downlink carrier, for which the minimum number $C_{type\_min}$ of feedback bits does not exceed (A-B) bits, in the set of downlink carriers with CSI feedback in the current subframe, then the base station determines that the number of transmission bits of CSI in the current subframe is 0, i.e., no CSI to be transmitted.

Figure 3G:
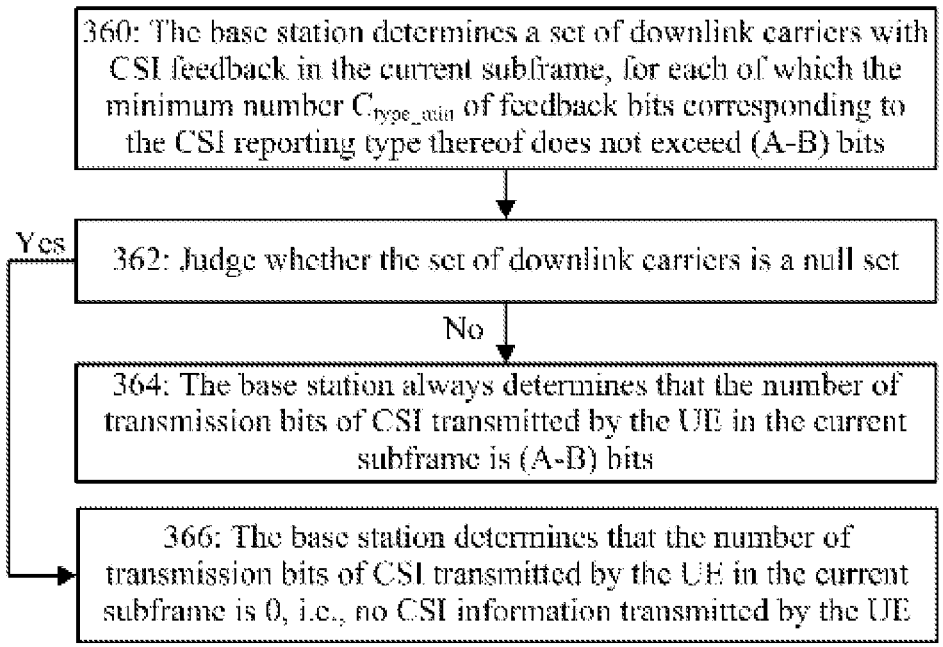
FIG. 3G is a schematic flow chart of a sixth scheme at the base station side for determining the number of transmission bits of second UCI according to the second embodiment of the invention.

Sixth Scheme:

As illustrated in FIG. 3G, the number of transmission bits of the second UCI is determined in this scheme in the following operations:

Operation 360, the base station determines a set of downlink carriers with CSI feedback in the current subframe, for each of which the minimum number $C_{type\_min}$ of feedback bits corresponding to the CSI reporting type does not exceed (A-B) bits.

Operation 362, the base station judges whether the set of downlink carriers is a null set, and if the set of downlink carriers is not a null set, then the base station proceeds to the operation 364; otherwise, the base station proceeds to the operation 366.

Operation 364, the base station always determines that the number of transmission bits of CSI transmitted by the UE in the current subframe is (A-B) bits, and furthermore the UE can select a downlink carrier in the set of downlink carriers according to CSI reporting type priorities and/or carrier indexes and judge whether the number $C_{real}$ of real feedback bits corresponding to the CSI reporting type of the downlink carrier exceeds (A-B) bits; and When the judgment shows the number $C_{real}$ being less than (A-B) bits, the base station determines that the (A-B) bits of feedback information of CSI includes (A-B-$C_{real}$) bits of placeholder and determines that real CSI of the downlink carrier is the $C_{real}$ bits of CSI with the placeholder being removed; and when the judgment shows the number $C_{real}$ being equal to (A-B) bits, the base station determines that real CSI of the downlink carrier is the (A-B) bits of feedback information of CSI; and When the judgment shows the number $C_{real}$ being more than (A-B) bits, the base station determines that first (A-B) bits of information among real feedback bits of CSI of the downlink carrier is the (A-B) bits of feedback information of CSI or determines that all the (A-B) bits of feedback information of CSI is placeholder; and Operation 366, the base station determines that the number of transmission bits of CSI transmitted by the UE in the current subframe is 0, i.e., no CSI information transmitted by the UE.

Figure 3H:
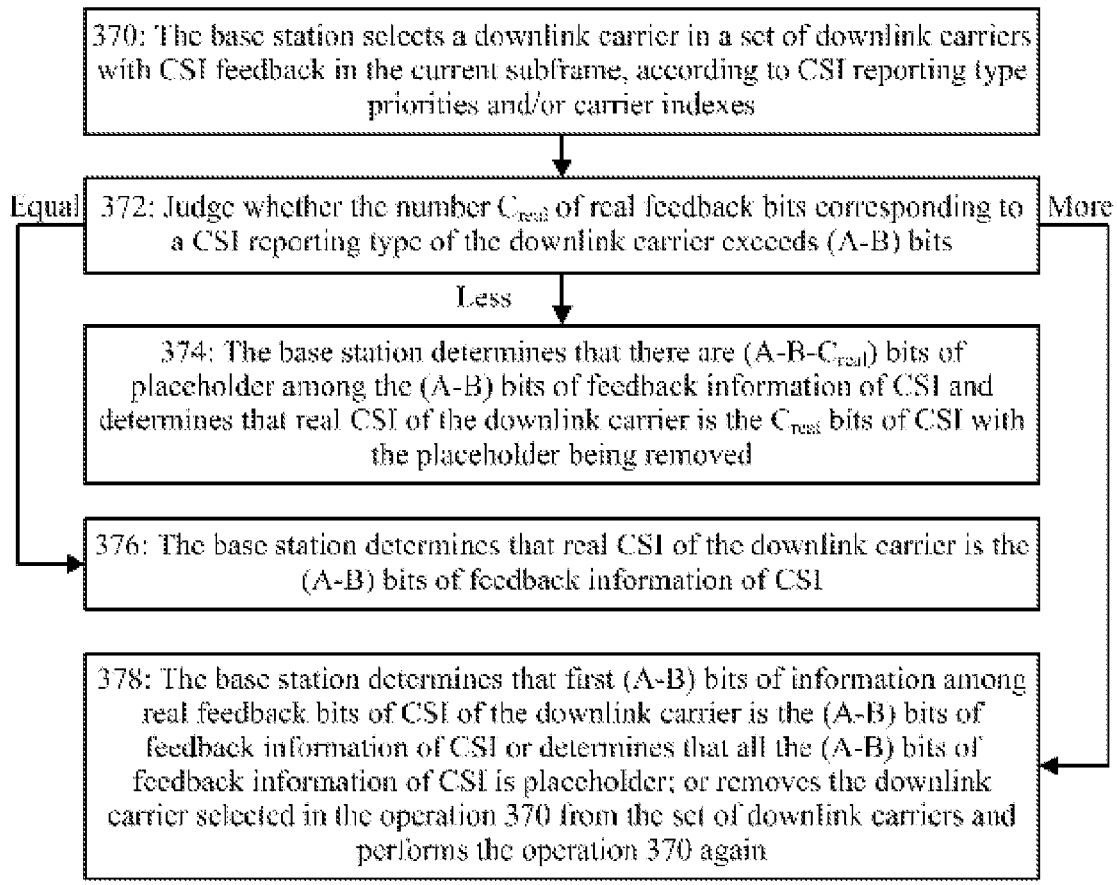
FIG. 3H is a schematic flow chart of a seventh scheme at the base station side for determining the number of transmission bits of second UCI according to the second embodiment of the invention.

Seventh Scheme:

As illustrated in FIG. 3H, the number of transmission bits of the second UCI is determined in this scheme in the following operations:

The base station always determines that the number of transmission bits of CSI transmitted by the UE in the current subframe is (A-B) bits, that is, the base station always assumes that the total number of transmission bits of ACK/NACK and CSI is A, upon reception of A bits of information, the base station picks up B bits of ACK/NACK from received A bits of information and assumes that CSI information is the remaining (A-B) bits of information. A possible scheme is as follows:

In the step 370, the base station selects a downlink carrier in a set of downlink carriers, for which CSI is fed back in the current subframe, according to CSI reporting type priorities and/or carrier indexes;

Operation 372, the base station judges whether the number $C_{real}$ of real feedback bits corresponding to a CSI reporting type of the downlink carrier exceeds (A-B) bits, and if the number $C_{real}$ is less than (A-B) bits, then the base station proceeds to the operation 374; if the number $C_{real}$ is equal to (A-B) bits, then the base station proceeds to the operation 376; and if the number $C_{real}$ is more than (A-B) bits, then the base station proceeds to the operation 378;

Operation 374, the base station determines that the (A-B) bits of feedback information of CSI includes (A-B-$C_{real}$) bits of placeholder and determines that real CSI of the downlink carrier is the $C_{real}$ bits of CSI with the placeholder being removed;

Operation 376, the base station determines that real CSI of the downlink carrier is the (A-B) bits of feedback information of CSI; and Operation 378, the base station determines that first (A-B) bits of information among real feedback bits of CSI of the downlink carrier is the (A-B) bits of feedback information of CSI or determines that all the (A-B) bits of feedback information of CSI is placeholder (that is, the base station determines that the UE transmits the (A-B) bits of placeholder instead of the real CSI information of the carrier to thereby ensure the total number A of transmission bits); or the base station removes the downlink carrier selected in the operation 370 from the set of downlink carriers and performs the operation 370 again to further select a downlink carrier in the currently updated set of downlink carriers for corresponding processing of CSI thereof, and if the currently updated set of downlink carriers is a null set, then the base station determines that the number of transmission bits of CSI transmitted by the UE in the current subframe is 0, i.e., no CSI information transmitted by the UE.

Figure 3I:
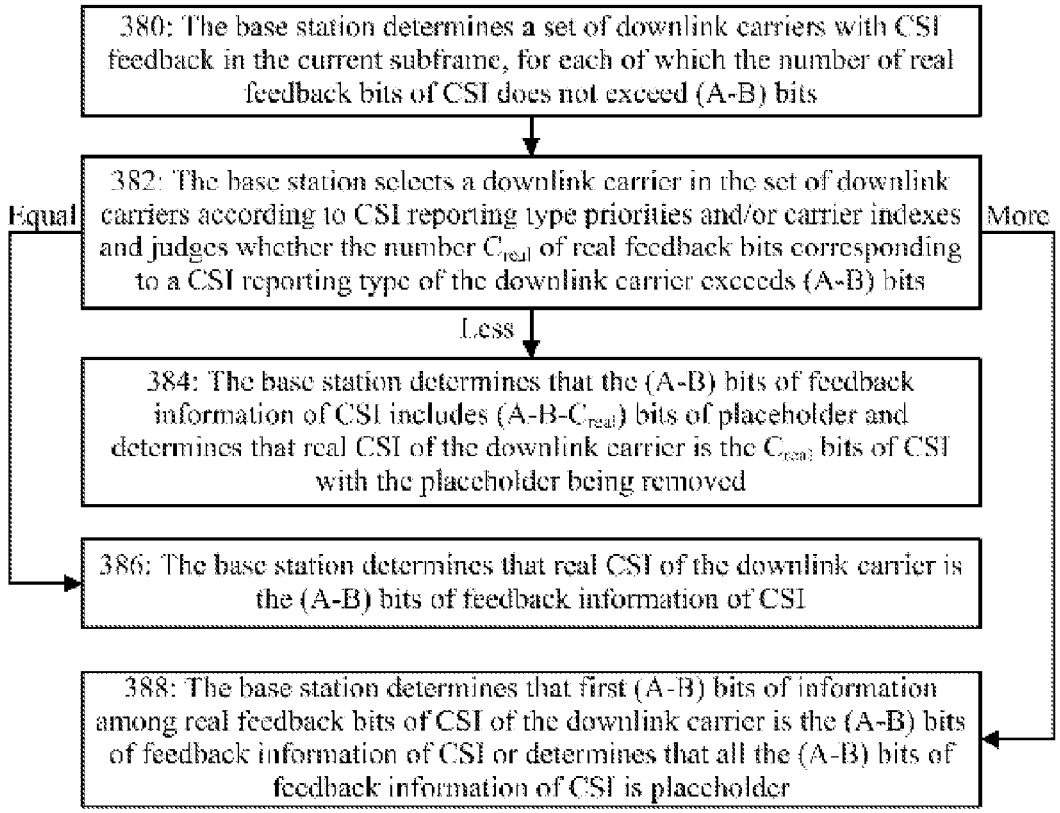
FIG. 3I is a schematic flow chart of an eighth scheme at the base station side for determining the number of transmission bits of second UCI according to the second embodiment of the invention.

Eighth Scheme:

As illustrated in FIG. 3I, the number of transmission bits of the second UCI is determined in this scheme in the following operations:

The base station determines that the number of transmission bits of CSI transmitted by the UE in the current subframe is (A-B) bits, as described in the seventh scheme with respect to reception and separation of information; and the assumed (A-B) bits of CSI information is processed as follows:

Operation 380, the base station determines a set of downlink carriers with CSI feedback in the current subframe, for each of which the number of real feedback bits of CSI does not exceed (A-B) bits.

Operation 382, the base station selects a downlink carrier in the set of downlink carriers according to CSI reporting type priorities and/or carrier indexes and judges whether the number $C_{real}$ of real feedback bits corresponding to the CSI reporting type of the downlink carrier exceeds (A-B) bits, and if the number $C_{real}$ is less than (A-B) bits, then the base station proceeds to the operation 384; if the number $C_{real}$ is equal to (A-B) bits, then the base station proceeds to the operation 386; and if the number $C_{real}$ is more than (A-B) bits, then the base station proceeds to the operation 388;

Operation 384, the base station determines that the (A-B) bits of feedback information of CSI includes (A-B-$C_{real}$) bits of placeholder and determines that real CSI of the downlink carrier is the $C_{real}$ bits of CSI with the placeholder being removed;

Operation 386, the base station determines that real CSI of the downlink carrier is the (A-B) bits of feedback information of CSI; and Operation 388, the base station determines that first (A-B) bits of information among real feedback bits of CSI of the downlink carrier is the (A-B) bits of feedback information of CSI or determines that all the (A-B) bits of feedback information of CSI is placeholder; and When the set of downlink carriers is a null set, the base station determines that the number of transmission bits of CSI transmitted by the UE in the current subframe is 0, i.e., no CSI information transmitted by the UE.

It shall be noted that at either the base station side or the UE side, the first scheme and the second scheme above are preferably applicable to separately encoded ACK/NACK and CSI, for example, ACK/NACK and CSI corresponds respectively to separate RM encoders, and encoded bits corresponding to ACK/NACK and CSI are preconfigured in higher-layer signaling or predefined as a fixed value between the UE and the base station to thereby avoid the transmission error of ACK/NACK due to the transmission error bits of CSI; and the third to eighth schemes above can be applicable to separately encoded or jointly encoded ACK/NACK and CSI, and there are a fixed number of transmitted feedback bits of CSI to thereby avoid the transmission error of ACK/NACK due to the transmission error bits of CSI.

Operation 303, after the base station determines the number of transmission bits of the first UCI and further determines the number of transmission bits of the second UCI, the base station receives concurrently the first UCI and the second UCI transmitted by the UE on a corresponding channel resource in the current subframe according to results of the determinations.

The sum of the numbers of bits of the first UCI and the second UCI does not exceed the maximum number of bits, of the concurrently transmitted a plurality of UCI, supported on the channel source.

Third Embodiment

Figure 4:
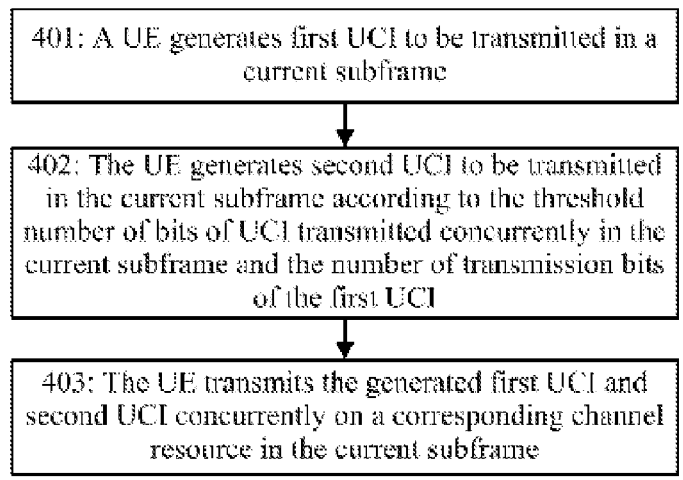
FIG. 4 is a flow chart of a process method at the UE side according to a third embodiment of the invention.

In the event that the first UCI is CSI and the second UCI is ACK/NACK, FIG. 4 illustrates a solution to processing at the UE side according to an embodiment of the invention, including the following operations:

Operation 401, a UE generates first UCI to be transmitted in a current subframe.

A process at the UE side is as follows:

The UE selects a downlink carrier in a set of downlink carriers with CSI feedback in the current subframe, according to CSI reporting type priorities and/or carrier indexes and determines the number of transmission bits corresponding to the CSI reporting type of the downlink carrier as the number of transmission bits of CSI transmitted by the UE in the current subframe.

Or the UE selects a downlink carrier in a set of downlink carriers with CSI feedback in the current subframe, according to CSI reporting type priorities and/or carrier indexes, determines that the number of transmission bits of CSI transmitted by the UE in the current subframe is the maximum number $C_{type\_max}$ of feedback bits corresponding to the CSI reporting type of the downlink carrier, and when the number C of real feedback bits corresponding to the CSI reporting type of the selected downlink carrier is less than $C_{type\_max}$, the UE appends ($C_{type\_max}$-C) bits with values "0" to the number of real feedback bits of CSI of the downlink carrier and determines that CSI to be transmitted by the UE in the current subframe is the CSI with the appended bits "0"; otherwise, the UE determines that CSI to be transmitted by the UE in the current subframe is the CSI of the selected downlink carrier.

Operation 402, the UE generates second UCI to be transmitted in the current subframe according to the threshold number of bits of UCI transmitted concurrently in the current subframe and the number of transmission bits of the first UCI.

A process at the UE side is as follows:

The UE determines the number of feedback bits of ACK/NACK to be fed back, according to the number N of configured carriers, a transmission mode of each configured carrier and the number $M_i$ of downlink subframes, on each carrier i, for which ACK/NACK needs to be fed back in the current subframe in the equation of:

$$B = \sum_{i=0}^{N-1} C_i \cdot M_i;$$

and

The UE judges whether B exceeds (A-C) bits.

When a result of the judgment shows B no exceeding (A-C) bits, the UE generates B bits of feedback information of ACK/NACK.

Otherwise, the UE bundles the ACK/NACK as predefined so that the number of feedback bits of the bundled ACK/NACK does not exceed (A-C) bits, and determines that ACK/NACK information to be transmitted by the UE in the current subframe is the bundled ACK/NACK information.

C represents the number of transmission bits of the CSI generated by the UE.

Operation 403, the UE transmits the generated first UCI and second UCI concurrently on a corresponding channel resource in the current subframe.

The sum of the numbers of bits of the first UCI and the second UCI does not exceed the maximum number of bits, of a plurality of the concurrently transmitted UCI, supported on the channel source.

Fourth Embodiment

Figure 5:
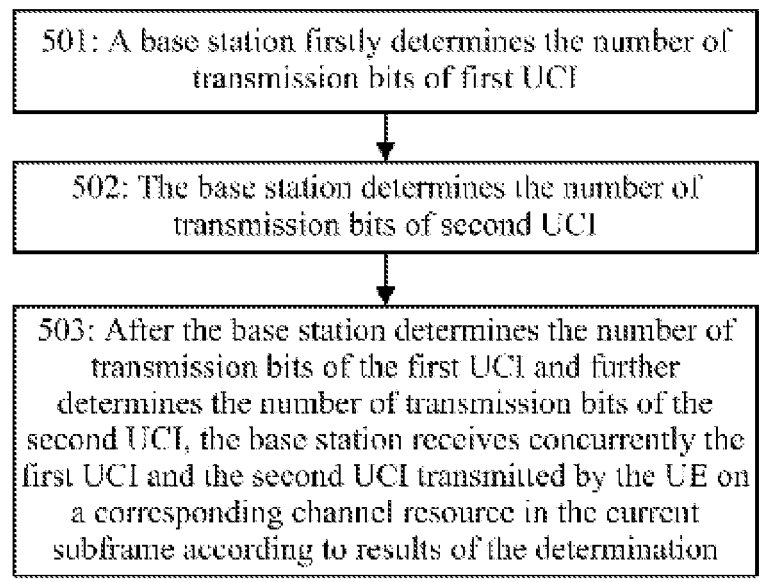
FIG. 5 is a flow chart of a process method at the base station side according to a fourth embodiment of the invention.

In the event that the first UCI is CSI and the second UCI is ACK/NACK, FIG. 5 illustrates a process solution at the base station side according to an embodiment of the invention, including the following operations:

Operation 501, an base station firstly determines the number of transmission bits of first UCI, as follows:

The base station selects a downlink carrier in a set of downlink carriers with CSI feedback in a current subframe, according to CSI reporting type priorities and/or carrier indexes and determines that the number of transmission bits of CSI in the current subframe is the number of transmission bits corresponding to the CSI reporting type of the downlink carrier.

Or the base station selects a downlink carrier in a set of downlink carriers with CSI feedback in a current subframe, according to CSI reporting type priorities and/or carrier indexes and determines that the number of transmission bits of CSI in the current subframe is the maximum number $C_{type\_max}$ of feedback bits corresponding to the CSI reporting type of the downlink carrier.

Operation 502, the base station determines the number of transmission bits of second UCI, as follows:

The base station calculates the number of feedback bits of ACK/NACK to be transmitted by the UE, according to the number N of configured carriers of a UE, a transmission mode of each configured carrier and the number $M_i$ of downlink subframes, on each carrier i, for which ACK/NACK needs to be fed back in the current subframe in the equation of:

$$B = \sum_{i=0}^{N-1} C_i \cdot M_i;$$

and

The base station judges whether B exceeds (A-C) bits.

When a result of the judgment shows B no exceeding (A-C) bits, the base station determines that the number of transmission bits of ACK/NACK transmitted by the UE in the current subframe is B.

Otherwise, the base station determines that the ACK/NACK is bundled by the UE as predefined so that the number of feedback bits of the bundled ACK/NACK does not exceed (A-C) bits, and determines that the number of transmission bits of the second UCI transmitted by the UE in the current subframe is the number of feedback bits of the ACK/NACK bundled as predefined.

In a application scenario, the predefined bundling above is preferably performed as spatial bundling, and when spatial bundling is not enough to ensure that the number of bundled feedback bits does not exceed A-B, time-domain bundling, frequency-domain bundling or other bundling can be performed.

Operation 503, after the base station determines the number of transmission bits of the first UCI and further determines the number of transmission bits of the second UCI, the base station receives concurrently the first UCI and the second UCI transmitted by the UE on a corresponding channel resource in the current subframe according to results of the determinations.

For the technical solution according to the respective embodiments above, it shall be further noted as follows:

(1) For a CSI reporting type (the type 1/1a/2/2a/2b/2c) of reporting based upon an RI value, the maximum (or minimum) number of feedback bits corresponding to the CSI reporting type is a largest (or smallest) one of the numbers of feedback bits, in the CSI reporting type, corresponding to different RI values in a current configuration of antenna ports; and for other CSI reporting types (the type 3/4/5/6), the maximum (or minimum) number of feedback bits corresponding to the CSI reporting type is the number of real feedback bits.

For example, for the reporting type 2, as depicted in Table 1, in the reporting mode 1-1 or 1-2, for a UE transmitting via 2 antenna ports, there are corresponding 6 bits at RI=1 and 8 bits at RI>1, so the maximum number of feedback bits of CSI corresponding to the CSI reporting type 2 is 8 bits and the minimum number of feedback bits of CSI corresponding to the CSI reporting type 2 is 6 bits in a 2-antenna port configuration.

In another example, for the reporting type 3, the number of report bits is independent of the value of RI, and when there is a selected downlink carrier with 4-layer transmission in a current subframe, the number of real bits of the CSI reporting type is 2 bits, so both the maximum and minimum numbers of CSI feedback bits corresponding to the CSI reporting type 3 are 2 bits.

(2) A PUCCH format used to transmit the Uplink Control Information (UCI) can be the PUCCH format 2 or 3 or another newly defined large-capacity PUCCH format, e.g., a PUCCH format based on a PUSCH transmission structure.

When the PUCCH format is the format 3, a channel resource of the PUCCH format 3 can be a channel resource corresponding to ACK/NACK or a channel resource corresponding to periodic CSI.

Preferably when ACK/NACK is configured to be transmitted using the PUCCH format 3, the channel resource of the PUCCH format 3 can be a channel resource corresponding to ACK/NACK, and when ACK/NACK is configured to be transmitted using the PUCCH format 1b with channel selection, the channel resource of the PUCCH format 3 can be a channel resource corresponding to CSI.

(3) As described above, the value of A is a predefined value (without being signaled) or a value signaled via higher-layer signaling or PDCCH signaling so that the value is any positive integer which does not exceed the maximum number of carrying bits of the PUCCH format or the difference between the maximum number of carrying bits of the PUCCH format and the number of SR bits.

When the PUCCH format is the format 3, examples will be listed as follows:

For a scenario where the number of feedback bits for judgment is particularly the number $C_{real}$ of real feedback bits of the CSI reporting type, A=21 or A=22 is predefined; or A=21 is predefined in a subframe in which an SR is transmitted, and A=22 is predefined in a subframe in which no SR is transmitted; or For a scenario where the number of feedback bits for judgment is particularly the maximum number $C_{type\_max}$ of feedback bits of the CSI reporting type, A=21 or A=22 is predefined for the type 3/4/5/6; or A=21 is predefined in a subframe in which an SR is transmitted, and A=22 is predefined in a subframe in which no SR is transmitted; and for other types than the type 3/4/5/6, any positive integer which does not exceed 21 or 22 is predefined, or is signaled via higher-layer signaling or PDCCH signaling, according to the number of feedback bits of ACK/NACK and the number of CSI feedback bits; or For each CSI reporting type, according to the number A1 of ACK/NACK bits and the maximum number A2 of feedback bits of the CSI reporting type fed back in a subframe, A=min(A1+A2, 22) or A=min(A1+A2, 22-ASR) is predefined, or is configured in signaling, or A is any positive integer which does not exceed min(A1+A2, 22) and min(A1+A2, 22-ASR), where the ASR represents the number of SR bits, which can be predefined to 1 in an SR subframe and 0 in a non-SR frame or to 1 or 0 in all the subframes.

The technical solution according to the embodiments of the invention has the following advantages over the prior art:

With the technical solution according to the embodiments of the invention, a method for transmitting ACK/NACK and periodic CSI concurrently on a channel resource corresponding a current subframe is provided, so that the number of transmission bits of second UCI transmitted concurrently with first UCI is determined dynamically according to the threshold number of bits of UCI transmitted concurrently in the current subframe and the number of transmission bit of the first UCI in the current subframe to thereby ensure that the total number of the concurrently transmitted bits of UCI will not exceed the threshold number of bits of UCI transmitted concurrently in the current subframe, and bundling of ACK/NACK and dropping of CSI can be avoided as much as possible to thereby maximally guarantee accuracy and integrity of uplink information transmission.

Figure 6:
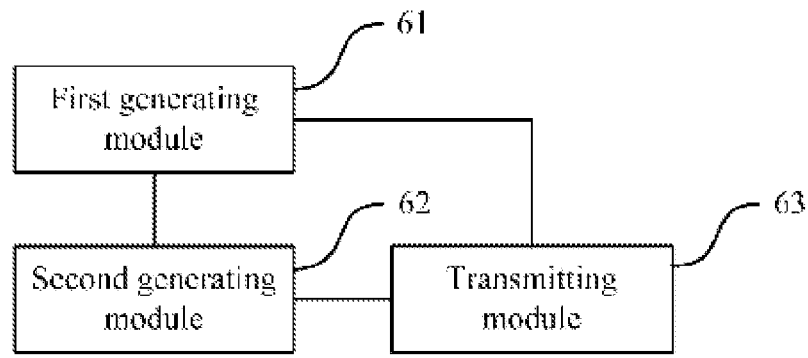
FIG. 6 is a schematic structural diagram of a UE according to an embodiment of the invention.

In order to implement the technical solution according to the embodiments of the invention, an embodiment of the invention further provides a user equipment, a schematic structural diagram of which is as illustrated in FIG. 6, including at least:

A first generating module 61 is configured to generate first UCI to be transmitted in a current subframe;

A second generating module 62 is configured to generate second UCI to be transmitted in the current frame according to the threshold number of bits of UCI transmitted concurrently in the current subframe and the number of transmission bits of the first UCI generated by the first generating module 61, the number of transmission bits of the second UCI does not exceed the difference between the threshold number of bits of UCI transmitted concurrently in the current subframe and the number of transmission bits of the first UCI; and A transmitting module 63 is configured to transmit the first UCI generated by the first generating module 61 and the second UCI generated by the second generating module 62 on a corresponding channel resource in the current subframe.

In a real application scenario,

The first UCI is Acknowledgement (ACK)/Non-Acknowledgment (NACK), and the second UCI is Channel State Information (CSI); or The first UCI is CSI, and the second UCI is ACK/NACK.

In an application scenario, when the first UCI is ACK/NACK and the second UCI is CSI, the first generating module 61 is configured:

To determine the number of transmission bits of ACK/NACK to be generated, according to the number N of configured carriers, a transmission mode of each configured carrier and the number $M_i$ of downlink subframes, on each carrier, for which ACK/NACK needs to be fed back in the current subframe in the equation of:

$$B = \sum_{i=0}^{N-1} C_i \cdot M_i;$$

and

To generate a corresponding number of transmission bits of ACK/NACK to be transmitted in the current subframe.

Where $C_i$ takes a value under the following rule:

For a carrier with single-codeword transmission, $C_i=1$, and for a carrier with multi-codeword transmission, $C_i=2$; or For a carrier with single-codeword transmission or for a carrier with multi-codeword transmission and spatial bundling, $C_i=1$, and for a carrier with multi-codeword transmission and without spatial bundling, $C_i=2$; and $M_i$ takes a value under the following rule: for a Frequency Division Duplex (FDD) system, $M_i=1$; and for a Time Division Duplex (TDD) system, $M_i$ corresponding to different aggregated carriers take the same or different values.

Furthermore when the first UCI is ACK/NACK and the second UCI is CSI, the second generating module 62 is configured to generate the second UCI to be transmitted in the current subframe in one of the following eight schemes:

First Scheme:

To determine a set of downlink carriers with CSI feedback in the current subframe, for each of which the number of feedback bits of CSI does not exceed (A-B) bits, where A represents the threshold number of bits of UCI transmitted concurrently in the current subframe, and B represents the number of transmission bits of ACK/NACK generated by the first generating module 61; and To select a downlink carrier in the set of downlink carriers according to CSI reporting type priorities and/or carrier indexes, to generate $C_{real}$ bits of real CSI feedback information of the downlink carrier and to determine that CSI to be transmitted in the current subframe is the $C_{real}$ bits of CSI of the selected downlink carrier; and When the determined set of downlink carriers is a null set, to determine no CSI to be transmitted in the current subframe.

Second Scheme:

Operation A, to select a downlink carrier in a set of downlink carriers with CSI feedback in the current subframe, according to CSI reporting type priorities and/or carrier indexes; and Operation B, to judge whether the number of feedback bits of CSI of the selected downlink carrier exceeds (A-B) bits, where A represents the threshold number of bits of UCI transmitted concurrently in the current subframe, and B represents the number of transmission bits of ACK/NACK generated by the first generating module 61; and If a result of the judgment is negative, to generate $C_{real}$ bits of real CSI feedback information of the downlink carrier and to determine that CSI to be transmitted in the current subframe is the $C_{real}$ bits of CSI of the downlink carrier; and If the result of the judgment is positive, to determine no CSI to be transmitted in the current subframe, or If the result of the judgment is positive, to remove the downlink carrier currently selected in the operation A from the set of downlink carriers and to perform the operation A again to further select a downlink carrier in the currently updated set of downlink carriers for corresponding processing of CSI thereof; and If the currently updated set of downlink carriers is a null set, to determine no CSI to be transmitted in the current subframe.

Third Scheme:

To determine a set of downlink carriers with CSI feedback in the current subframe, for each of which the maximum number of feedback bits corresponding to the CSI reporting type thereof does not exceed (A-B) bits, where A represents the threshold number of bits of UCI transmitted concurrently in the current subframe, and B represents the number of transmission bits of ACK/NACK generated by the first generating module 61; and To select a downlink carrier in the set of downlink carriers according to CSI reporting type priorities and/or carrier indexes and to determine that the number of transmission bits of CSI to be transmitted in the current subframe is the maximum number $C_{type\_max}$ of feedback bits corresponding to the CSI reporting type of the downlink carrier; and When the number $C_{real}$ of real feedback bits corresponding to the CSI reporting type of the downlink carrier is less than $C_{type\_max}$, to append ($C_{type\_max}$-$C_{real}$) bits of placeholder to $C_{real}$ bits of real CSI feedback information of the downlink carrier and to determine that CSI to be transmitted in the current subframe is the $C_{type\_max}$ bits of CSI with the appended placeholder, and When the number $C_{real}$ of real feedback bits corresponding to the CSI reporting type of the downlink carrier is equal to $C_{type\_max}$, to determine that CSI to be transmitted in the current subframe is the $C_{real}$ bits of real CSI feedback information of the downlink carrier; and When the determined set of downlink carriers is a null set, to determine no CSI to be transmitted in the current subframe.

Fourth Scheme:

Operation A, to select a downlink carrier in a set of downlink carriers with CSI feedback in the current subframe, according to CSI reporting type priorities and/or carrier indexes; and Operation B, to judge whether the maximum number $C_{type\_max}$ of feedback bits corresponding to a CSI reporting type of the downlink carrier exceeds (A-B) bits, where A represents the threshold number of bits of UCI transmitted concurrently in the current subframe, and B represents the number of transmission bits of ACK/NACK generated by the first generating module 61; and If a result of the judgment is negative, to determine that the number of transmission bits of CSI to be transmitted in the current subframe is the maximum number $C_{type\_max}$ of feedback bits corresponding to the CSI reporting type of the downlink carrier, and when the number $C_{real}$ of real feedback bits corresponding to the CSI reporting type of the downlink carrier is less than $C_{type\_max}$, to append ($C_{type\_max}$-$C_{real}$) bits of placeholder to $C_{real}$ bits of real CSI feedback information of the downlink carrier and to determine that CSI to be transmitted by the UE in the current subframe is the $C_{type\_max}$ bits of CSI with the appended placeholder, and when the number $C_{real}$ of real feedback bits corresponding to the CSI reporting type of the downlink carrier is equal to $C_{type\_max}$, to determine that CSI to be transmitted in the current subframe is the $C_{real}$ bits of real CSI feedback information of the downlink carrier; and If the result of the judgment is positive, to determine no CSI to be transmitted in the current subframe, or If the result of the judgment is positive, to remove the downlink carrier currently selected in the operation A from the set of downlink carriers and to perform the operation A again to further select a downlink carrier in the currently updated set of downlink carriers for corresponding processing of CSI thereof; and If the currently updated set of downlink carriers is a null set, to determine no CSI to be transmitted in the current subframe.

Fifth Scheme:

Operation A, to select a downlink carrier in a set of downlink carriers with CSI feedback in the current subframe, according to CSI reporting type priorities and/or carrier indexes; and Operation B, to judge whether the minimum number $C_{type\_min}$ of feedback bits corresponding to the CSI reporting type of the downlink carrier exceeds (A-B) bits, where A represents the threshold number of bits of UCI transmitted concurrently in the current subframe, and B represents the number of transmission bits of ACK/NACK generated by the first generating module 61; and If a result of the judgment is negative, to determine that the number of transmission bits of CSI to be transmitted in the current subframe is (A-B) bits, and when the number $C_{real}$ of real feedback bits corresponding to the CSI reporting type of the selected downlink carrier is less than (A-B) bits, to append (A-B-$C_{real}$) bits of placeholder to $C_{real}$ bits of real CSI feedback information of the downlink carrier and to determine that CSI to be transmitted by the UE in the current subframe is the (A-B) bits of CSI with the appended placeholder, and when the number $C_{real}$ of real feedback bits corresponding to the CSI reporting type of the downlink carrier is more than (A-B) bits, to determine that CSI to be transmitted in the current subframe is first (A-B) bits of information among the real CSI feedback bits of the downlink carrier, or to generate (A-B) bits of placeholder as CSI to be transmitted by the UE in the current subframe; and when the number $C_{real}$ of real feedback bits corresponding to the CSI reporting type of the downlink carrier is equal to (A-B) bits, to determine that CSI to be transmitted in the current subframe is the $C_{real}$ bits of real CSI of the downlink carrier; and If the result of the judgment is positive, to determine no CSI to be transmitted in the current subframe, or If the result of the judgment is positive, to remove the downlink carrier currently selected in the operation A from the set of downlink carriers and to perform the operation A again to further select a downlink carrier in the currently updated set of downlink carriers for corresponding processing of CSI thereof; and If the currently updated set of downlink carriers is a null set, to determine no CSI to be transmitted in the current subframe.

Sixth Scheme:

To determine a set of downlink carriers with CSI feedback in the current subframe, for each of which the minimum number $C_{type\_min}$ of feedback bits corresponding to the CSI reporting type thereof does not exceed (A-B) bits, where A represents the threshold number of bits of UCI transmitted concurrently in the current subframe, and B represents the number of transmission bits of ACK/NACK generated by the first generating module 61; and To select a downlink carrier in the set of downlink carriers according to CSI reporting type priorities and/or carrier indexes and to judge whether the number $C_{real}$ of real feedback bits corresponding to the CSI reporting type of the downlink carrier exceeds (A-B) bits; and When the judgment shows the number $C_{real}$ being less than (A-B) bits, to append (A-B-$C_{real}$) bits of placeholder to $C_{real}$ bits of real CSI feedback information of the downlink carrier and to determine that CSI to be transmitted in the current subframe is the (A-B) bits of CSI with the appended placeholder, When the judgment shows the number $C_{real}$ being equal to (A-B) bits, to determine that CSI to be transmitted in the current subframe is the $C_{real}$ bits of real CSI of the downlink carrier, and When the judgment shows the number $C_{real}$ being more than (A-B) bits, to determine that CSI to be transmitted in the current subframe is first (A-B) bits of information among the real CSI feedback information of the downlink carrier or to generate (A-B) bits of placeholder as CSI to be transmitted in the current subframe;

When the determined set of downlink carriers is a null set, to determine no CSI to be transmitted in the current subframe.

Seventh Scheme:

To determine that the number of transmission bits of CSI to be transmitted in the current subframe is (A-B) bits, where A represents the threshold number of bits of UCI transmitted concurrently in the current subframe, and B represents the number of transmission bits of ACK/NACK generated by the first generating module 61; and To select a downlink carrier in a set of downlink carriers with CSI feedback in the current subframe, according to CSI reporting type priorities and/or carrier indexes and to judge whether the number $C_{real}$ of real feedback bits corresponding to the CSI reporting type of the downlink carrier exceeds (A-B) bits; and When the judgment shows the number $C_{real}$ being less than (A-B) bits, to append (A-B-$C_{real}$) bits of placeholder to $C_{real}$ bits of real CSI feedback information of the downlink carrier and to determine that CSI to be transmitted in the current subframe is the (A-B) bits of CSI, with the appended placeholder, When the judgment shows the number $C_{real}$ being equal to (A-B) bits, to determine that CSI to be transmitted in the current subframe is the $C_{real}$ bits of real CSI of the downlink carrier, and When the judgment shows the number $C_{real}$ being more than (A-B) bits, to determine that CSI to be transmitted in the current subframe is first (A-B) bits of information among the real CSI feedback information of the downlink carrier or to generate (A-B) bits of placeholder as CSI to be transmitted in the current subframe; or to remove the downlink carrier selected in the operation A from the set of downlink carriers and to perform the operation A again to further select a downlink carrier in the currently updated set of downlink carriers for corresponding processing of CSI thereof, and if the currently updated set of downlink carriers is a null set, to determine no CSI to be transmitted in the current subframe.

Eighth Scheme:

To determine that the number of transmission bits of CSI to be transmitted in the current subframe is (A-B) bits, where A represents the threshold number of bits of UCI transmitted concurrently in the current subframe, and B represents the number of transmission bits of ACK/NACK generated by the first generating module 61; and To determine a set of downlink carriers with CSI feedback in the current subframe, for each of which the number of real feedback bits of CSI does not exceed (A-B) bits, to select a downlink carrier in the set of downlink carrier according to CSI reporting type priorities and/or carrier indexes and to judge whether the number $C_{real}$ of real feedback bits corresponding to a CSI reporting type of the downlink carrier exceeds (A-B) bits; and When the judgment shows the number $C_{real}$ being less than (A-B) bits, to append (A-B-$C_{real}$) bits of placeholder to $C_{real}$ bits of real CSI feedback information of the downlink carrier and to determine that CSI to be transmitted in the current subframe is the (A-B) bits of CSI with the appended placeholder, When the judgment shows the number $C_{real}$ being equal to (A-B) bits, to determine that CSI to be transmitted in the current subframe is the $C_{real}$ bits of real CSI of the downlink carrier, and When the judgment shows the number $C_{real}$ being more than (A-B) bits, to determine that CSI to be transmitted in the current subframe is first (A-B) bits of information among the real CSI feedback information of the downlink carrier or to generate (A-B) bits of placeholder as CSI to be transmitted in the current subframe; and When the determined set of downlink carriers is a null set, to generate (A-B) bits of placeholder as CSI to be transmitted in the current subframe.

Particularly, when the first UCI is CSI and the second UCI is ACK/NACK, the first generating module 61 is configured:

To select a downlink carrier in a set of downlink carriers with CSI feedback in the current subframe, according to CSI reporting type priorities and/or carrier indexes; and To determine that the number of transmission bits of CSI to be transmitted in the current subframe is the number $C_{real}$ of real feedback bits corresponding to a CSI reporting type of the downlink carrier and to determine that CSI to be transmitted in the current subframe is $C_{real}$ bits of CSI of the downlink carrier; or To determine that the number of transmission bits of CSI transmitted in the current subframe is the maximum number $C_{type\_max}$ of feedback bits corresponding to the CSI reporting type of the downlink carrier, and when the number $C_{real}$ of real feedback bits corresponding to the CSI reporting type of the downlink carrier is less than $C_{type\_max}$, to append $C_{type\_max}$-$C_{real}$ bits of placeholder to real CSI feedback information of the downlink carrier and to determine that CSI to be transmitted in the current subframe is the CSI with the appended placeholder, and when the number $C_{real}$ of real feedback bits corresponding to the CSI reporting type of the downlink carrier is equal to $C_{type\_max}$, to determine that CSI to be transmitted in the current subframe is the $C_{real}$ bits of CSI of the downlink carrier.

Furthermore when the first UCI is CSI and the second UCI is ACK/NACK, the second generating module 62 is configured:

To determine the number of feedback bits of ACK/NACK to be fed back, according to the number of configured carriers, a transmission mode of each configured carrier and the number of downlink subframes, on each carrier, for which ACK/NACK needs to be fed back in the current subframe;

To judge whether the number of feedback bits of ACK/NACK to be fed back exceeds (A-C) bits, where A represents the threshold number of bits of UCI transmitted concurrently in the current subframe, and C represents the number of transmission bits of CSI generated by the first generating module 61; and If a result of the judgment is negative, to generate a corresponding number of bits of ACK/NACK according to the number of feedback bits of ACK/NACK to be fed back and to determine that ACK/NACK to be transmitted in the current subframe is the generated ACK/NACK, and If the result of the judgment is positive, to spatially bundle ACK/NACK to be fed back so that the number of feedback bits of the spatially bundled ACK/NACK does not exceed (A-C) bits and to determine that ACK/NACK to be transmitted in the current subframe is the spatially bundled ACK/NACK.

It shall be further noted that when the current subframe is a subframe in which a Scheduling Request (SR) is transmitted, the transmitting module is configured:

To transmit the generated first UCI and second UCI and a 1-bit SR on the corresponding channel resource in the current subframe.

Figure 7:
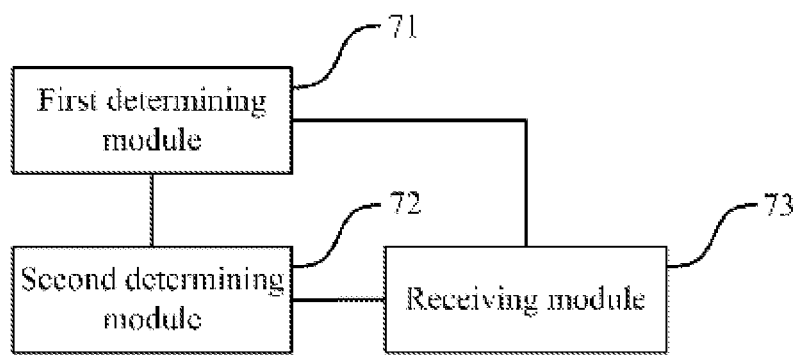
FIG. 7 is a schematic structural diagram of a base station according to an embodiment of the invention.

In another aspect, an embodiment of the invention further provides a base station, a schematic structural diagram of which is as illustrated in FIG. 7, including:

A first determining module 71 is configured to determine the number of transmission bits of first UCI to be transmitted by a UE in a current subframe;

A second determining module 72 is configured to determine the number of transmission bits of second UCI to be transmitted by the UE in the current subframe according to the threshold number of bits of UCI transmitted concurrently in the current subframe and the number of transmission bits of the first UCI determined by the first determining module 71, where the number of transmission bits of the second UCI does not exceed the difference between the threshold number of bits of UCI transmitted concurrently in the current subframe and the number of transmission bits of the first UCI; and;

A receiving module 73 is configured to receive the first UCI and the second UCI transmitted by the UE on a corresponding channel resource in the current subframe according to the number of transmission bits of the first UCI determined by the first determining module 71 and the number of transmission bits of the second UCI determined by the second determining module 72.

In a real application scenario,

The first UCI is Acknowledgement (ACK)/Non-Acknowledgment (NACK), and the second UCI is Channel State Information (CSI); or The first UCI is CSI, and the second UCI is ACK/NACK.

In an application scenario, when the first UCI is ACK/NACK and the second UCI is CSI, the first determining module 71 configured to determine the number of transmission bits of the first UCI transmitted by the UE in the current subframe is configured:

To determine the number of transmission bits of ACK/NACK transmitted by the UE in the current subframe, according to the number N of configured carriers of the UE, a transmission mode of each configured carrier and the number $M_i$ of downlink subframes, on each carrier, for which ACK/NACK needs to be fed back in the current subframe in the equation of:

$$B = \sum_{i=0}^{N-1} C_i \cdot M_i;$$

Where $C_i$ takes a value under the following rule:

For a carrier with single-codeword transmission, $C_i=1$, and for a carrier with multi-codeword transmission, $C_i=2$; or For a carrier with single-codeword transmission or for a carrier with multi-codeword transmission and spatial bundling, $C_i=1$, and for a carrier with multi-codeword transmission and without spatial bundling, $C_i=2$; and $M_i$ takes a value under the following rule: for a Frequency Division Duplex (FDD) system, $M_i=1$; and for a Time Division Duplex (TDD) system, $M_i$ corresponding to different aggregated carriers take the same or different values.

Furthermore when the first UCI is ACK/NACK and the second UCI is CSI, the second determining module 72 determines the number of transmission bits of the second UCI transmitted by the UE in the current subframe in one of the following eight schemes:

First Scheme:

To determine a set of downlink carriers with CSI feedback in the current subframe, for each of which the number of feedback bits of CSI does not exceed (A-B) bits, where A represents the threshold number of bits of UCI transmitted concurrently in the current subframe, and B represents the number of transmission bits of ACK/NACK, transmitted by the UE in the current subframe, determined by the first determining module 71; and To select a downlink carrier in the set of downlink carriers according to CSI reporting type priorities and/or carrier indexes and to determine that the number of transmission bits of CSI transmitted by the UE in the current subframe is the number $C_{real}$ of real feedback bits corresponding to the CSI reporting type of the selected downlink carrier; and When the determined set of downlink carriers is a null set, to determine that the number of transmission bits of CSI transmitted by the UE in the current subframe is 0.

Second Scheme:

Operation A, to select a downlink carrier in a set of downlink carriers with CSI feedback in the current subframe, according to CSI reporting type priorities and/or carrier indexes; and Operation B, to judge whether the number of transmission bits corresponding to a CSI reporting type of the selected downlink carrier exceeds (A-B) bits, where A represents the threshold number of bits of UCI transmitted concurrently in the current subframe, and B represents the number of transmission bits of ACK/NACK, transmitted by the UE in the current subframe, determined by the first determining module 71; and If a result of the judgment is negative, to determine that the number of transmission bits of CSI transmitted by the UE in the current subframe is the number $C_{real}$ of real feedback bits corresponding to the CSI reporting type of the downlink carrier, and If the result of the judgment is positive, to determine that the number of transmission bits of CSI transmitted by the UE in the current subframe is 0; or If the result of the judgment is positive, to remove the downlink carrier currently selected in the operation A from the set of downlink carriers and to perform the operation A again to further select a downlink carrier in the currently updated set of downlink carriers for corresponding processing of CSI thereof; and If the currently updated downlink carriers is a null set, to determine that the number of transmission bits of CSI transmitted by the UE in the current subframe is 0.

Third Scheme:

To determine a set of downlink carriers with CSI feedback in the current subframe, for each of which the maximum number of feedback bits corresponding to the CSI reporting type does not exceed (A-B) bit, where A represents the threshold number of bits of UCI transmitted concurrently in the current subframe, and B represents the number of transmission bits of ACK/NACK, transmitted by the UE in the current subframe, determined by the first determining module 71; and To select a downlink carrier in the set of downlink carriers according to CSI reporting type priorities and/or carrier indexes and to determine that the number of transmission bits of CSI transmitted in the current subframe is the maximum number of transmission bits $C_{type\_max}$ corresponding to the CSI reporting type of the downlink carrier; and When the number $C_{real}$ of real feedback bits corresponding to the CSI reporting type of the downlink carrier is less than $C_{type\_max}$, to determine that the $C_{type\_max}$ bits of CSI feedback information includes ($C_{type\_max}$-$C_{real}$) bits of placeholder and to determine that real CSI of the downlink carrier is the $C_{real}$ bits of CSI, with the placeholder being removed, and When the number $C_{real}$ of real feedback bits corresponding to the CSI reporting type of the downlink carrier is equal to $C_{type\_max}$, to determine that real CSI of the downlink carrier is the $C_{type\_max}$ bits of CSI feedback information; and When the determined set of downlink carriers is a null set, to determine that the number of transmission bits of CSI transmitted by the UE in the current subframe is 0.

Fourth Scheme:

Operation A, to select a downlink carrier in a set of downlink carriers with CSI feedback in the current subframe, according to CSI reporting type priorities and/or carrier indexes; and Operation B, to judge whether the maximum number $C_{type\_max}$ of feedback bits corresponding to the CSI reporting type of the downlink carrier exceeds (A-B) bits, where A represents the threshold number of bits of UCI transmitted concurrently in the current subframe, and B represents the number of transmission bits of ACK/NACK, transmitted by the UE in the current subframe, determined by the first determining module 71; and If a result of the judgment is negative, to determine that the number of transmission bits of CSI transmitted by the UE in the current subframe is the maximum number $C_{type\_max}$ of feedback bits corresponding to the CSI reporting type of the downlink carrier, and when the number $C_{real}$ of real feedback bits corresponding to the CSI reporting type of the downlink carrier is less than $C_{type\_max}$, to determine that the $C_{type\_max}$ bits of CSI feedback information includes ($C_{type\_max}$) bits of placeholder and to determine that real CSI of the downlink carrier is the $C_{real}$ bits of CSI with the placeholder being removed, and when the number $C_{real}$ of real feedback bits corresponding to the CSI reporting type of the downlink carrier is equal to $C_{type\_max}$, to determine that real CSI of the downlink carrier is the $C_{type\_max}$ bits of CSI feedback information; and If the result of the judgment is positive, to determine that the number of transmission bits of CSI transmitted by the UE in the current subframe is 0; or If the result of the judgment is positive, to remove the downlink carrier currently selected in the operation A from the set of downlink carriers and to perform the operation A again to further select a downlink carrier in the currently updated set of downlink carriers for corresponding processing of CSI thereof; and If the currently updated set of downlink carriers is a null set, to determine that the number of transmission bits of CSI transmitted by the UE in the current subframe is 0.

Fifth Scheme:

Operation A, to select a downlink carrier in a set of downlink carriers with CSI feedback in the current subframe, according to CSI reporting type priorities and/or carrier indexes; and Operation B, to judge whether the minimum number $C_{type\_min}$ of feedback bits corresponding to the CSI reporting type of the downlink carrier exceeds (A-B) bits, where A represents the threshold number of bits of UCI transmitted concurrently in the current subframe, and B represents the number of transmission bits of ACK/NACK, transmitted by the UE in the current subframe, determined by the first determining module 71; and If a result of the judgment is negative, to determine that the number of transmission bits of CSI transmitted by the UE in the current subframe is (A-B) bits, and when the number $C_{real}$ of real feedback bits corresponding to the CSI reporting type of the downlink carrier is less than (A-B) bits, to determine that the (A-B) bits of feedback information of CSI includes (A-B-$C_{real}$) bits of placeholder and to determine that real CSI of the downlink carrier is the $C_{real}$ bits of CSI with the placeholder being removed; when the number $C_{real}$ of real feedback bits corresponding to the CSI reporting type of the downlink carrier is more than (A-B) bits, to determine that first (A-B) bits of information among real feedback bits of CSI of the downlink carrier is the (A-B) bits of feedback information of CSI or to determine that all the (A-B) bits of feedback information of CSI is placeholder; and when the number $C_{real}$ of real feedback bits corresponding to the CSI reporting type of the downlink carrier is equal to (A-B) bits, to determine that real CSI of the downlink carrier is the (A-B) bits of feedback information of CSI; and If the result of the judgment is positive, to determine that the number of transmission bits of CSI transmitted by the UE in the current subframe is 0; or If the result of the judgment is positive, to remove the downlink carrier selected in the operation A from the set of downlink carriers and to perform the operation A again to further select a downlink carrier in the currently updated set of downlink carriers for corresponding processing of CSI thereof; and If the currently updated set of downlink carriers is a null set, to determine that the number of transmission bits of CSI transmitted by the UE in the current subframe is 0.

Sixth Scheme:

To determine a set of downlink carriers with CSI feedback in the current subframe, for each of which the minimum number $C_{type\_min}$ of feedback bits corresponding to the CSI reporting type thereof does not exceed (A-B) bits, where A represents the threshold number of bits of UCI transmitted concurrently in the current subframe, and B represents the number of transmission bits of ACK/NACK, transmitted by the UE in the current subframe, determined by the first determining module 71; and When the set of downlink carriers is not a null set, to determine that the number of transmission bits of CSI transmitted by the UE in the current subframe is (A-B) bits, to select a downlink carrier in the set of downlink carriers according to CSI reporting type priorities and/or carrier indexes and to judge whether the number $C_{real}$ of real feedback bits corresponding to the CSI reporting type of the downlink carrier exceeds (A-B) bits; and When the judgment shows the number $C_{real}$ being less than (A-B) bits, to determine that the (A-B) bits of CSI feedback information includes (A-B-$C_{real}$) bits of placeholder and to determine that real CSI of the downlink carrier is the $C_{real}$ bits of CSI with the placeholder being removed, When the judgment shows the number $C_{real}$ being equal to (A-B) bits, to determine that real CSI of the downlink carrier is the (A-B) bits of CSI feedback information, and When the judgment shows the number $C_{real}$ being more than (A-B) bits, to determine that first (A-B) bits of information among real feedback bits of CSI of the downlink carrier is the (A-B) bits of CSI feedback information or to determine that all the (A-B) bits of CSI feedback information is placeholder; and When the set of downlink carriers is a null set, to determine that the number of transmission bits of CSI transmitted by the UE in the current subframe is 0.

Seventh Scheme:

To determine that the number of transmission bits of CSI transmitted by the UE in the current subframe is (A-B) bits, where A represents the threshold number of bits of UCI transmitted concurrently in the current subframe, and B represents the number of transmission bits of ACK/NACK, transmitted by the UE in the current subframe, determined by the first determining module 71; and To select a downlink carrier in a set of downlink carriers with CSI feedback in the current subframe, according to CSI reporting type priorities and/or carrier indexes and to judge whether the number $C_{real}$ of real feedback bits corresponding to a CSI reporting type of the downlink carrier exceeds (A-B) bits; and When the judgment shows the number $C_{real}$ being less than (A-B) bits, to determine that the (A-B) bits of CSI feedback information includes (A-B-$C_{real}$) bits of placeholder and to determine that real CSI of the downlink carrier is the $C_{real}$ bits of CSI with the placeholder being removed, When the judgment shows the number $C_{real}$ being equal to (A-B) bits, to determine that real CSI of the downlink carrier is the (A-B) bits of CSI feedback information, and When the judgment shows the number $C_{real}$ being more than (A-B) bits, to determine that first (A-B) bits of information among real feedback bits of CSI of the downlink carrier is the (A-B) bits of CSI feedback information or to determine that all the (A-B) bits of CSI feedback information is placeholder; or to remove the downlink carrier selected in the operation A from the set of downlink carriers and to perform the operation A again to further select a downlink carrier in the currently updated set of downlink carriers for corresponding processing of CSI thereof, and if the currently updated set of downlink carriers is a null set, to determine that the number of transmission bits of CSI transmitted by the UE in the current subframe is 0.

Eighth Scheme:

To determine that the number of transmission bits of CSI transmitted by the UE in the current subframe is (A-B) bits, where A represents the threshold number of bits of UCI transmitted concurrently in the current subframe, and B represents the number of transmission bits of ACK/NACK, transmitted by the UE in the current subframe, determined by the first determining module 71; and To determine a set of downlink carriers with CSI feedback in the current subframe, for each of which the number of real feedback bits of CSI does not exceed (A-B) bits, to select a downlink carrier in the set of downlink carriers according to CSI reporting type priorities and/or carrier indexes and to judge whether the number $C_{real}$ of real feedback bits corresponding to the CSI reporting type of the downlink carrier exceeds (A-B) bits; and When the judgment shows the number $C_{real}$ being less than (A-B) bits, to determine that the (A-B) bits of CSI feedback information includes (A-B-$C_{real}$) bits of placeholder and to determine that real CSI of the downlink carrier is the $C_{real}$ bits of CSI with the placeholder being removed, When the judgment shows the number $C_{real}$ being equal to (A-B) bits, to determine that real CSI of the downlink carrier is the (A-B) bits of CSI feedback information, and When the judgment shows the number $C_{real}$ being more than (A-B) bits, to determine that first (A-B) bits of information among real feedback bits of CSI of the downlink carrier is the (A-B) bits of CSI feedback information or to determine that all the (A-B) bits of CSI feedback information is placeholder; and When the determined set of downlink carriers is a null set, to determine that the number of transmission bits of CSI transmitted by the UE in the current subframe is 0.

Furthermore when the first UCI is CSI and the second UCI is ACK/NACK, the first determining module 71 is configured:

To select a downlink carrier in a set of downlink carriers with CSI feedback in the current subframe, according to CSI reporting type priorities and/or carrier indexes; and To determine that the number of transmission bits of CSI transmitted by the UE in the current subframe is the number $C_{real}$ of real feedback bits corresponding to a CSI reporting type of the downlink carrier; or To determine that the number of transmission bits of CSI transmitted by the UE in the current subframe is the maximum number $C_{type\_max}$ of feedback bits corresponding to a CSI reporting type of the downlink carrier.

Furthermore when the first UCI is CSI and the second UCI is ACK/NACK, the second determining module 72 is configured:

To determine the number of feedback bits of ACK/NACK to be fed back, according to the number of configured carriers, a transmission mode of each configured carrier and the number of downlink subframes, on each carrier, for which ACK/NACK needs to be fed back in the current subframe;

To judge whether the number of feedback bits of ACK/NACK to be fed back exceeds (A-C) bits, where A represents the threshold number of bits of UCI transmitted concurrently in the current subframe, and C represents the number of transmission bits of CSI, transmitted by the UE in the current subframe, determined by the first determining module 71; and If a result of the judgment is negative, to determine that the number of transmission bits of ACK/NACK transmitted by the UE in the current subframe is the number of feedback bits of ACK/NACK to be fed back, and If the result of the judgment is positive, to determine that the ACK/NACK to be fed back is spatially bundled by the UE so that the number of feedback bits of the spatially bundled ACK/NACK does not exceed (A-C) bits, and to determine that the number of transmission bits of ACK/NACK transmitted by the UE in the current subframe is the number of feedback bits of the spatially bundled ACK/NACK.

Furthermore when the current subframe is a subframe in which a Scheduling Request (SR) is transmitted, the receiving module is configured:

To receive the first UCI, the second UCI and a 1-bit SR on the corresponding channel resource in the current subframe.

The technical solution according to the embodiments of the invention has the following advantages over the prior art:

With the technical solution according to the embodiments of the invention, a method for transmitting ACK/NACK and periodic CSI concurrently on a channel resource corresponding a current subframe is provided, so that the number of transmission bits of second UCI transmitted concurrently with first UCI is determined dynamically according to the threshold number of bits of UCI transmitted concurrently in the current subframe and the number of transmission bit of the first UCI in the current subframe to thereby ensure that the total number of the concurrently transmitted bits of UCI will not exceed the threshold number of bits of UCI transmitted concurrently in the current subframe, and bundling of ACK/NACK and dropping of CSI can be avoided as much as possible to thereby maximally guarantee accuracy and integrity of uplink information transmission.

Those skilled in the art can clearly appreciate from the foregoing description of the embodiments that the embodiments of the invention can be implemented in hardware or in software plus a necessary general hardware platform. Based upon such understanding, the technical solutions of the embodiments of the invention can be embodied in the form of a program product which can be stored in a nonvolatile storage medium (e.g., a CD-ROM, a U disk, a mobile hard disk, etc.) and which includes several instructions to cause a computer device (e.g., a personal computer, a server, a network device, etc.) to perform the method according to the respective embodiments of the invention.

Those skilled in the art can appreciate that the drawings are merely a schematic diagram of preferred embodiments, and the module(s) or the flow(s) may not necessarily be required to implement the embodiments of the invention.

Those skilled in the art can appreciate that the modules in the devices of the embodiments can be distributed in the devices of the embodiments as described in the embodiments or located in one or more devices different from those of the embodiments given corresponding variations. The modules of the embodiments can be combined into one module or further subdivided into a plurality of sub-modules.

The embodiments of the invention have been numbered only for the sake of a convenient description but will not represent any superiority of one embodiment to another.

The foregoing disclosure is merely illustrative of several embodiments of the invention, but the embodiments of the invention will not be limited thereto, and any variations that can occur to those skilled in the art shall come into the claimed scope of the embodiments of the invention.

The foregoing disclosure is merely illustrative of preferred embodiments of the invention but not intended to limit the invention, and any modifications, equivalent substitutions and adaptations made without departing from the sprit and principle of the invention shall come into the scope of the invention.

The invention claimed is:

1. A method for transmitting Uplink Control Information (UCI), wherein the method comprises:
generating, by a User Equipment (UE), first UCI to be transmitted in a current subframe;
generating, by the UE, second UCI to be transmitted in the current subframe according to a threshold number of bits of UCI transmitted concurrently in the current subframe and a number of transmission bits of the first UCI, wherein a number of transmission bits of the second UCI does not exceed a difference between the threshold number of bits of UCI transmitted concurrently in the current subframe and the number of transmission bits of the first UCI; and
transmitting, by the UE, the generated first UCI and second UCI on a corresponding channel resource in the current subframe.

2. The method according to claim 1, wherein when the first UCI is ACK/NACK and the second UCI is CSI, generating, by the UE, the first UCI to be transmitted in the current subframe comprises:
determining, by the UE, a number of transmission bits of ACK/NACK to be generated, according to a number N of configured carriers, a transmission mode of each configured carrier and a number $M_i$ of downlink subframes, on each carrier, for which ACK/NACK needs to be fed back in the current subframe in the equation of:

$$B = \sum_{i=0}^{N-1} C_i \cdot M_i;$$

and
generating, by the UE, a corresponding number of transmission bits of ACK/NACK to be transmitted in the current subframe;
wherein $C_i$ takes a value under the following rule:
for a carrier with single-codeword transmission, $C_i=1$, and for a carrier with multi-codeword transmission, $C_i=2$; or
for a carrier with single-codeword transmission or for a carrier with multi-codeword transmission and spatial bundling, $C_i=1$, and for a carrier with multi-codeword transmission and without spatial bundling, $C_i=2$; and
$M_i$ takes a value under the following rule: for a Frequency Division Duplex (FDD) system, $M_i=1$; and for a Time Division Duplex (TDD) system, $M_i$ corresponding to different aggregated carriers take the same or different values.

3. The method according to claim 1, wherein when the first UCI is ACK/NACK and the second UCI is CSI, the UE generates the second UCI to be transmitted in the current subframe according to the threshold number of bits of UCI transmitted concurrently in the current subframe and the number of transmission bits of the first UCI by one of the following schemes:

a first scheme:

the UE determines a set of downlink carriers with CSI feedback in the current subframe, for each of which the number of real feedback bits of CSI does not exceed (A-B) bits, wherein A represents the threshold number of bits of UCI transmitted concurrently in the current subframe, and B represents the number of transmission bits of ACK/NACK generated by the UE; and the UE selects a downlink carrier in the set of downlink carriers according to CSI reporting type priorities and/or carrier indexes, generates $C_{real}$ bits of real CSI feedback information of the downlink carrier and determines that CSI to be transmitted by the UE in the current subframe is the $C_{real}$ bits of CSI of the selected downlink carrier; and wherein when the set of downlink carriers determined by the UE is a null set, the UE determines no CSI to be transmitted in the current subframe; or a second scheme:

operation A, the UE selects a downlink carrier in a set of downlink carriers with CSI feedback in the current subframe, according to CSI reporting type priorities and/or carrier indexes; and operation B, the UE judges whether the number of feedback bits of CSI of the selected downlink carrier exceeds (A-B) bits, wherein A represents the threshold number of bits of UCI transmitted concurrently in the current subframe, and B represents the number of transmission bits of ACK/NACK generated by the UE; and if a result of the judgment is negative, then the UE generates $C_{real}$ bits of real CSI feedback information of the downlink carrier and determines that CSI to be transmitted by the UE in the current subframe is the $C_{real}$ bits of CSI of the downlink carrier; and if the result of the judgment is positive, then the UE determines no CSI to be transmitted in the current subframe, or if the result of the judgment is positive, then the UE removes the downlink carrier currently selected in the operation A from the set of downlink carriers and performs the operation A again to further select a downlink carrier in the currently updated set of downlink carriers for corresponding processing of CSI thereof; and wherein if the currently updated set of downlink carriers is a null set, then the UE determines no CSI to be transmitted in the current subframe; or a third scheme:

the UE determines a set of downlink carriers with CSI feedback in the current subframe, for each of which the maximum number of feedback bits corresponding to the CSI reporting type thereof does not exceed (A-B) bits, wherein A represents the threshold number of bits of UCI transmitted concurrently in the current subframe, and B represents the number of transmission bits of ACK/NACK generated by the UE; and the UE selects a downlink carrier in the set of downlink carriers according to CSI reporting type priorities and/or carrier indexes and determines that the number of transmission bits of CSI to be transmitted by the UE in the current subframe is the maximum number $C_{type\_max}$ of feedback bits corresponding to the CSI reporting type of the downlink carrier; and wherein when the number $C_{real}$ of real feedback bits corresponding to the CSI reporting type of the downlink carrier is less than $C_{type\_max}$, the UE appends ($C_{type\_max}$-$C_{real}$) bits of placeholder to $C_{real}$ bits of real CSI feedback information of the downlink carrier and determines that CSI to be transmitted by the UE in the current subframe is the $C_{type\_max}$ bits of CSI with the appended placeholder, and when the number $C_{real}$ of real feedback bits corresponding to the CSI reporting type of the downlink carrier is equal to $C_{type\_max}$, the UE determines that CSI to be transmitted by the UE in the current subframe is the $C_{real}$ bits of real CSI feedback information of the downlink carrier; and when the set of downlink carriers determined by the UE is a null set, the UE determines no CSI to be transmitted in the current subframe; or a fourth scheme:

operation A, the UE selects a downlink carrier in a set of downlink carriers with CSI feedback in the current subframe, according to CSI reporting type priorities and/or carrier indexes; and operation B, the UE judges whether the maximum number $C_{type\_max}$ of feedback bits corresponding to the CSI reporting type of the downlink carrier exceeds (A-B) bits, wherein A represents the threshold number of bits of UCI transmitted concurrently in the current subframe, and B represents the number of transmission bits of ACK/NACK generated by the UE; and if a result of the judgment is negative, then the UE determines that the number of transmission bits of CSI to be transmitted in the current subframe is the maximum number $C_{type\_max}$ of feedback bits corresponding to the CSI reporting type of the downlink carrier, wherein when the number $C_{real}$ of real feedback bits corresponding to the CSI reporting type of the downlink carrier is less than $C_{type\_max}$, the UE appends ($C_{type\_max}$-$C_{real}$) bits of placeholder to $C_{real}$ bits of real CSI feedback information of the downlink carrier and determines that CSI to be transmitted by the UE in the current subframe is the $C_{type\_max}$ bits of CSI with the appended placeholder, and when the number $C_{real}$ of real feedback bits corresponding to the CSI reporting type of the downlink carrier is equal to $C_{type\_max}$, the UE determines that CSI to be transmitted in the current subframe is the $C_{real}$ bits of real CSI of the downlink carrier; and if the result of the judgment is positive, then the UE determines no CSI to be transmitted in the current subframe, or if the result of the judgment is positive, then the UE removes the downlink carrier currently selected in the operation A from the set of downlink carriers and performs the operation A again to further select a downlink carrier in the currently updated set of downlink carriers for corresponding processing of CSI thereof; and wherein if the currently updated set of downlink carriers is a null set, then the UE determines no CSI to be transmitted in the current subframe; or a fifth scheme:

operation A, the UE selects a downlink carrier in a set of downlink carriers with CSI feedback in the current subframe, according to CSI reporting type priorities and/or carrier indexes; and operation B, the UE judges whether the minimum number of feedback bits $C_{type\_min}$ corresponding to the CSI reporting type of the downlink carrier exceeds (A-B) bits, wherein A represents the threshold number of bits of UCI transmitted concurrently in the current subframe, and B represents the number of transmission bits of ACK/NACK generated by the UE; and if a result of the judgment is negative, then the UE determines that the number of transmission bits of CSI to be transmitted in the current subframe is (A-B) bits; wherein when the number $C_{real}$ of real feedback bits corresponding to the CSI reporting type of the selected downlink carrier is less than (A-B) bits, the UE appends (A-B-$C_{real}$) bits of placeholder to $C_{real}$ bits of real CSI feedback information of the downlink carrier and determines that CSI to be transmitted by the UE in the current subframe is the (A-B) bits of CSI with the appended placeholder; and when the number $C_{real}$ of real feedback bits corresponding to the CSI reporting type of the downlink carrier is more than (A-B) bits, the UE determines CSI to be transmitted by the UE in the current subframe is first (A-B) bits of information among the real CSI feedback information of the downlink carrier, or the UE generates (A-B) bits of placeholder as CSI to be transmitted by the UE in the current subframe; and when the number $C_{real}$ of real feedback bits corresponding to the CSI reporting type of the downlink carrier is equal to (A-B) bits, the UE determines that CSI to be transmitted by the UE in the current subframe is the $C_{real}$ bits of real CSI of the downlink carrier; and if the result of the judgment is positive, then the UE determines no CSI to be transmitted in the current subframe, or if the result of the judgment is positive, then the UE removes the downlink carrier currently selected in the operation A from the set of downlink carriers and performs the operation A again to further select a downlink carrier in the currently updated set of downlink carriers for corresponding processing of CSI thereof; and if the currently updated set of downlink carriers is a null set, then the UE determines no CSI to be transmitted in the current subframe; or a sixth scheme:

the UE determines a set of downlink carriers with CSI feedback in the current subframe, for each of which the minimum number $C_{type\_min}$ of feedback bits corresponding to the CSI reporting type thereof does not exceed (A-B) bits, wherein A represents the threshold number of bits of UCI transmitted concurrently in the current subframe, and B represents the number of transmission bits of ACK/NACK generated by the UE; and the UE selects a downlink carrier in the set of downlink carriers according to CSI reporting type priorities and/or carrier indexes and judges whether the number $C_{real}$ of real feedback bits corresponding to the CSI reporting type of the downlink carrier exceeds (A-B) bits; and when the judgment shows the number $C_{real}$ being less than (A-B) bits, the UE appends (A-B-$C_{real}$) bits of placeholder to $C_{real}$ bits of real CSI feedback information of the downlink carrier and determines that CSI to be transmitted by the UE in the current subframe is the (A-B) bits of CSI with the appended placeholder, when the judgment shows the number $C_{real}$ being equal to (A-B) bits, the UE determines that CSI to be transmitted by the UE in the current subframe is the $C_{real}$ bits of real CSI of the downlink carrier, and when the judgment shows the number $C_{real}$ being more than (A-B) bits, the UE determines that CSI to be transmitted by the UE in the current subframe is first (A-B) bits of information among the real CSI feedback information of the downlink carrier or generates (A-B) bits of placeholder as CSI to be transmitted by the UE in the current subframe; and wherein when the set of downlink carriers determined by the UE is a null set, the UE determines no CSI to be transmitted in the current subframe; or a seventh scheme:

the UE determines that the number of transmission bits of CSI to be transmitted in the current subframe is (A-B) bits, wherein A represents the threshold number of bits of UCI transmitted concurrently in the current subframe, and B represents the number of transmission bits of ACK/NACK generated by the UE; and the UE selects a downlink carrier in a set of downlink carriers with CSI feedback in the current subframe, according to CSI reporting type priorities and/or carrier indexes and judges whether the number $C_{real}$ of real feedback bits corresponding to the CSI reporting type of the downlink carrier exceeds (A-B) bits; and when the judgment shows the number $C_{real}$ being less than (A-B) bits, the UE appends (A-B-$C_{real}$) bits of placeholder to $C_{real}$ bits of real CSI feedback information of the downlink carrier and determines that CSI to be transmitted by the UE in the current subframe is the (A-B) bits of CSI with the appended placeholder, when the judgment shows the number $C_{real}$ being equal to (A-B) bits, the UE determines that CSI to be transmitted by the UE in the current subframe is the $C_{real}$ bits of real CSI of the downlink carrier, and when the judgment shows the number $C_{real}$ being more than (A-B) bits, the UE determines that CSI to be transmitted by the UE in the current subframe is first (A-B) bits of information among the real CSI feedback information of the downlink carrier or generates (A-B) bits of placeholder as CSI to be transmitted by the UE in the current subframe; or the UE removes the downlink carrier selected in the operation A from the set of downlink carriers and performs the operation A again to further select a downlink carrier in the currently updated set of downlink carriers for corresponding processing of CSI thereof, wherein if the currently updated set of downlink carriers is a null set, then the UE determines no CSI to be transmitted in the current subframe; or an eighth scheme:

the UE determines that the number of transmission bits of CSI to be transmitted in the current subframe is (A-B) bits, wherein A represents the threshold number of bits of UCI transmitted concurrently in the current subframe, and B represents the number of transmission bits of ACK/NACK generated by the UE; and the UE determines a set of downlink carriers with CSI feedback in the current subframe, for each of which the number of real feedback bits of CSI does not exceed (A-B) bits, selects a downlink carrier in the set of downlink carrier according to CSI reporting type priorities and/or carrier indexes and judges whether the number $C_{real}$ of real feedback bits corresponding to the CSI reporting type of the downlink carrier exceeds (A-B) bits; and when the judgment shows the number $C_{real}$ being less than (A-B) bits, the UE appends (A-B-$C_{real}$) bits of placeholder to $C_{real}$ bits of real CSI feedback information of the downlink carrier and determines that CSI to be transmitted by the UE in the current subframe is the (A-B) bits of CSI with the appended placeholder, when the judgment shows the number $C_{real}$ being equal to (A-B) bits, the UE determines that CSI to be transmitted by the UE in the current subframe is the $C_{real}$ bits of real CSI of the downlink carrier, and when the judgment shows the number $C_{real}$ being more than (A-B) bits, the UE determines that CSI to be transmitted by the UE in the current subframe is first (A-B) bits of information among the real CSI feedback information of the downlink carrier or generates (A-B) bits of placeholder as CSI to be transmitted by the UE in the current subframe; and wherein when the set of downlink carriers determined by the UE is a null set, the UE generates (A-B) bits of placeholder as CSI to be transmitted by the UE in the current subframe.

4. The method according to claim 1, wherein when the first UCI is CSI, and the second UCI is ACK/NACK, generating, by the UE, the first UCI to be transmitted in the current subframe comprises:

selecting, by the UE, a downlink carrier in a set of downlink carriers with CSI feedback in the current subframe, according to CSI reporting type priorities and/or carrier indexes; and determining, by the UE, that the number of transmission bits of CSI to be transmitted in the current subframe is a number $C_{real}$ of real feedback bits corresponding to a CSI reporting type of the downlink carrier, and determining, by the UE, that CSI to be transmitted in the current subframe is $C_{real}$ bits of CSI of the downlink carrier; or determining, by the UE, that the number of transmission bits of CSI to be transmitted by the UE in the current subframe is a maximum number $C_{type\_max}$ of feedback bits corresponding to the CSI reporting type of the downlink carrier, and when the number $C_{real}$ of real feedback bits corresponding to the CSI reporting type of the downlink carrier is less than $C_{type\_max}$, appending, by the UE, ($C_{type\_max}$-$C_{real}$) bits of placeholder to real CSI feedback information of the downlink carrier and determining that CSI to be transmitted by the UE in the current subframe is the CSI with the appended placeholder, and when the number $C_{real}$ of real feedback bits corresponding to the CSI reporting type of the downlink carrier is equal to $C_{type\_max}$, determining, by the UE, that CSI to be transmitted in the current subframe is the $C_{real}$ bits of CSI of the downlink carrier.

5. The method according to claim 4, wherein when the first UCI is CSI and the second UCI is ACK/NACK, generating, by the UE, the second UCI to be transmitted in the current subframe according to the threshold number of bits of UCI transmitted concurrently in the current subframe and the number of transmission bits of the first UCI comprises:

determining, by the UE, the number of feedback bits of ACK/NACK to be fed back, according to a number of configured carriers, a transmission mode of each configured carrier and a number of downlink subframes, on each carrier, for which ACK/NACK needs to be fed back in the current subframe;

judging, by the UE, whether the number of feedback bits of ACK/NACK to be fed back exceeds (A-C) bits, wherein A represents the threshold number of bits of UCI transmitted concurrently in the current subframe, and C represents a number of transmission bits of CSI generated by the UE; and if a result of the judgment is negative, then generating, by the UE, a corresponding number of bits of ACK/NACK according to the number of feedback bits of ACK/NACK to be fed back and determining that ACK/NACK to be transmitted by the UE in the current subframe is the generated ACK/NACK, and if the result of the judgment is positive, then spatially bundling, by the UE, ACK/NACK to be fed back so that the number of feedback bits of the spatially bundled ACK/NACK does not exceed (A-C) bits, and determining that ACK/NACK to be transmitted by the UE in the current subframe is the spatially bundled ACK/NACK.

6. The method according to claim 1, wherein the maximum number $C_{type\_max}$ of feedback bits corresponding to the CSI reporting type is:

for a CSI reporting type of reporting based upon a Rank Indicator (RI) value, the maximum number $C_{type\_max}$ of feedback bits corresponding to the CSI reporting type is a largest one of the numbers of feedback bits, in the CSI reporting type, corresponding to different RI values in a current configuration; and for other CSI reporting types, the maximum number $C_{type\_max}$ of feedback bits corresponding to the CSI reporting type is the number of real feedback bits;

and/or, the threshold number A of bits is a predefined value or a value signaled via higher-layer signaling or Physical Downlink Control Channel (PDCCH) signaling, wherein the value of A is any positive integer which does not exceed the maximum number of carrying bits of an uplink transmission scheme for transmitting feedback information of ACK/NACK and feedback information of CSI concurrently in the current subframe or any positive integer which does not exceed a difference between the maximum number of carrying bits of the uplink transmission scheme and a number of SR bits.

7. The method according to claim 1, wherein when the current subframe is a subframe in which a Scheduling Request (SR) is transmitted, then:

the UE transmits the generated first UCI and second UCI and a 1-bit SR on the corresponding channel resource in the current subframe.

8. A User Equipment (UE), wherein the UE comprises:

a processor configured to generate first Uplink Control Information (UCI) to be transmitted in a current subframe; and to generate second UCI to be transmitted in the current frame according to a threshold number of bits of UCI transmitted concurrently in the current subframe and a number of transmission bits of the first UCI generated by the processor, wherein the number of transmission bits of the second UCI does not exceed a difference between the threshold number of bits of UCI transmitted concurrently in the current subframe and the number of transmission bits of the first UCI; and a transmitter configured to transmit the first UCI and the second UCI generated by the processor on a corresponding channel resource in the current subframe.

9. The UE according to claim 8, wherein when the first UCI is ACK/NACK and the second UCI is CSI, the processor is configured:

to determine a number of transmission bits of ACK/NACK to be generated, according to a number N of configured carriers, a transmission mode of each configured carrier and a number $M_i$ of downlink subframes, on each carrier, for which ACK/NACK needs to be fed back in the current subframe in the equation of:

$$B = \sum_{i=0}^{N-1} C_i \cdot M_i;$$

and
- to generate a corresponding number of transmission bits of ACK/NACK to be transmitted in the current subframe;
- wherein $C_i$ takes a value under the following rule:
- for a carrier with single-codeword transmission, $C_i=1$, and for a carrier with multi-codeword transmission, $C_i=2$; or
- for a carrier with single-codeword transmission or for a carrier with multi-codeword transmission and spatial bundling, $C_i=1$, and for a carrier with multi-codeword transmission and without spatial bundling, $C_i=2$; and
- $M_i$ takes a value under the following rule: for a Frequency Division Duplex (FDD) system, $M_i=1$; and for a Time Division Duplex (TDD) system, $M_i$ corresponding to different aggregated carriers take the same or different values;

and/or
when the first UCI is CSI and the second UCI is ACK/NACK, the processor is configured:
- to select a downlink carrier in a set of downlink carriers with CSI feedback in the current subframe, according to CSI reporting type priorities and/or carrier indexes; and
- to determine a number of transmission bits of CSI to be transmitted in the current subframe is a number $C_{real}$ of real feedback bits corresponding to a CSI reporting type of the downlink carrier and to determine CSI to be transmitted in the current subframe is $C_{real}$ bits of CSI of the downlink carrier; or
- to determine that the number of transmission bits of CSI transmitted in the current subframe is a maximum number $C_{type\_max}$ of feedback bits corresponding to the CSI reporting type of the downlink carrier, and when the number $C_{real}$ of real feedback bits corresponding to the CSI reporting type of the downlink carrier is less than $C_{type\_max}$, to append $C_{type\_max}-C_{real}$ bits of placeholder to real CSI feedback information of the downlink carrier and to determine that CSI to be transmitted in the current subframe is the CSI with the appended placeholder, and when the number $C_{real}$ of real feedback bits corresponding to the CSI reporting type of the downlink carrier is equal to $C_{type\_max}$, to determine that CSI to be transmitted in the current subframe is the $C_{real}$ bits of CSI of the downlink carrier.

10. The UE according to claim 8, wherein when the first UCI is ACK/NACK and the second UCI is CSI, the processor is configured to generate the second UCI to be transmitted in the current subframe by one of the following schemes:

a first scheme:
- to determine a set of downlink carriers with CSI feedback in the current subframe, for each of which the number of feedback bits of CSI does not exceed (A-B) bits, wherein A represents the threshold number of bits of UCI transmitted concurrently in the current subframe, and B represents the number of transmission bits of ACK/NACK generated by the processor; and
- to select a downlink carrier in the set of downlink carriers according to CSI reporting type priorities and/or carrier indexes, to generate $C_{real}$ bits of real CSI feedback information of the downlink carrier and to determine that CSI to be transmitted in the current subframe is the $C_{real}$ bits of CSI of the selected downlink carrier; and
- wherein when the determined set of downlink carriers is a null set, to determine no CSI to be transmitted in the current subframe; or a second scheme:
- operation A, to select a downlink carrier in a set of downlink carriers with CSI feedback in the current subframe, according to CSI reporting type priorities and/or carrier indexes; and
- operation B, to judge whether the number of feedback bits of CSI of the selected downlink carrier exceeds (A-B) bits, wherein A represents the threshold number of bits of UCI transmitted concurrently in the current subframe, and B represents the number of transmission bits of ACK/NACK generated by the processor; and
- if a result of the judgment is negative, to generate $C_{real}$ bits of real CSI feedback information of the downlink carrier and to determine that CSI to be transmitted in the current subframe is the $C_{real}$ bits of CSI of the downlink carrier; and
- if the result of the judgment is positive, to determine no CSI to be transmitted in the current subframe, or
- if the result of the judgment is positive, to remove the downlink carrier currently selected in the operation A from the set of downlink carriers and to perform the operation A again to further select a downlink carrier in the currently updated set of downlink carriers for corresponding processing of CSI thereof; and
- wherein if the currently updated set of downlink carriers is a null set, to determine no CSI to be transmitted in the current subframe; or a third scheme:
- to determine a set of downlink carriers with CSI feedback in the current subframe, for each of which the maximum number of feedback bits corresponding to the CSI reporting types thereof does not exceed (A-B) bits, wherein A represents the threshold number of bits of UCI transmitted concurrently in the current subframe, and B represents the number of transmission bits of ACK/NACK generated by the processor; and
- to select a downlink carrier in the set of downlink carriers according to CSI reporting type priorities and/or carrier indexes and to determine that the number of transmission bits of CSI to be transmitted in the current subframe is the maximum number $C_{type\_max}$ of feedback bits corresponding to the CSI reporting type of the downlink carrier; and
- wherein when the number $C_{real}$ of real feedback bits corresponding to the CSI reporting type of the downlink carrier is less than $C_{type\_max}$, to append ($C_{type\_max}-C_{real}$) bits of placeholder to $C_{real}$ bits of real CSI feedback information of the downlink carrier and to determine that CSI to be transmitted in the current subframe is the $C_{type\_max}$ bits of CSI with the appended placeholder, and
- when the number $C_{real}$ of real feedback bits corresponding to the CSI reporting type of the downlink carrier is equal to $C_{type\_max}$, to determine that CSI to be transmitted in the current subframe is the $C_{real}$ bits of real CSI feedback information of the downlink carrier; and
- wherein when the determined set of downlink carriers is a null set, to determine no CSI to be transmitted in the current subframe; or a fourth scheme:

operation A, to select a downlink carrier in a set of downlink carriers with CSI feedback in the current subframe, according to CSI reporting type priorities and/or carrier indexes; and operation B, to judge whether the maximum number $C_{type\_max}$ of feedback bits corresponding to the CSI reporting type of the downlink carrier exceeds (A-B) bits, wherein A represents the threshold number of bits of UCI transmitted concurrently in the current subframe, and B represents the number of transmission bits of ACK/NACK generated by the processor; and if a result of the judgment is negative, to determine that the number of transmission bits of CSI to be transmitted in the current subframe is the maximum number $C_{type\_max}$ of feedback bits corresponding to the CSI reporting type of the downlink carrier, wherein when the number $C_{real}$ of real feedback bits corresponding to the CSI reporting type of the downlink carrier is less than $C_{type\_max}$, to append $(C_{type\_max}-C_{real})$ bits of placeholder to $C_{real}$ bits of real CSI feedback information of the downlink carrier and to determine that CSI to be transmitted by the UE in the current subframe is the $C_{type\_max}$ bits of CSI with the appended placeholder, and when the number $C_{real}$ of real feedback bits corresponding to the CSI reporting type of the downlink carrier is equal to $C_{type\_max}$, to determine that CSI to be transmitted by the UE in the current subframe is the $C_{real}$ bits of real CSI feedback information of the downlink carrier; and if the result of the judgment is positive, to determine no CSI to be transmitted in the current subframe, or if the result of the judgment is positive, to remove the downlink carrier currently selected in the operation A from the set of downlink carriers and to perform the operation A again to further select a downlink carrier in the currently updated set of downlink carriers for corresponding processing of CSI thereof; and wherein if the currently updated set of downlink carriers is a null set, to determine no CSI to be transmitted in the current subframe; or a fifth scheme:

operation A, to select a downlink carrier in a set of downlink carriers with CSI feedback in the current subframe, according to CSI reporting type priorities and/or carrier indexes; and operation B, to judge whether the minimum number $C_{type\_min}$ of feedback bits corresponding to the CSI reporting type of the downlink carrier exceeds (A-B) bits, wherein A represents the threshold number of bits of UCI transmitted concurrently in the current subframe, and B represents the number of transmission bits of ACK/NACK generated by the processor; and if a result of the judgment is negative, to determine that the number of transmission bits of CSI to be transmitted in the current subframe is (A-B) bits; wherein when the number $C_{real}$ of real feedback bits corresponding to the CSI reporting type of the selected downlink carrier is less than (A-B) bits, to append $(A-B-C_{real})$ bits of placeholder to $C_{real}$ bits of real CSI feedback information of the downlink carrier and to determine that CSI to be transmitted by the UE in the current subframe is the (A-B) bits of CSI with the appended placeholder; and when the number $C_{real}$ of real feedback bits corresponding to the CSI reporting type of the downlink carrier is more than (A-B) bits, to determine that CSI to be transmitted by the UE in the current subframe is first (A-B) bits of information among the real CSI feedback bits of the downlink carrier, or to generate (A-B) bits of placeholder as CSI to be transmitted by the UE in the current subframe; and when the number $C_{real}$ of real feedback bits corresponding to the CSI reporting type of the downlink carrier is equal to (A-B) bits, to determine that CSI to be transmitted by the UE in the current subframe is the $C_{real}$ bits of real CSI of the downlink carrier; and if the result of the judgment is positive, to determine no CSI to be transmitted in the current subframe, or if the result of the judgment is positive, to remove the downlink carrier currently selected in the operation A from the set of downlink carriers and to perform the operation A again to further select a downlink carrier in the currently updated set of downlink carriers for corresponding processing of CSI thereof; and wherein if the currently updated set of downlink carriers is a null set, to determine no CSI to be transmitted in the current subframe; or a sixth scheme:

to determine a set of downlink carriers with CSI feedback in the current subframe, for each of which the minimum number $C_{type\_min}$ of feedback bits corresponding to the CSI reporting type thereof does not exceed (A-B) bits, wherein A represents the threshold number of bits of UCI transmitted concurrently in the current subframe, and B represents the number of transmission bits of ACK/NACK generated by the processor; and to select a downlink carrier in the set of downlink carriers according to CSI reporting type priorities and/or carrier indexes and to judge whether the number $C_{real}$ of real feedback bits corresponding to the CSI reporting type of the downlink carrier exceeds (A-B) bits; and when the judgment shows the number $C_{real}$ being less than (A-B) bits, to append $(A-B-C_{real})$ bits of placeholder to $C_{real}$ bits of real CSI feedback information of the downlink carrier and to determine that CSI to be transmitted in the current subframe is the (A-B) bits of CSI with the appended placeholder, when the judgment shows the number $C_{real}$ being equal to (A-B) bits, to determine that CSI to be transmitted in the current subframe is the $C_{real}$ bits of real CSI of the downlink carrier, and when the judgment shows the number $C_{real}$ being more than (A-B) bits, to determine that CSI to be transmitted in the current subframe is first (A-B) bits of information among the real CSI feedback information of the downlink carrier or to generate (A-B) bits of placeholder as CSI to be transmitted in the current subframe;

wherein when the determined set of downlink carriers is a null set, to determine no CSI to be transmitted in the current subframe; or a seventh scheme:

to determine that the number of transmission bits of CSI to be transmitted in the current subframe is (A-B) bits, wherein A represents the threshold number of bits of UCI transmitted concurrently in the current subframe, and B represents the number of transmission bits of ACK/NACK generated by the processor; and to select a downlink carrier in a set of downlink carriers with CSI feedback in the current subframe, according to CSI reporting type priorities and/or carrier indexes and to judge whether the number $C_{real}$ of real feedback bits corresponding to a CSI reporting type of the downlink carrier exceeds (A-B) bits; and when the judgment shows the number $C_{real}$ being less than (A-B) bits, to append (A-B-$C_{real}$) bits of placeholder to $C_{real}$ bits of real CSI feedback information of the downlink carrier and to determine that CSI to be transmitted in the current subframe is the (A-B) bits of CSI with the appended placeholder, when the judgment shows the number $C_{real}$ being equal to (A-B) bits, to determine that CSI to be transmitted in the current subframe is the $C_{real}$ bits of real CSI of the downlink carrier, and when the judgment shows the number $C_{real}$ being more than (A-B) bits, to determine that CSI to be transmitted in the current subframe is first (A-B) bits of information among the real CSI feedback information of the downlink carrier or to generate (A-B) bits of placeholder as CSI to be transmitted in the current subframe; or to remove the downlink carrier selected in the operation A from the set of downlink carriers and to perform the operation A again to further select a downlink carrier in the currently updated set of downlink carriers for corresponding processing of CSI thereof, wherein if the currently updated set of downlink carriers is a null set, to determine no CSI to be transmitted in the current subframe; or an eighth scheme:

to determine that the number of transmission bits of CSI to be transmitted in the current subframe is (A-B) bits, wherein A represents the threshold number of bits of UCI transmitted concurrently in the current subframe, and B represents the number of transmission bits of ACK/NACK generated by the processor; and to determine a set of downlink carriers with CSI feedback in the current subframe, for each of which the number of real feedback bits of CSI does not exceed (A-B) bits, to select a downlink carrier in the set of downlink carrier according to CSI reporting type priorities and/or carrier indexes and to judge whether the number $C_{real}$ of real feedback bits corresponding to the CSI reporting type of the downlink carrier exceeds (A-B) bits; and when the judgment shows the number $C_{real}$ being less than (A-B) bits, to append (A-B-$C_{real}$) bits of placeholder to $C_{real}$ bits of real CSI feedback information of the downlink carrier and to determine that CSI to be transmitted in the current subframe is the (A-B) bits of CSI with the appended placeholder, when the judgment shows the number $C_{real}$ being equal to (A-B) bits, to determine that CSI to be transmitted in the current subframe is the $C_{real}$ bits of real CSI of the downlink carrier, and when the judgment shows the number $C_{real}$ being more than (A-B) bits, to determine that CSI to be transmitted in the current subframe is first (A-B) bits of information among the real CSI feedback information of the downlink carrier or to generate (A-B) bits of placeholder as CSI to be transmitted in the current subframe; and wherein when the determined set of downlink carriers is a null set, to generate (A-B) bits of placeholder as CSI to be transmitted in the current subframe;

and/or, when the first UCI is CSI and the second UCI is ACK/NACK, the processor is configured:

to determine the number of feedback bits of ACK/NACK to be fed back, according to a number of configured carriers, a transmission mode of each configured carrier and a number of downlink subframes, on each carrier, for which ACK/NACK needs to be fed back in the current subframe;

to judge whether the number of feedback bits of ACK/NACK to be fed back exceeds (A-C) bits, wherein A represents the threshold number of bits of UCI transmitted concurrently in the current subframe, and C represents a number of transmission bits of CSI generated by the processor; and if a result of the judgment is negative, to generate a corresponding number of bits of ACK/NACK according to the number of feedback bits of ACK/NACK to be fed back and to determine that ACK/NACK to be transmitted in the current subframe is the generated ACK/NACK, and if the result of the judgment is positive, to spatially bundle ACK/NACK to be fed back so that the number of feedback bits of the spatially bundled ACK/NACK does not exceed (A-C) bits and to determine that ACK/NACK to be transmitted in the current subframe is the spatially bundled ACK/NACK.

11. The UE according to claim 8, wherein when the current subframe is a subframe in which a Scheduling Request (SR) is transmitted, the transmitter is configured:

to transmit the generated first UCI and second UCI and a 1-bit SR on the corresponding channel resource in the current subframe.

12. A method for transmitting Uplink Control Information (UCI), wherein the method comprises:

determining, by a base station, a number of transmission bits of first UCI transmitted by a User Equipment (UE) in a current subframe;

determining, by the base station, a number of transmission bits of second UCI transmitted by the UE in the current subframe, according to a threshold number of bits of UCI transmitted concurrently in the current subframe and the number of transmission bits of the first UCI, wherein the number of transmission bits of the second UCI does not exceed a difference between the threshold number of bits of UCI transmitted concurrently in the current subframe and the number of transmission bits of the first UCI; and receiving, by the base station, the first UCI and the second UCI transmitted by the UE on a corresponding channel resource according to the number of transmission bits of the first UCI and the number of transmission bits of the second UCI in the current subframe.

13. The method according to claim 12, wherein when the first UCI is ACK/NACK and the second UCI is CSI, determining, by the base station, the number of transmission bits of the first UCI transmitted by the UE in the current subframe comprises:

determining, by the base station, a number of transmission bits of ACK/NACK transmitted by the UE in the current subframe according to a number N of configured carriers of the UE, a transmission mode of each configured carrier and a number $M_i$ of downlink subframes, on each carrier i, for which ACK/NACK needs to be fed back in a current subframe in the equation of:

$$B = \sum_{i=0}^{N-1} C_i \cdot M_i;$$

wherein $C_i$ takes a value under the following rule:

for a carrier with single-codeword transmission, $C_i=1$, and for a carrier with multi-codeword transmission, $C_i=2$; or for a carrier with single-codeword transmission or for a carrier with multi-codeword transmission and spatial bundling, $C_i=1$, and for a carrier with multi-codeword transmission and without spatial bundling, $C_i=2$; and $M_i$ takes a value under the following rule: for a Frequency Division Duplex (FDD) system, $M_i=1$; and for a Time Division Duplex (TDD) system, $M_i$ corresponding to different aggregated carriers take the same or different values;

and/or when the first UCI is CSI and the second UCI is ACK/NACK, determining, by the base station, the number of transmission bits of the first UCI transmitted by the UE in the current subframe comprises:

selecting, by the base station, a downlink carrier in a set of downlink carriers with CSI feedback in a current subframe, according to CSI reporting type priorities and/or carrier indexes; and determining, by the base station, that the number of transmission bits of CSI transmitted by the UE in the current subframe is a number $C_{real}$ of real feedback bits corresponding to a CSI reporting type of the downlink carrier; or determining, by the base station, that the number of transmission bits of CSI transmitted by the UE in the current subframe is a maximum number $C_{type\_max}$ of feedback bits corresponding to the CSI reporting type of the downlink carrier.

14. The method according to claim 12, wherein when the first UCI is ACK/NACK and the second UCI is CSI, the base station determines the number of transmission bits of the second UCI transmitted by the UE in the current subframe according to the threshold number of bits of UCI transmitted concurrently in the current subframe and the number of transmission bits of the first UCI by one of the following schemes:

a first scheme:

the base station determines a set of downlink carriers with CSI feedback in the current subframe, for each of which the number of feedback bits of CSI does not exceed (A-B) bits, wherein A represents the threshold number of bits of UCI transmitted concurrently in the current subframe, and B represents the number of transmission bits of ACK/NACK, transmitted by the UE in the current subframe, determined by the base station; and the base station selects a downlink carrier in the set of downlink carriers according to CSI reporting type priorities and/or carrier indexes and determines that the number of transmission bits of ACK/NACK, transmitted by the UE in the current subframe, determined by the base station is the number $C_{real}$ of feedback bits corresponding to a CSI reporting type of the selected downlink carrier; and wherein when the set of downlink carriers determined by the base station is a null set, the base station determines that the number of transmission bits of CSI transmitted by the UE in the current subframe is 0; or a second scheme:

operation A, the base station selects a downlink carrier in a set of downlink carriers with CSI feedback in the current subframe, according to CSI reporting type priorities and/or carrier indexes; and operation B, the base station judges whether the number of transmission bits corresponding to the CSI reporting type of the selected downlink carrier exceeds (A-B) bits, wherein A represents the threshold number of bits of UCI transmitted concurrently in the current subframe, and B represents the number of transmission bits of ACK/NACK, transmitted by the UE in the current subframe, determined by the base station; and if a result of the judgment is negative, then the base station determines that the number of transmission bits of CSI transmitted by the UE in the current subframe is a number $C_{real}$ of real feedback bits corresponding to the CSI reporting type of the downlink carrier, and if the result of the judgment is positive, then the base station determines that the number of transmission bits of CSI transmitted by the UE in the current subframe is 0; or if the result of the judgment is positive, then the base station removes the downlink carrier currently selected in the operation A from the set of downlink carriers and performs the operation A again to further select a downlink carrier in the currently updated set of downlink carriers for corresponding processing of CSI thereof; and wherein if the currently updated downlink carriers is a null set, the base station determines that the number of transmission bits of CSI transmitted by the UE in the current subframe is 0; or a third scheme:

the base station determines a set of downlink carriers with CSI feedback in the current subframe, for each of which the maximum number of feedback bits corresponding to the CSI reporting type thereof does not exceed (A-B) bits, wherein A represents the threshold number of bits of UCI transmitted concurrently in the current subframe, and B represents the number of transmission bits of ACK/NACK, transmitted by the UE in the current subframe, determined by the base station; and the base station selects a downlink carrier in the set of downlink carriers according to CSI reporting type priorities and/or carrier indexes and determines that the number of transmission bits of CSI transmitted by the UE in the current subframe is the maximum number of transmission bits $C_{type\_max}$ corresponding to the CSI reporting type of the downlink carrier; and wherein when the number $C_{real}$ of real feedback bits corresponding to the CSI reporting type of the downlink carrier is less than $C_{type\_max}$, the base station determines that the $C_{type\_max}$ bits of CSI feedback information comprises ($C_{type\_max}$-$C_{real}$) bits of placeholder and determines that real CSI of the downlink carrier is the $C_{real}$ bits of CSI with the placeholder being removed, and when the number $C_{real}$ of real feedback bits corresponding to the CSI reporting type of the downlink carrier is equal to $C_{type\_max}$, the base station determines that real CSI of the downlink carrier is the $C_{type\_max}$ bits of CSI feedback information; and when the determined set of downlink carriers is a null set, the base station determines that the number of transmission bits of CSI transmitted by the UE in the current subframe is 0; or a fourth scheme:

operation A, the base station selects a downlink carrier in a set of downlink carriers with CSI feedback in the current subframe, according to CSI reporting type priorities and/or carrier indexes; and operation B, the base station judges whether the maximum number $C_{type\_max}$ of feedback bits corresponding to the CSI reporting type of the downlink carrier exceeds (A-B) bits, wherein A represents the threshold number of bits of UCI transmitted concurrently in the current subframe, and B represents the number of transmission bits of ACK/NACK, transmitted by the UE in the current subframe, determined by the base station; and if a result of the judgment is negative, then the base station determines that the number of transmission bits of CSI transmitted by the UE in the current subframe is the maximum number $C_{type\_max}$ of feedback bits corresponding to the CSI reporting type of the downlink carrier, wherein when the number $C_{real}$ of real feedback bits corresponding to the CSI reporting type of the downlink carrier is less than $C_{type\_max}$, the base station determines that the $C_{type\_max}$ bits of CSI feedback information comprises $(C_{type\_max}-C_{real})$ bits of placeholder and determines that real CSI of the selected downlink carrier is the $C_{real}$ bits of CSI with the placeholder being removed, and when the number $C_{real}$ of real feedback bits corresponding to the CSI reporting type of the downlink carrier is equal to $C_{type\_max}$, the base station determines that real CSI of the selected downlink carrier is the $C_{type\_max}$ bits of CSI feedback information; and if the result of the judgment is positive, then the base station determines that the number of transmission bits of CSI transmitted by the UE in the current subframe is 0; or if the result of the judgment is positive, then the base station removes the downlink carrier currently selected in the operation A from the set of downlink carriers and performs the operation A again to further select a downlink carrier in the currently updated set of downlink carriers for corresponding processing of CSI thereof; and wherein if the currently updated set of downlink carriers is a null set, then the base station determines that the number of transmission bits of CSI transmitted by the UE in the current subframe is 0; or a fifth scheme:

operation A, the base station selects a downlink carrier in a set of downlink carriers with CSI feedback in the current subframe, according to CSI reporting type priorities and/or carrier indexes; and operation B, the base station judges whether a minimum number $C_{type\_min}$ of feedback bits corresponding to the CSI reporting type of the downlink carrier exceeds (A-B) bits, wherein A represents the threshold number of bits of UCI transmitted concurrently in the current subframe, and B represents the number of transmission bits of ACK/NACK, transmitted by the UE in the current subframe, determined by the base station; and if a result of the judgment is negative, then the base station determines that the number of transmission bits of CSI transmitted by the UE in the current subframe is (A-B) bits, wherein when the number $C_{real}$ of real feedback bits corresponding to the CSI reporting type of the downlink carrier is less than (A-B) bits, the base station determines that the (A-B) bits of feedback information of CSI comprises $(A-B-C_{real})$ bits of placeholder and determines that real CSI of the downlink carrier is the $C_{real}$ bits of CSI with the placeholder being removed; when the number $C_{real}$ of real feedback bits corresponding to the CSI reporting type of the downlink carrier is more than (A-B) bits, the base station determines that the (A-B) bits of feedback information of CSI is first (A-B) bits of information among real feedback bits of CSI of the downlink carrier or determines that all the (A-B) bits of feedback information of CSI is placeholder; and when the number $C_{real}$ of real feedback bits corresponding to the CSI reporting type of the downlink carrier is equal to (A-B) bits, the base station determines that real CSI of the downlink carrier is the (A-B) bits of feedback information of CSI; and if the result of the judgment is positive, then the base station determines that the number of transmission bits of CSI transmitted by the UE in the current subframe is 0; or if the result of the judgment is positive, then the base station removes the downlink carrier selected in the operation A from the set of downlink carriers and performs the operation A again to further select a downlink carrier in the currently updated set of downlink carriers for corresponding processing of CSI thereof; and wherein if the currently updated set of downlink carriers is a null set, then the base station determines that the number of transmission bits of CSI transmitted by the UE in the current subframe is 0; or a sixth scheme:

the base station determines a set of downlink carriers with CSI feedback in the current subframe, for each of which the minimum number $C_{type\_min}$ of feedback bits corresponding to the CSI reporting type thereof does not exceed (A-B) bits, wherein A represents the threshold number of bits of UCI transmitted concurrently in the current subframe, and B represents the number of transmission bits of ACK/NACK, transmitted by the UE in the current subframe, determined by the base station; and when the set of downlink carriers is not a null set, the base station determines that the number of transmission bits of CSI transmitted by the UE in the current subframe is (A-B) bits, selects a downlink carrier in the set of downlink carriers according to CSI reporting type priorities and/or carrier indexes and judges whether the number $C_{real}$ of real feedback bits corresponding to the CSI reporting type of the downlink carrier exceeds (A-B) bits; and when the judgment shows the number $C_{real}$ being less than (A-B) bits, the base station determines that the (A-B) bits of CSI feedback information comprises $(A-B-C_{real})$ bits of placeholder and determines that real CSI of the downlink carrier is the $C_{real}$ bits of CSI with the placeholder being removed, when the judgment shows the number $C_{real}$ being equal to (A-B) bits, the base station determines that real CSI of the downlink carrier is the (A-B) bits of CSI feedback information, and when the judgment shows the number $C_{real}$ being more than (A-B) bits, the base station determines that first (A-B) bits of information among real feedback bits of CSI of the downlink carrier is the (A-B) bits of CSI feedback information or determines that all the (A-B) bits of CSI feedback information is placeholder; and when the set of downlink carriers is a null set, the base station determines that the number of transmission bits of CSI transmitted by the UE in the current subframe is 0; or a seventh scheme:

the base station determines that the number of transmission bits of CSI transmitted by the UE in the current subframe is (A-B) bits, wherein A represents the threshold number of bits of UCI transmitted concurrently in the current subframe, and B represents the number of transmission bits of ACK/NACK, transmitted by the UE in the current subframe, determined by the base station; and the base station selects a downlink carrier in a set of downlink carriers with CSI feedback in the current subframe, according to CSI reporting type priorities and/or carrier indexes and judges whether the number $C_{real}$ of real feedback bits corresponding to the CSI reporting type of the downlink carrier exceeds (A-B) bits; and when the judgment shows the number $C_{real}$ being less than (A-B) bits, the base station determines that the (A-B) bits of CSI feedback information comprises (A-B-$C_{real}$) bits of placeholder and determines that real CSI of the downlink carrier is the $C_{real}$ bits of CSI with the placeholder being removed, when the judgment shows the number $C_{real}$ being equal to (A-B) bits, the base station determines that real CSI of the downlink carrier is the (A-B) bits of CSI feedback information, and when the judgment shows the number $C_{real}$ being more than (A-B) bits, the base station determines that first (A-B) bits of information among real feedback bits of CSI of the downlink carrier is the (A-B) bits of CSI feedback information or determines all the (A-B) bits of CSI feedback information is placeholder; or the base stations removes the downlink carrier selected in the operation A from the set of downlink carriers and performs the operation A again to further select a downlink carrier in the currently updated set of downlink carriers for corresponding processing of CSI thereof, wherein if the currently updated set of downlink carriers is a null set, then the base station determines that the number of transmission bits of CSI transmitted by the UE in the current subframe is 0; or an eighth scheme:

the base station determines that the number of transmission bits of CSI transmitted by the UE in the current subframe is (A-B) bits, wherein A represents the threshold number of bits of UCI transmitted concurrently in the current subframe, and B represents the number of transmission bits of ACK/NACK, transmitted by the UE in the current subframe, determined by the base station; and the base station determines a set of downlink carriers with CSI feedback in the current subframe, for each of which the number of real feedback bits of CSI does not exceed (A-B) bits, selects a downlink carrier in the set of downlink carriers according to CSI reporting type priorities and/or carrier indexes and judges whether the number $C_{real}$ of real feedback bits corresponding to the CSI reporting type of the downlink carrier exceeds (A-B) bits; and when the judgment shows the number $C_{real}$ being less than (A-B) bits, the base station determines that the (A-B) bits of CSI feedback information comprises (A-B-$C_{real}$) bits of placeholder and determines that real CSI of the downlink carrier is the $C_{real}$ bits of CSI with the placeholder being removed, when the judgment shows the number $C_{real}$ being equal to (A-B) bits, the base station determines that real CSI of the downlink carrier is the (A-B) bits of CSI feedback information, and when the judgment shows the number $C_{real}$ being more than (A-B) bits, the base station determines that first (A-B) bits of information among real feedback bits of CSI of the downlink carrier is the (A-B) bits of CSI feedback information or determines that all the (A-B) bits of CSI feedback information is placeholder; and wherein when the determined set of downlink carriers is a null set, the base station determines that the number of transmission bits of CSI transmitted by the UE in the current subframe is 0;

and/or when the first UCI is CSI and the second UCI is ACK/NACK, determining, by the base station, the number of transmission bits of the second UCI, to be transmitted by the UE in the current subframe, according to the threshold number of bits of UCI transmitted concurrently in the current subframe and the number of transmission bits of the first UCI comprises:

determining, by the base station, the number of feedback bits of ACK/NACK to be fed back, according to the number of configured carriers, a transmission mode of each configured carrier and the number of downlink subframes, on each carrier, for which ACK/NACK needs to be fed back in the current subframe;

judging, by the base station, whether the number of feedback bits of ACK/NACK to be fed back exceeds (A-C) bits, wherein A represents the threshold number of bits of UCI transmitted concurrently in the current subframe, and C represents a number of transmission bits of CSI, transmitted by the UE in the current subframe, determined by the base station; and if a result of the judgment is negative, then the base station determines that the number of transmission bits of ACK/NACK transmitted by the UE in the current subframe is the number of feedback bits of ACK/NACK to be fed back, and if the result of the judgment is positive, then the base station determines that the ACK/NACK to be fed back is spatially bundled by the UE so that the number of feedback bits of the spatially bundled ACK/NACK does not exceed (A-C) bits, and determines that the number of transmission bits of ACK/NACK transmitted by the UE in the current subframe is the number of feedback bits of the spatially bundled ACK/NACK.

15. The method according to claim 12, wherein the maximum number $C_{type\_max}$ of feedback bits corresponding to the CSI reporting type is:

for a CSI reporting type of reporting based upon a Rank Indicator (RI) value, the maximum number $C_{type\_max}$ of feedback bits corresponding to the CSI reporting type is a largest one of the numbers of feedback bits, in the CSI reporting type, corresponding to different RI values in a current configuration; and for other CSI reporting types, the maximum number $C_{type\_max}$ of feedback bits corresponding to the CSI reporting type is the number of real feedback bits;

and/or, the threshold number A of bits is a predefined value or a value determined and signaled by the base station to the UE via higher-layer signaling or Physical Downlink Control Channel (PDCCH) signaling, wherein the value of A is any positive integer which does not exceed the largest number of carrying bits of an uplink transmission scheme for transmitting feedback information of ACK/NACK and feedback information of CSI concurrently in the current subframe or any positive integer which does not exceed a difference between the maximum number of carrying bits of the uplink transmission scheme and a number of SR bits.

16. The method according to claim 12, wherein when the current subframe is a subframe in which a Scheduling Request (SR) is transmitted, the method comprises:
receiving, by the base station, the first UCI, the second UCI and a 1-bit SR on the corresponding channel resource in the current subframe.

17. A base station, wherein the base station comprises:
a processor configured to determine a number of transmission bits of first Uplink Control Information (UCI) to be transmitted by a User Equipment (UE) in a current subframe; and to
determine a number of transmission bits of second UCI to be transmitted by the UE in the current subframe according to a threshold number of bits of UCI transmitted concurrently in the current subframe and the number of transmission bits of the first UCI determined, wherein the number of transmission bits of the second UCI does not exceed a difference between the threshold number of bits of UCI transmitted concurrently in the current subframe and the number of transmission bits of the first UCI; and;
a receiver configured to receive the first UCI and the second UCI transmitted by the UE on a corresponding channel resource in the current subframe according to the number of transmission bits of the first UCI and the number of transmission bits of the second UCI determined by the processor.

18. The base station according to claim 17, wherein when the first UCI is ACK/NACK and the second UCI is CSI, the processor configured to determine the number of transmission bits of the first UCI transmitted by the UE in the current subframe is configured:
to determine the number of transmission bits of ACK/NACK transmitted by the UE in the current subframe, according to a number N of configured carriers of the UE, a transmission mode of each configured carrier and a number $M_i$ of downlink subframes, on each carrier, for which ACK/NACK needs to be fed back in the current subframe in the equation of:

$$B = \sum_{i=0}^{N-1} C_i \cdot M_i;$$

wherein $C_i$ takes a value under the following rule:
for a carrier with single-codeword transmission, $C_i=1$, and for a carrier with multi-codeword transmission, $C_i=2$; or
for a carrier with single-codeword transmission or for a carrier with multi-codeword transmission and spatial bundling, $C_i=1$, and for a carrier with multi-codeword transmission and without spatial bundling, $C_i=2$; and
$M_i$ takes a value under the following rule: for a Frequency Division Duplex (FDD) system, $M_i=1$; and for a Time Division Duplex (TDD) system, $M_i$ corresponding to different aggregated carriers take the same or different values;
and/or
when the first UCI is CSI and the second UCI is ACK/NACK, the processor is configured:
to select a downlink carrier in a set of downlink carriers with CSI feedback in a current subframe, according to CSI reporting type priorities and/or carrier indexes; and
to determine that the number of transmission bits of CSI transmitted by the UE in the current subframe is a number $C_{real}$ of real feedback bits corresponding to a CSI reporting type of the downlink carrier; or
to determine that the number of transmission bits of CSI transmitted by the UE in the current subframe is a maximum number $C_{type\_max}$ of feedback bits corresponding to the CSI reporting type of the downlink carrier.

19. The base station according to claim 17, wherein when the first UCI is ACK/NACK and the second UCI is CSI, the processor determines the number of transmission bits of the second UCI transmitted by the UE in the current subframe by one of the following schemes:
a first scheme:
to determine a set of downlink carriers with CSI feedback in the current subframe, for each of which the number of feedback bits of CSI does not exceed (A-B) bits, wherein A represents the threshold number of bits of UCI transmitted concurrently in the current subframe, and B represents the number of transmission bits of ACK/NACK, transmitted by the UE in the current subframe, determined by the processor; and
to select a downlink carrier in the set of downlink carriers according to CSI reporting type priorities and/or carrier indexes and to determine that the number of transmission bits of ACK/NACK transmitted by the UE in the current subframe is the number $C_{real}$ of real feedback bits corresponding to a CSI reporting type of the selected downlink carrier; and
wherein when the determined set of downlink carriers is a null set, to determine that the number of transmission bits of CSI transmitted by the UE in the current subframe is 0; or
a second scheme:
operation A, to select a downlink carrier in a set of downlink carriers with CSI feedback in the current subframe, according to CSI reporting type priorities and/or carrier indexes; and
operation B, to judge whether the number of transmission bits corresponding to a CSI reporting type of the selected downlink carrier exceeds (A-B) bits, wherein A represents the threshold number of bits of UCI transmitted concurrently in the current subframe, and B represents the number of transmission bits of ACK/NACK, transmitted by the UE in the current subframe, determined by the processor; and
if a result of the judgment is negative, to determine that the number of transmission bits of CSI transmitted by the UE in the current subframe is a number $C_{real}$ of real feedback bits corresponding to the CSI reporting type of the downlink carrier, and
if the result of the judgment is positive, to determine that the number of transmission bits of CSI transmitted by the UE in the current subframe is 0; or
if the result of the judgment is positive, to remove the downlink carrier currently selected in the operation A from the set of downlink carriers and to perform the operation A again to further select a downlink carrier in the currently updated set of downlink carriers for corresponding processing of CSI thereof; and
wherein if the currently updated downlink carriers is a null set, to determine that the number of transmission bits of CSI transmitted by the UE in the current subframe is 0; or
a third scheme:
to determine a set of downlink carriers with CSI feedback in the current subframe, for each of which the maximum number of feedback bits corresponding to the CSI reporting type thereof does not exceed (A-B) bits, wherein A represents the threshold number of bits of UCI transmitted concurrently in the current subframe, and B represents the number of transmission bits of ACK/NACK, transmitted by the UE in the current subframe, determined by the processor; and to select a downlink carrier in the set of downlink carriers according to CSI reporting type priorities and/or carrier indexes and to determine that the number of transmission bits of CSI transmitted in the current subframe is the maximum number of transmission bits $C_{type\_max}$ corresponding to the CSI reporting type of the downlink carrier; and wherein when the number $C_{real}$ of real feedback bits corresponding to the CSI reporting type of the downlink carrier is less than $C_{type\_max}$, to determine that the $C_{type\_max}$ bits of CSI feedback information comprises $(C_{type\_max}-C_{real})$ bits of placeholder and to determine that real CSI of the downlink carrier is the $C_{real}$ bits of CSI with the placeholder being removed, and when the number $C_{real}$ of real feedback bits corresponding to the CSI reporting type of the downlink carrier is equal to $C_{type\_max}$, to determine that real CSI of the downlink carrier is the $C_{type\_max}$ bits of CSI feedback information; and when the determined set of downlink carriers is a null set, to determine that the number of transmission bits of CSI transmitted by the UE in the current subframe is 0; or a fourth scheme:

operation A, to select a downlink carrier in a set of downlink carriers with CSI feedback in the current subframe, according to CSI reporting type priorities and/or carrier indexes; and operation B, to judge whether the maximum number $C_{type\_max}$ of feedback bits corresponding to the CSI reporting type of the downlink carrier exceeds (A-B) bits, wherein A represents the threshold number of bits of UCI transmitted concurrently in the current subframe, and B represents the number of transmission bits of ACK/NACK, transmitted by the UE in the current subframe, determined by the processor; and if a result of the judgment is negative, to determine that the number of transmission bits of CSI transmitted by the UE in the current subframe is the maximum number $C_{type\_max}$ of feedback bits corresponding to the CSI reporting type of the downlink carrier, wherein when the number $C_{real}$ of real feedback bits corresponding to the CSI reporting type of the downlink carrier is less than $C_{type\_max}$, to determine that the $C_{type\_max}$ bits of CSI feedback information comprises $(C_{type\_max}-C_{real})$ bits of placeholder and to determine that real CSI of the downlink carrier is the $C_{real}$ bits of CSI with the placeholder being removed, and when the number $C_{real}$ of real feedback bits corresponding to the CSI reporting type of the downlink carrier is equal to $C_{type\_max}$, to determine that real CSI of the downlink carrier is the $C_{type\_max}$ bits of CSI feedback information; and if the result of the judgment is positive, to determine that the number of transmission bits of CSI transmitted by the UE in the current subframe is 0; or if the result of the judgment is positive, to remove the downlink carrier currently selected in the operation A from the set of downlink carriers and to perform the operation A again to further select a downlink carrier in the currently updated set of downlink carriers for corresponding processing of CSI thereof; and wherein if the currently updated set of downlink carriers is a null set, to determine that the number of transmission bits of CSI transmitted by the UE in the current subframe is 0; or a fifth scheme:

operation A, to select a downlink carrier in a set of downlink carriers with CSI feedback in the current subframe, according to CSI reporting type priorities and/or carrier indexes; and operation B, to judge whether a minimum number $C_{type\_min}$ of feedback bits corresponding to the CSI reporting type of the downlink carrier exceeds (A-B) bits, wherein A represents the threshold number of bits of UCI transmitted concurrently in the current subframe, and B represents the number of transmission bits of ACK/NACK, transmitted by the UE in the current subframe, determined by the processor; and if a result of the judgment is negative, to determine that the number of transmission bits of CSI transmitted by the UE in the current subframe is (A-B) bits, wherein when the number $C_{real}$ of real feedback bits corresponding to the CSI reporting type of the downlink carrier is less than (A-B) bits, to determine that the (A-B) bits of feedback information of CSI comprises $(A-B-C_{real})$ bits of placeholder and to determine that real CSI of the downlink carrier is the $C_{real}$ bits of CSI with the placeholder being removed;

when the number $C_{real}$ of real feedback bits corresponding to the CSI reporting type of the downlink carrier is more than (A-B) bits, to determine that first (A-B) bits of information among real feedback bits of CSI of the downlink carrier is the (A-B) bits of feedback information of CSI or to determine that all the (A-B) bits of feedback information of CSI is placeholder; and when the number $C_{real}$ of real feedback bits corresponding to the CSI reporting type of the downlink carrier is equal to (A-B) bits, to determine that real CSI of the downlink carrier is the (A-B) bits of feedback information of CSI; and if the result of the judgment is positive, to determine that the number of transmission bits of CSI transmitted by the UE in the current subframe is 0; or if the result of the judgment is positive, to remove the downlink carrier selected in the operation A from the set of downlink carriers and to perform the operation A again to further select a downlink carrier in the currently updated set of downlink carriers for corresponding processing of CSI thereof; and if the currently updated set of downlink carriers is a null set, to determine that the number of transmission bits of CSI transmitted by the UE in the current subframe is 0; or a sixth scheme:

to determine a set of downlink carriers with CSI feedback in the current subframe, for each of which the minimum number $C_{type\_min}$ of feedback bits corresponding to the CSI reporting type does not exceed (A-B) bits, wherein A represents the threshold number of bits of UCI transmitted concurrently in the current subframe, and B represents the number of transmission bits of ACK/NACK, transmitted by the UE in the current subframe, determined by the processor; and when the set of downlink carriers is not a null set, to determine that the number of transmission bits of CSI transmitted by the UE in the current subframe is (A-B) bits, to select a downlink carrier in the set of downlink carriers according to CSI reporting type priorities and/or carrier indexes and to judge whether the number $C_{real}$ of real feedback bits corresponding to the CSI reporting type of the downlink carrier exceeds (A-B) bits; and when the judgment shows the number $C_{real}$ being less than (A-B) bits, to determine that the (A-B) bits of CSI feedback information comprises (A-B-$C_{real}$) bits of placeholder and to determine that real CSI of the downlink carrier is the $C_{real}$ bits of CSI with the placeholder being removed, when the judgment shows the number $C_{real}$ being equal to (A-B) bits, to determine that real CSI of the downlink carrier is the (A-B) bits of CSI feedback information, and when the judgment shows the number $C_{real}$ being more than (A-B) bits, to determine that first (A-B) bits of information among real feedback bits of CSI of the downlink carrier is the (A-B) bits of CSI feedback information or to determine that all the (A-B) bits of CSI feedback information is placeholder; and when the set of downlink carriers is a null set, to determine that the number of transmission bits of CSI transmitted by the UE in the current subframe is 0; or a seventh scheme:

to determine that the number of transmission bits of CSI transmitted by the UE in the current subframe is (A-B) bits, wherein A represents the threshold number of bits of UCI transmitted concurrently in the current subframe, and B represents the number of transmission bits of ACK/NACK, transmitted by the UE in the current subframe, determined by the processor; and to select a downlink carrier in a set of downlink carriers with CSI feedback in the current subframe, according to CSI reporting type priorities and/or carrier indexes and to judge whether the number $C_{real}$ of real feedback bits corresponding to a CSI reporting type of the downlink carrier exceeds (A-B) bits; and when the judgment shows the number $C_{real}$ being less than (A-B) bits, to determine that the (A-B) bits of CSI feedback information comprises (A-B-$C_{real}$) bits of placeholder and to determine that real CSI of the downlink carrier is the $C_{real}$ bits of CSI with the placeholder being removed, when the judgment shows the number $C_{real}$ being equal to (A-B) bits, to determine that real CSI of the downlink carrier is the (A-B) bits of CSI feedback information, and when the judgment shows the number $C_{real}$ being more than (A-B) bits, to determine that first (A-B) bits of information among real feedback bits of CSI of the downlink carrier is the (A-B) bits of CSI feedback information, or to determine that all the (A-B) bits of CSI feedback information is placeholder; or to remove the downlink carrier selected in the operation A from the set of downlink carriers and to perform the operation A again to further select a downlink carrier in the currently updated set of downlink carriers for corresponding processing of CSI thereof, wherein if the currently updated set of downlink carriers is a null set, to determine that the number of transmission bits of CSI transmitted by the UE in the current subframe is 0; or an eighth scheme:

to determine that the number of transmission bits of CSI transmitted by the UE in the current subframe is (A-B) bits, wherein A represents the threshold number of bits of UCI transmitted concurrently in the current subframe, and B represents the number of transmission bits of ACK/NACK, transmitted by the UE in the current subframe, determined by the processor; and to determine a set of downlink carriers with CSI feedback in the current subframe, for each of which the number of real feedback bits of CSI does not exceed (A-B) bits, to select a downlink carrier in the set of downlink carriers according to CSI reporting type priorities and/or carrier indexes and to judge whether the number $C_{real}$ of real feedback bits corresponding to the CSI reporting type of the downlink carrier exceeds (A-B) bits; and when the judgment shows the number $C_{real}$ being less than (A-B) bits, to determine that the (A-B) bits of CSI feedback information comprises (A-B-$C_{real}$) bits of placeholder and to determine that real CSI of the downlink carrier is the $C_{real}$ bits of CSI with the placeholder being removed, when the judgment shows the number $C_{real}$ being equal to (A-B) bits, to determine that real CSI of the downlink carrier is the (A-B) bits of CSI feedback information, and when the judgment shows the number $C_{real}$ being more than (A-B) bits, to determine that first (A-B) bits of information among real feedback bits of CSI of the downlink carrier is the (A-B) bits of CSI feedback information or to determine that all the (A-B) bits of CSI feedback information is placeholder; and wherein when the determined set of downlink carriers is a null set, to determine that the number of transmission bits of CSI transmitted by the UE in the current subframe is 0;

and/or when the first UCI is CSI and the second UCI is ACK/NACK, the processor is configured:

to determine the number of feedback bits of ACK/NACK to be fed back, according to the number of configured carriers, a transmission mode of each configured carrier and the number of downlink subframes, on each carrier, for which ACK/NACK needs to be fed back in the current subframe;

to judge whether the number of feedback bits of ACK/NACK to be fed back exceeds (A-C) bits, wherein A represents the threshold number of bits of UCI transmitted concurrently in the current subframe, and C represents a number of transmission bits of CSI, transmitted by the UE in the current subframe, determined by the processor; and if a result of the judgment is negative, to determine that the number of transmission bits of ACK/NACK transmitted by the UE in the current subframe is the number of feedback bits of ACK/NACK to be fed back, and if the result of the judgment is positive, to determine that the ACK/NACK to be fed back is spatially bundled by the UE so that the number of feedback bits of the spatially bundled ACK/NACK does not exceed (A-C) bits, and to determine that the number of transmission bits of ACK/NACK transmitted by the UE in the current subframe is the number of feedback bits of the spatially bundled ACK/NACK.

20. The base station according to claim 17, wherein when the current subframe is a subframe in which a Scheduling Request (SR) is transmitted, the receiver is configured:

to transmit the first UCI, the second UCI and a 1-bit SR on the corresponding channel resource in the current subframe.

* * * * *